United States Patent [15] 3,700,873

Yhap [45] Oct. 24, 1972

[54] STRUCTURED COMPUTER NOTATION AND SYSTEM ARCHITECTURE UTILIZING SAME

[72] Inventor: Ernesto F. Yhap, New York, N.Y.

[73] Assignee: International Business Machines Corporation, Armonk, N.Y.

[22] Filed: April 6, 1970

[21] Appl. No.: 26,029

[52] U.S. Cl. ....................235/156, 340/172.5, 444/1

[51] Int. Cl. ................................................G06f 7/38

[58] Field of Search .......235/156; 340/172.5, 55, 86, 340/73; 444/1

[56] References Cited

UNITED STATES PATENTS

| | | | |
|---|---|---|---|
| 3,193,669 | 6/1965 | Voltin | 235/164 |
| 3,508,038 | 4/1970 | Goldschmidt et al. | 235/164 |
| 3,349,377 | 10/1967 | Stone | 340/172.5 |
| 3,380,025 | 4/1968 | Ragland | 340/172.5 |
| 3,391,394 | 7/1968 | Ottaway et al. | 340/172.5 |

OTHER PUBLICATIONS

M. V. Wilkes The Growth of Interest in Microprogramming: A Literature Survey, " Computing Surveys," Vol. 1, No. 3, Sept. ' 69, pp. 139- 145.

*Primary Examiner*—Charles E. Atkinson
*Assistant Examiner*—David H. Malzahn
*Attorney*—Hanifin and Jancin and Roy R. Schlemmer, Jr.

[57] ABSTRACT

An idealized language notation is disclosed for a computer system whereby both data and instructions may be logically combined and operated upon utilizing a set of micro-instructions which have desirable algebraic qualities for this structural concept of a computer language and an embodiment is given of a structured computer architecture. This set of micro-instructions lends itself to simple hardware realizations requiring minimal levels of logic. The nature of the hardware is highly amenable to realization with large scale integration techniques and should facilitate the emulation of a wide set of more specific machine language instructions.

The disclosed hardware while simple is capable of decoding and performing a relatively large number of primitive logical operations, which operations are representative of the particular micro-program which originated same and which micro-programs are further combinable to perform all normal machine operations.

17 Claims, 53 Drawing Figures

INVENTOR
ERNESTO F. YHAP
BY [signature]
ATTORNEY

BUS ROUTE

PATENTED OCT 24 1972

3,700,873

SHEET 03 OF 43

R, P, YS, ZS DECODER

FIG. 5 BZD, BZM DECODER

READ/WRITE FAST STORE DECODER

FIG. 11 MAIN AND AUXILIARY STORE
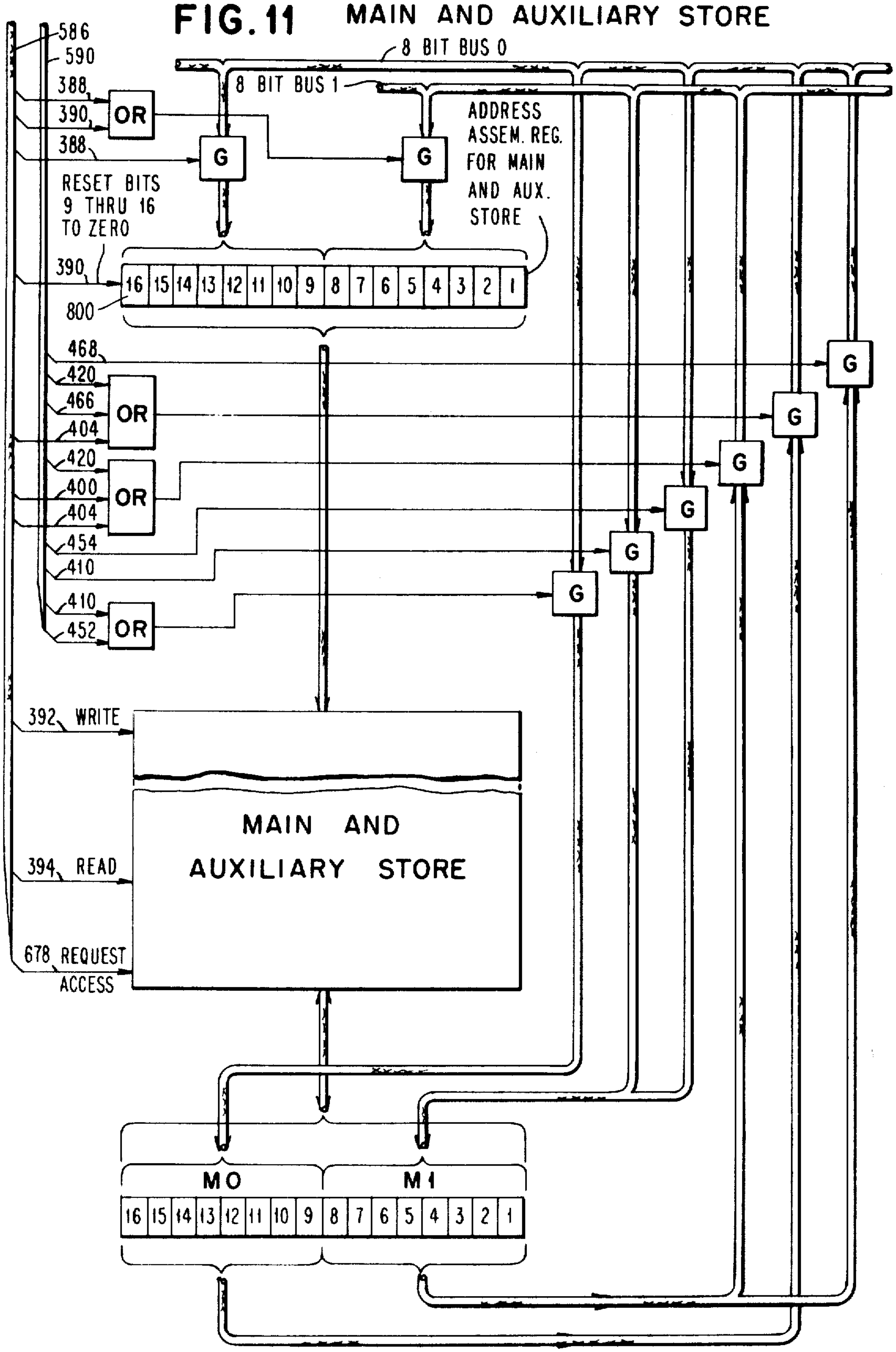

I/O REGISTERS

O REGISTER

TIMING DIAGRAM

A, B, C, & D
REGISTER LOGIC

STRUCTURED COMPUTER NOTATION AND SYSTEM ARCHITECTURE UTILIZING SAME

BACKGROUND OF INVENTION

The data manipulation and combination capabilities of present day computers have made a great many advances in computer techniques possible in the areas of compilers compiler generators, list processors, simulators, automatic control, etc. The computer system designer is still handicapped, however, when he attacks the system design problem. When complicated controls and complex system requirements result in total systems that are vast and unmanageable, it becomes clear that some methodology would be helpful, particularly if the methodology can be based on hardware support.

The question then becomes, what hardware-based methodology can be developed which will contribute towards the effective systematization of system design? A recent technical achievement which greatly increases the possible design alterations for new and basic modification of total system design is the advent of writable control store technology. This innovation in technology facilitates developing hardware-based methodology, in this case for the sake of being able to facilitate the emulation of as large a set of instructions as possible.

Lying at the heart of these problem areas is a fact that has not been generally perceived, perhaps because one has been able to live around this fact without ever being forced to be conscious of it. This fact consists of the lack of any convenient way of combining instructions, in present machines, other than by sequentially invoking them. Yet, there is no valid reason for this to be so. This is apparently the central reason that it has not been possible to arrive at the needed mathematical tools for analysis and synthesis in the cited problem areas. Namely, there has not been provided sufficient structure by which instructions and/or data transformations could be combined.

Imagine trying to put up a skyscraper without having the ability to do more than lay bricks or concrete blocks one on top of another! Just the sheer weight of the material would create a problem in terms of supporting itself. This, of course, does not mean that it is not possible to get around the problem. The cathedrals with their lofty towers and high walls were indeed built — but they had to be supported by numerous buttresses. Today, because it is known how to combine materials in different ways, it is possible to build high but light-weight walls and we can hence dispense with the buttresses.

But what is meant by structure when it comes to Computer Systems? What kinds of structure? Consider real-valued functions of real-valued variables. The kinds of structures that have been available for combining such functions are related to the structural properties of the field of real numbers. For example, one can construct new functions out of old ones by multiplying the functions, adding them, multiplying them by scalars, and even by integrating with respect to some reasonably well-defined functions. It now appears that it is possible to define similar structures for combining Digital computer instructions and that it is also possible to implement such structural facilities with a reasonably small amount of hardware.

But why so much interest in manipulating and combining instructions in this manner? From a general viewpoint, the answer is two-fold. Synthesis of more complex functions out of available instructions or simpler functions can be greatly facilitated by having a greater number of different ways in which it is possible to combine instructions and/or functions. Also, analysis of complex functions can be greatly helped if we know how, or if we have tools to, decompose such functions which can be combined in ways other than by being sequentially invoked.

From a more detailed viewpoint, there is no better way of answering the question other than by giving examples. Starting at the micro-instruction level, a micro-instruction set has been formulated and an architectural sketch detailed for the data flow for a Structured System, the salient points of which are disclosed subsequently. With this sketch, it is shown how the micro-instructions are structurally combined at the micro-level to form, for example, an IBM System/360 add instruction. It should be noted, however, that the structural combination of instructions can be achieved not only at the micro-instruction level, but also at any higher level such as the Assembly level, the Fortran level, and even among mixed levels. Also, it follows that such structural combination facilities are not restricted to the particular set of micro-instructions chosen for the present embodiment but to any set that a designer may desire (or require).

It should be further noted that structurally combining functions includes decision and control functions. For such control functions, especially complex ones, the ability to structurally combine sub-control functions greatly aids the synthesis of large and complicated control functions. This is central to areas such as the production of large software systems, where the interfacing of modules requires effective systematization. For the present embodiment, it should be understood that any control function can be constructed from the R type micro-instructions described herein, and the Branch on Zero or Non-Zero Instructions. The recording and setting of control bits can be accomplished by the conditional P-type instructions.

SUMMARY AND OBJECTS

It has now been found that a structured computer system may be provided capable of utilizing as input a structured machine language or program notation whereby the operations comprising many of the functions capable of performance on the system may themselves be operated upon or be the subjects of a higher level operator wherein such relationship of operators is essentially data independent. That is to say a series of interdependent operations may be written in a program statement according to the present invention and the system is capable of performing them directly regardless of the input data finally utilized with said operation.

A significant feature of the invention is that such a series of interdependent operations may be performed directly without going through the steps of sequentially writing each operation, obtaining the results, storing same and utilizing said results as the subject of a new sequence of operations. It should be noted that the structural organization of the present notation and system will work for standard operations; however, a special set of operators having certain specified characteristics have been derived for the purpose of explaining more clearly the present system but which possess the aforementioned qualities of being directly operable on any subsequent set of operators. The primitive operators are in nature primarily bit functions; however, it is disclosed herein how these operators may be written in special form to perform vector operations that is an operation on a data vector or a data word having a plurality of bits. This effect is achieved by utilizing a control mask with each of said special operators wherein a mask specifies which bits of a particular data vector are to be acted upon by the particular primitive instruction.

As stated above, an exemplary computer system configuration has been developed having the characteristics essentially of a special purpose microprogram machine capable of performing or manipulating data in accordance with the disclosed structured machine organization. The essential feature of the disclosed system is that the principal functional block or central processing unit thereof is effectively comprised of a plurality of transformation devices of different types wherein each transformation device is capable of accepting a data vector and performing a particular transformation operation on said data vector and wherein said transformation devices may be directly interconnected under program control whereby the individual functions inherent in each transformation device are in essence directly interconnected so that the particular function or operation, which such transformation device represents, operates directly upon a preceding transformation device or devices to whose output it may have its input directly connected.

It is accordingly a primary object of the present invention to provide a novel computer system configuration particularly suited to the disclosed structured computer notation.

It is another object to provide such a system whereby operations may be combined directly without specifying data whereby in effect one operator is directly controlling or operating another operator.

It is a still further object to provide such a computer configuration wherein the combination of the operators is limited to certain predetermined operations or structures.

It is yet another object of the invention to provide such a structured computer configuration comprising a plurality of individual and largely autonomous functions whose interconnection is specified by a microprogram control mechanism.

It is a further object of the invention wherein the aforementioned computer configuration represents a structured organization which is essentially the parallel of the structured computer language notation.

It is yet another object to provide such a system wherein the aforementioned notation allows the direct combination of operators wherein such a combination is flexibly choosable by microprogram, as opposed to fixed combinations thereof.

It is yet another object of the invention to provide such a computer system capable of executing a number of unique or primitive microinstructions, which together with the structured organization provides general data transformation capabilities.

It is a still further object of the present invention to provide a mask for use with such primitive operators and means capable of operating on said mask whereby a particular primitive operation will be performed by a data vector in specified areas as designated by said special mask.

It is a still further object of the invention to provide such a structured computer organization whereby the resulting system configuration increases the availability and serviceability of the system.

It is yet another object of the invention to provide such a system wherein special control functions may be readily performed upon the system in a novel fashion.

The foregoing and other objects, features and advantages of the invention will be apparent from the following more particular description of preferred embodiments of the invention, as illustrated in the accompanying drawings.

DESCRIPTION OF DRAWINGS

FIG. 5 is an organizational drawing for FIGS. 5A and 5B.

FIG. 11 comprises a combination logical schematic and block diagram of the blocks marked Main/Auxiliary Store on FIG. 1A.

GENERAL DESCRIPTION OF THE DERIVATION AND APPLICATION OF STRUCTURED NOTATION

Figure 1A:
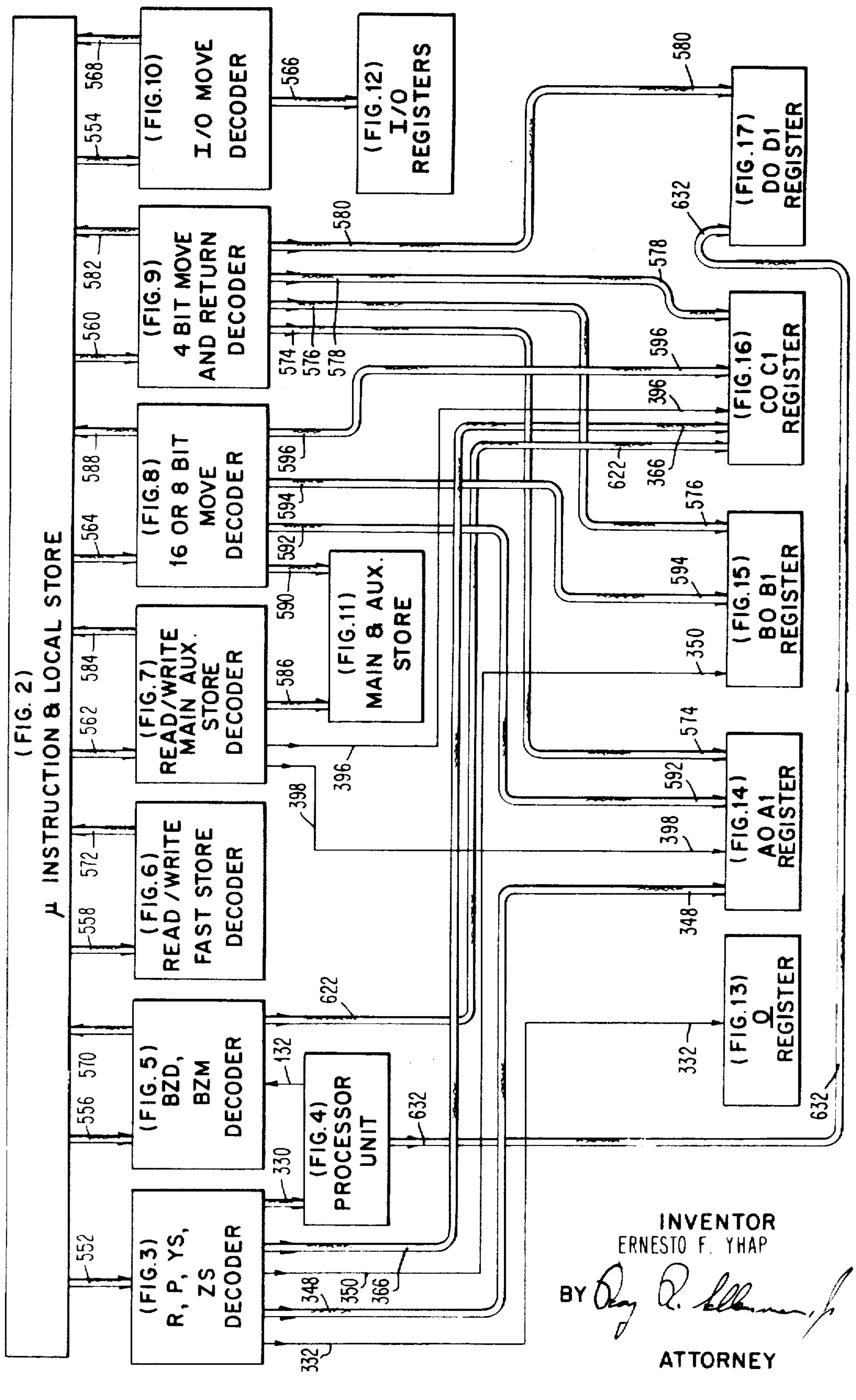
FIG. 1A is a high level functional block diagram of a preferred embodiment of the present system wherein all the major functional units are specifically illustrated together with the essential control lines and cables connected therebetween.

The objects of the present invention are accomplished in general by the provision of a structured computer notation utilizing a small number of primitive operators as a generating set for more complex functions. The primitive operators are for transforming data bits into n data bits wherein an n bit data a vector is acted on by one or more of said primitive instructions to produce an n data bit result. The primitive instructions include exchanging bits within the vector, multiplying a vector quantity by one of its own elements, and the setting of all of the bits of a vector to a zero except the low order bit depending on whether or not the vector is all zeroes.

As will be explained subsequently with essentially these four primitive operations, other more conventional and complex data manipulations may be carried out by combining and manipulating these more primitive operations. Still further along in the specification, a specific hardware embodiment is disclosed wherein the various primitive operators are extracted from appropriate memory storage decoded and operations performed therein under system control.

First, however, it is necessary to introduce certain basic definitions to enable the reader to better understand the underlying concepts of the present invention. After setting forth these definitions, the concept of a generating set for operators capable of transforming an *n* bit starting vector into an *n* bit result vector will be set forth. Such a generating set is one which is powerful enough to carry out all possible data transformations from said *n* bits into n bits utilizing the Structured Combination facilities provided in the presently disclosed system. Subsequently a given set of more complex instructions will be specifically disclosed and described and it will thus be shown that the present primitive operator generating set is indeed a generalized set for producing complex system operation. Finally a sample microprogram for the disclosed computer embodiment will be set forth and described.

First, however, it will be necessary to set forth a number of definitions especially insofar as various symbols utilized in the following derivations is concerned. Firstly, it should be understood that the language or notation anticipated by the present invention is made up of essentially two portions; firstly, data and secondly, operators. The data is classified as either a single bit of data (referred to as a scalar quantity), or a multiple bit of data (designated here and after as an *n*-bit binary vector). Proceeding now with the specific definitions of the vector and operator spaces:

(1) Let $B^n = B_1 x B_2 x \ldots x B_n$ be the space of all n-bit binary vectors.

Let $\mathcal{A} = \{A | A: B^n \to B^n\}$ be the space of all operators from $B^n$ into $B^n$ It should be noted that throughout most of the remainder of the specification an individual *n*-bit binary vector would normally be designated as an $\underline{x}$, $\underline{y}$ or $\underline{z}$. In each of these instances the line underneath the lower case letter indicates that it is a multibit vector. This will be more clearly evident from the definition below. Having described the terminology and having notation for both vector or data quantities and also operators, there will now follow a description as just what is meant by a number of the specialized operations allowable in the present structured system.

First, the exact means of the addition ⊕ of vectors in the space $B^n$ will be described. It should be clearly understood that with this operation, as well as the others described subsequently, the exact definition set forth is the one intended throughout the rest of the specification, not some more generalized and understood adversion of addition, multiplication, etc.

Referring now to this specific addition operation, the precise meaning is as follows:

(2) If $\underline{x} = (x_1, x_2, \ldots, x_n)$, and $\underline{y} = (y_1, y_2, \ldots, y_n)$
Let $\underline{x} \oplus \underline{y} = \underline{z} = (z_1, z^2, \ldots, z_n)$ where $z_i = \quad |x_i - y_i|$ , the modulo-two sum of $x_i$ and $y_i$, for $=1, 2, \ldots, n$. What the latter statement means is that twos are cast out of the result of any addition so that if two binary ones are added together the obvious result of the modulo two sum will be a zero. The affect of this is that this type of an addition may be carried out by an EXCLUSIVE OR logic circuit connected to the two appropriate bit inputs.

The addition (+) of operators in the operator space $\underline{A}$ will follow. In the following definition, the B is considered an operation and has no relationship to the vector space $B^n$ described previously.

(3) If A, B $\epsilon$ A $$\text{let } A+B=C$$

such that for every $\underline{x} \epsilon B^n$, $$C(\underline{x}) = (A+B)(\underline{x}) \equiv A(\underline{x}) \oplus B(\underline{x})$$

Hence $C: B^n \rightarrow B^n$ Namely, the resulting Operator C is also an Operator which transforms an n-bit vector into an n-bit vector, and is hence a qualified member of the Space A.

From the above, it will be noted that the addition (+) of operators is convertible into the addition ⊕ of vectors defined previously when the operators are related to a particular vector quantity.

Having defined the simple addition of operators above, the definition of the multiplication (. or *) of operators in the space A of operators will follow. Again, if A or B are elements of A($A,B \epsilon$ A)

(4) If $A, B \epsilon$ A $$\text{let } A \cdot B = C,$$

such that for every $\underline{x} \epsilon B^n$, $$C(\underline{x}) = (A \cdot B)(\underline{x}) \quad A(B(\underline{x}))$$

hence $C: B^n \rightarrow B^n$. The following notations may all be used interchangeably: AB, A·B, A*B The final manipulation of operators to be defined will be the scalar multiplication of an operator A in the space A by a scalar quantity $\alpha$ in {0,1}:

(5)
$$\alpha A = \begin{cases} A \text{ if } \alpha=1 \\ 0 \text{ if } \alpha=0 \end{cases}$$

where 0 is the Zero Operator such that for every $\underline{x}$ in $B^n$ $0(\underline{x}) = \underline{0}$ ($\underline{0}$ is the vector in $B^n$ with all elements zero.)

It is necessary at this point to provide one more definition. This is for the vector quantity $\underline{e}_\lambda$. For this vector, the number $\lambda$ may have the value, 1, 2, 3, . . . $n$. The mathematical expression for this vector quantity is as follows:

(6)
$$e_\lambda = (\delta_{\lambda 1}, \delta_{\lambda 2}, \ldots, \delta_{\lambda n})$$

where $$\delta_{\lambda i} = \begin{cases} 1 \text{ if } \lambda = i \\ 0 \text{ if } \lambda \neq i \end{cases}$$

What is actually intended by the above mathematical expression is that the vector $\underline{e}_\lambda$ is a 0 in all bit positions except one and that will be the particular bit position identified by the quantity given by $\lambda$; that is, if $\lambda = 4$ and $n$ was 6, then bits 1–3 would be zeroes, bit 4 would be a 1 and bits 5 and 6 would also be zeroes. Thus, 000100.

The mathematical operation of taking the inner product ($[x,y]$) of any two vectors $\underline{x},\underline{y}$ in the vector space $B^n$ will now be set forth. (7)

$$[\underline{x},\underline{y}] = \underline{z} = (z_1, z_2, \ldots, z_n)$$

$$Z_i = x_i \wedge y_i = \begin{cases} 1 \text{ if } x_i = 1 = y_i \\ 0 \text{ otherwise} \end{cases}$$

for $i = 1, 2, \ldots, n$
and where $$\underline{x} = (x_1, x_2, \ldots, x_n),\ \underline{y} = (y_1, y_2 \ldots, y_n)$$

As stated in words what the above mathematical formulas and relationships imply is that in the vector $\underline{z}$ which is the result of the inner product operation, the $i^{th}$ element of the $\underline{z}$ vector is a 1 if the $i^{th}$ terms of both the $\underline{x}$ and $\underline{y}$ vectors are 1's. Otherwise, the $i^{th}$ element of the resultant vector is 0.

There will now follow a generalized description of the mathematical processes involved in arriving at the primitive operators which are characteristic of the present structured computer notation and organization. It should be clearly understood that only the generalized approach
is set forth herein together with an actual detailed statement of the various primitive operators themselves. However, the proof that the operators can be combined to generate any data transformation is not set forth as this involves a rather intricate and lengthy mathematical disseration which is not thought necessary to understanding the actual principles of the present invention.

It will be remembered previously that it was stated that the space A is the space of operators from $B^n$ into $B^n$, where $B^n$ is the space of all $n$-bit binary vectors. It should now be observed that for every operator A in A, there exists a sequence:

$$\{\alpha_{\lambda\mu} | \alpha_{\lambda\mu} \epsilon \{0,1\}, \lambda \epsilon \{1, 2, \ldots, n\}, \mu \epsilon \{0, 1, \ldots, (2^n-1)\}\},$$

dependent on A, such that $$A = \begin{cases} \overset{2^n-1}{\underset{\mu=0}{+}} \ \overset{n}{\underset{\lambda=1}{+}} \alpha_{\lambda\mu} F_{\lambda\mu} \end{cases}$$

where the $F_{\lambda\mu}$ are defined by $$F_{\lambda\mu}(x) = \begin{cases} \underline{e}_\lambda \text{ if } \sum_{i=1}^{n} x_i(2^{n-i}) = \mu \\ \underline{0} \text{ otherwise} \end{cases}$$

and where $$\sum_{i=1}^{n} x_i(2^{n-i})$$

is in the usual arithmetic sense

In the above group of formulas, the operator $F_{\lambda\mu}$ will evaluate to a zero vector (actually $\underline{0}$) except in the very special case set forth.

Referring now to generated and generating sets within such a structured system, there will now be set forth a generalized derivation of generating sets which are composed of a plurality of primitive operators.

Let $S = A_1, A_2, \ldots, A_s | A_i \epsilon A, i = 1, 2, \ldots, s$ be a subset of operators in A. Then define the Generated Set, $g$ S, generated by S by:

$$g(S) = B \left\{ \left| \begin{array}{l} B = \overset{j}{\underset{i=1}{+}} B_{i_1} B_{i_2} \ldots B_{i_{k_i}} \\ \text{for some } B_{i_p} \epsilon S, j \text{ and } k_i \text{ finite.} \end{array} \right. \right\}$$

Obviously the set, $g$ S, generated by S is a subset of A. We shall say that S is a Generating Set for A if $g$ S coincides with A. Note that in obtaining the Generated Set, g S, from the set S, both the structures of Operator Addition and Operator Multiplication are used.

Having established the above relationships for a generated and generating set there will now be set forth a specific set of highly specialized primitive operators which form the basic building blocks or structure of the present embodiment. The derivation of the primitive operators was an extremely time consuming process and a lengthy dissertation of the various factors involved would add very little to the present invention. There are basically four primitive operators utilized, these are the P operator, the R operator, the Y operator, and the Z operator. There are $n$ individual operators for both the P and the R operators and one each for the Y and Z operators as will be apparent from the subsequent listing. There are thus a total of $2n + 2$ operators present in a system comprised of $x$ data vectors each having a length of n bits.

1. $P_1(x_1, x_2, \ldots, x_n) \equiv (x_n, x_2, x_3, \ldots, x_{n-2} x_{n-1}, x_1)$
2. $P_2(x_1, x_2, \ldots, x_n) \equiv (x_1, x_n, x_3, \ldots, x_{n-2}, x_{n-1}, x_2)$

.

.

.

$n-1$. $P_{n-1}(x_1, x_2, \ldots, x_n) \equiv (x_1, x_2, x_3, \ldots, x_{n-2}, x_n, x_{n-1})$ n. $P_n(x_1, x_2, \ldots, x_n) \equiv (x_1, x_2, x_3, \ldots, x_{n-2}, x_{n-1}, x_n)$ $I_n(\underline{x}) \quad P_n(\underline{x})$ n+1. $R_1(x_1, x_2, \ldots, x_n) \equiv x_1(x_1, x_2, \ldots, x_n) = x_1 . \underline{x}$ $n+2$. $R_2(x_1, x_2, \ldots, x_n) \equiv x_2(x_1, x_2, \ldots, x_n) = x_2 . \underline{x}$

.

.

.

2n. $R_n(x_1, x_2, \ldots, {}_n) \equiv x_n(x_1, x_2, \ldots, x_n) = x_n . \underline{x}$ $$2n+1)\, Y(x_1, x_2, \ldots x_n) \equiv \begin{cases} (0, 0, \ldots, 0, 1) & \text{if } \underline{x} \neq \underline{0} \\ (0, 0, \ldots, 0, 0) & \text{if } \underline{x} = \underline{0} \end{cases}$$

$$2n+2)\, Z(x_1, x_2, \ldots, x_n) = \begin{cases} (0, 0, \ldots, 0, 1) & \text{if } \underline{x} = \underline{0} \\ (0, 0, \ldots, 0, 0) & \text{if } \underline{x} \neq \underline{0} \end{cases}$$

In the above listing, it should be noted in passing that the primitive operator $P_n(\underline{x})$ results in the original vector which is shown in this particular listing to be identical to ( $\equiv$ ) the operator $I_n(\underline{x})$. This is referred to subsequently as the identity operator. In other words, the data vector is unchanged by this particular operator.

The proof that the above primitive operators S are actually a generating set for A is an extremely lengthy mathematical dissertation utilizing the definitions of operators and operations enumerated previously in this section. It is believed sufficient to say that this class of operators may actually be proven to be such a generating set. Such proof would essentially comprise the reverse of the previously mentioned theory for generating such a set of primitive operators and its inclusion would not materially add to the disclosure and would in fact tend to obfuscate the invention. More to the point is the subsequent description wherein several types of the primitive instructions just set forth are combined to produce a binary add. It will then be shown how it is possible to automatically generate "programs" for desired transformations in terms of these primitive operators or instructions.

Here, in this section, it will be assumed from the standpoint of simplicity of description that we are dealing with four bit registers. An add will be described which combines two two-bit operands. These two bit operands will be stored in the originating four bit register, manipulated and returned to such a four bit register. Thus, in the subsequent description and formulas n would be equal to 4. It should also be understood, as will be apparent from the subsequent description and truth table, that the primitive operators are utilized to operate on the entire 4 bit contents of the register to reconfigure same and does not perform the binary add in the usual sense. To briefly and symbolically redescribe the four primitive operators which will be utilized at this point. They are:

1. $P_i(x_1, x_2 \ldots, x_n) \equiv (x_1, x_2 \ldots, x_n \ldots, x_{n-1}, x_i)$;
2. $R_i(x_1 \ldots, x_n) \equiv x_i . x$ where $i = 1, 2, \ldots, n$
3. $Y(x_1, \ldots, x_n) \equiv \alpha . e_n$ where $\alpha = 1$ if $\underline{x}$ is not equal to 0

$\alpha = 0$ if $\underline{x}$ is equal to 0

4. $Z(\underline{x}_1, \ldots, x_n) \equiv \alpha . e_n$ where $\alpha = 1$ if $\underline{x}$ is equal to 0

$\alpha = 0$ is $\underline{x}$ is not equal to $\underline{0}$ where $e_n = (0,0,0,\ldots,0,1)$ The following numerical example comprises a program in primitive operator notation which shows a binary-add of the two bits $x_1$, $x_2$ to the two bits $x_3$, $x_4$ taking into account the value $\mu$ of a previous carry, and recording any generated carry in bit 2 of the output register, while recording the sum in bits 3 and bits 4. Bit 1 of the output remains at zero. Thus the 4 bit positions of the register would be designated going from left to right $x_1, x_2, x_3, x_4$.

$$A = P_2 Y(R_1 R_3 + (R_1 + R_3)(R_2 R_4 + \mu (R_2 + R_4))) + P_3 Y(R_1 + R_3 + R_2 R_4 + \mu (R_2 + R_4)) + Y(R_2 + R_4 + \mu I) + \mu Z$$

The data vector $\underline{x}$ is assumed for each term. The correctness of the formula can be easily verified. For example let $\mu = 0$, and let $x_1 x_2 = 01$, $x_3 x_4 = 01$, then the result should be (0010) :

$$P_2 Y(R_1 R_3 + (R_1 + R_3) R_2 R_4)(0101)$$
$$= P_2 Y[R_1 R_3(0101) + (R_1 + R_3) R_2 R_4 (0101)]$$
$$= P_2 Y[(0000) + (R_1 + R_3)(0101)]$$
$$= P_2 Y[R_1(0101) + R_3(0101)] = (0000)$$
$$P_3 Y(R_1 + R_3 + R_2 R_4)(0101) = P_3 Y(0101) = (0010)$$
$$Y(R_2 + R_4)(0101) = 0000$$

Hence $$A(0101, \mu = 0) = (0010)$$

In the above evaluation all $\mu$ terms dropped out since $\mu$ was stated to be equal to zero.

For small n, (e.g. 4) a program in terms of the P, R, and Y-Z type operators can be "automatically" obtained for any desired data transformation. The method follows:

(1) List the data transformations desired: (e.g., the 2-bit add function)

| Input | Output |
|---|---|
| $x_1x_2x_3x_4$ | $z_1z_2z_3z_4$ |
| 0000 | 0000 |
| 0001 | 0001 |
| 0010 | 0010 |
| 0011 | 0011 |
| 0100 | 0001 |
| 0101 | 0010 |
| 0110 | 0011 |
| 0111 | 0100 |
| 1000 | 0010 |
| 1001 | 0011 |

| | |
|---|---|
| 1010 | 0100 |
| 1011 | 0101 |
| 1100 | 0011 |
| 1101 | 0100 |
| 1110 | 0101 |
| 1111 | 0110 |

(2) For every input occurrence $\underline{x}$ which generates an output from the following generic the set of instructions for converting to the desired 3.

$$\left(\overset{n}{\underset{i=1}{+}} \alpha_i(\underline{x})P_i\right) Y(*(\beta_j(\underline{x})I+R_j))$$

$$\alpha_i(\underline{x})=\begin{cases}1 \text{ if } z_i(\underline{x})=1\\ 0 \text{ otherwise}\end{cases}$$

$$\beta_j(\underline{x})=\begin{cases}1 \text{ if } x_j=0\\ 0 \text{ if } x_j=1\end{cases}$$

This Yields (for $n=4$):

$A_0=P_4Y(I+R_1)(I+R_2)(I+R_3)R_4+P_3Y(I+R_1)(I+R_2)R_3(I+R)_4$
$+(P_3+P_4)Y(I+R_1)(I+R_2)R_3R_4+P_4Y(I+R_1)R_2(I+R_3)$
$(I+R_4)+P_3Y(I+R_1)R_2(I+R_3)R_4+(P_3+P_4)Y(I+R_1)R_2R_3$
$(I+R_4)+P_2Y(I+R_1)R_2R_3R_4+P_3YR_1(I+R_2)(I+R_3)(I+R_4)$
$+(P_3+P_4)YR_1(I+R_2)(I+R_3)R_4+P_2YR_1(I+R_2)R$
$(I+R_4)+(P_2+P_4)YR_1(I+R_2)R_3R_4+(P_3+P_4)YR_1R_2$
$(I+R_3)(I+R_4)+P_2YR_1R_2(I+R_3)R_4+(P_2+P_4)YR_1R_2R_3$
$(I+R_4)+(P_2+P_3)YR_1R_2R_3R_4$

Expanding the operator expression algebraically is now permitted by virtue of the proofs given previously in this section, and simplifying by using the fact that $$A+A=0=\overset{4}{\underset{i=1}{*}}(I+R_i)$$

we obtain:

$A_0=P_2Y(R_1R_3+(R_1+R_3)R_2R_4)+P_3Y(R_1+R_3+R_2R_4$
$+Y(R_2+R_4)$

If we do the same for $A_1$, the operator which adds $x_1$, $x_2$ to $x_3$, $x_4$ together with a hot 1, we get:

$A_1=P_2Y(R_1R_3+(R_1+R_3)(R_2R_4+R_2+R_4)+$
$P_3Y(R_1+R_3+R_2R_4+R_2+R_4)+$
$Y(R_2+R_4+I)+Z$

Hence if we let $\mu=1$ or 0 according as a carry exists or not from a previous operation, we obtain the expression given for A previously.

The above "automatic" method becomes cumbersome as n grows large, but it can serve as a good design aid towards gaining experience in the use of the P, R, and Y-Z type instructions. It should be noted at this point that these instructions are just an example of a Generating Set of instructions. We chose them because they have desirable algebraic structural qualities, and because they seem to be easily understandable and usable by logical designers and micro-programmers. There are many other interesting and useful instruction sets which can be shown to be generating sets by providing the facility for combining such instructions structurally.

DESCRIPTION OF THE PRIMITIVE OPERATOR MICROINSTRUCTION FORMAT UTILIZED WITH THE DISCLOSED EMBODIMENT

The following description sets forth the details of the actual instruction format for the various instructions described previously. For each instruction, there is shown the mnemonic designation together with the content which must be present in the instruction. Thus, for the R instruction following, the instruction must provide an indication of the destination register, the source register from which the data word for said operation is to be obtained, the b control field and also the particular eight bit mask to be utilized by that instruction. The contents of the various other instructions are similarly set forth and described.

It will of course be noted that the particular bit configurations and code disclosed in this section is merely exemplary and is specifically related to the present hardware embodiment. However, it should be clearly understood that the content of the instruction or the instruction format itself could easily be varied for a different hardware embodiment or conceivably fewer or greater than the 16 bit instruction word disclosed could be utilized.

Figures 2, 2A:
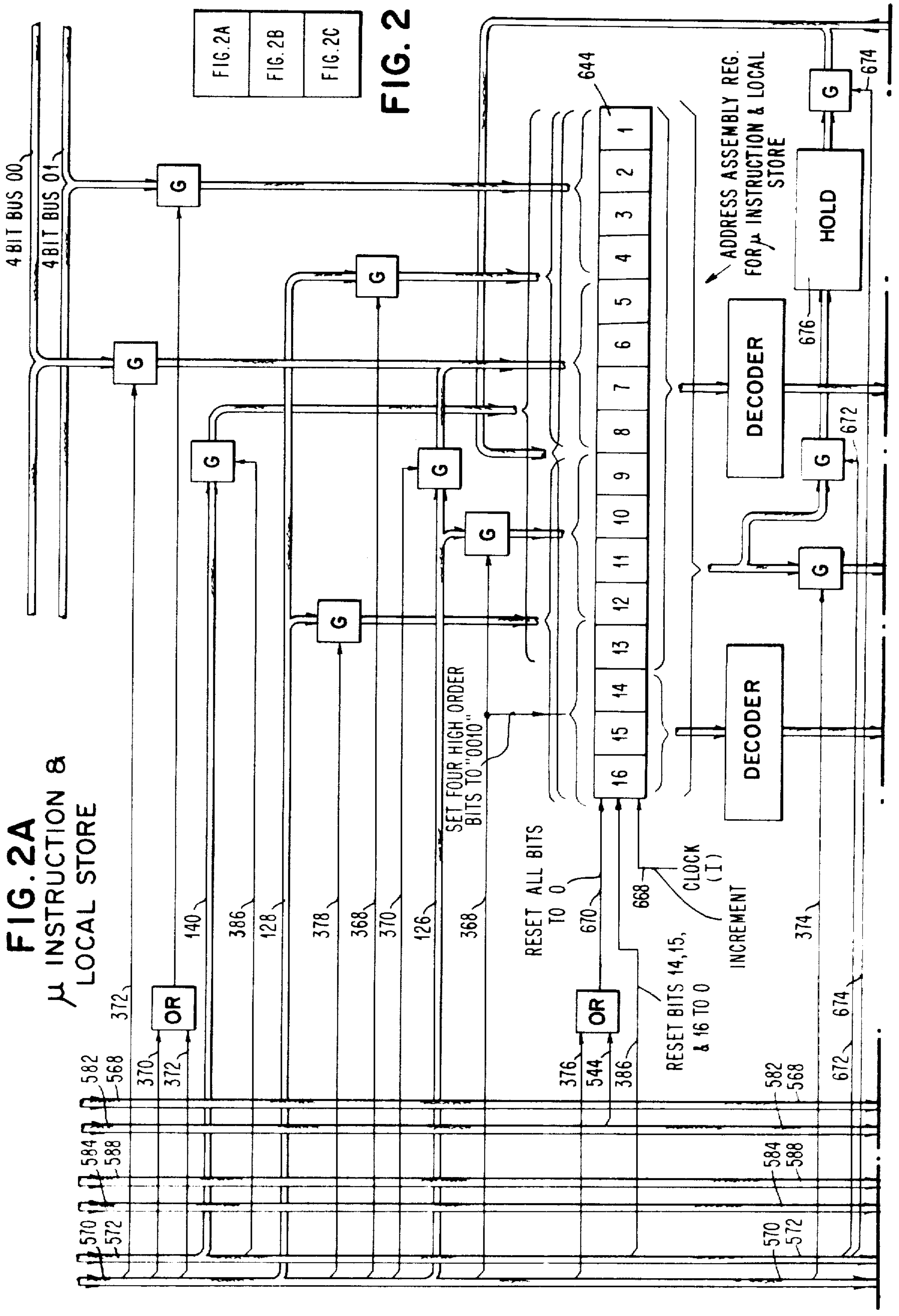
FIG. 2 is an organizational diagram for FIGS. 2A through 2C.
FIGS. 2A–2C comprise a composite logical schematic diagram of the block marked micro-instruction and local store on FIG. 1A.
Figure 2B:
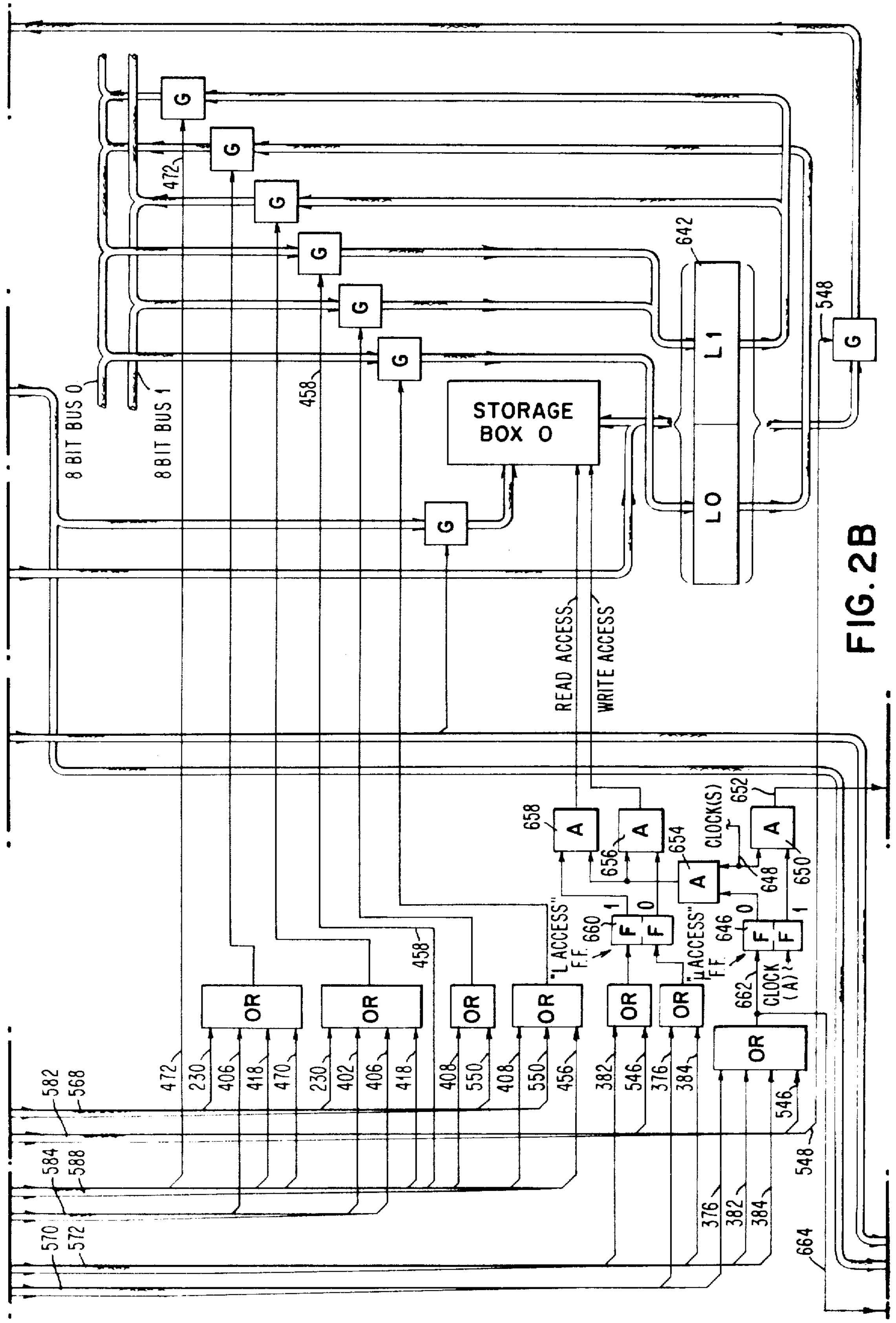
Figure 2C:
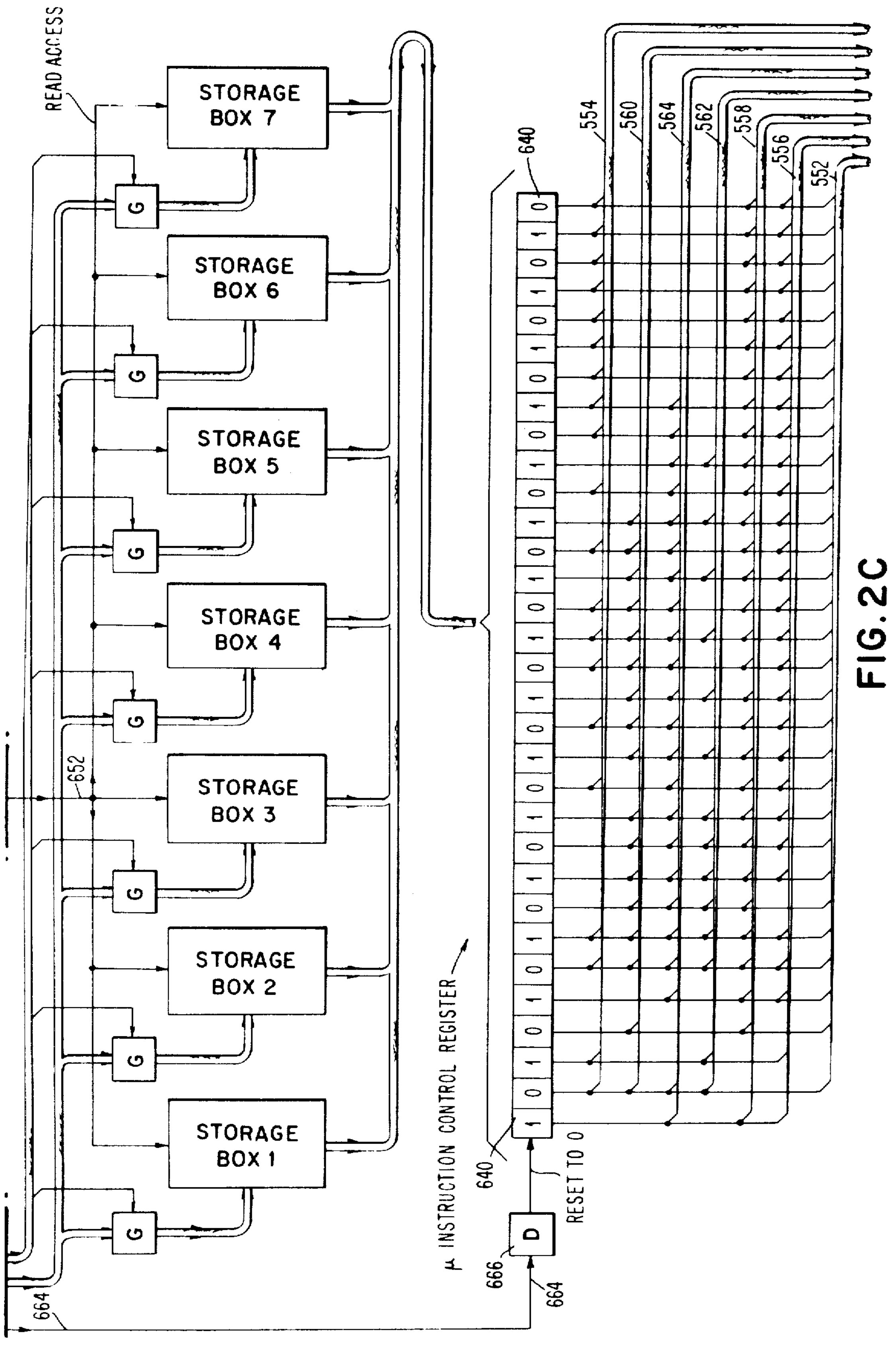

It will thus be noted that the various line connections from the microinstruction control register on FIG. 2 are connected to the various input cables to the seven decoder blocks in the manner essentially specified in this section. The following description of the various primitive instruction formats together with the illustrative charts clearly indicate the particular primitive instructions susceptible of performance by the disclosed system.

R INSTRUCTION

The R instruction contains the following information: R, $b$ field, Source, Destination, Mask $= R\ (b)\ S\ D\ (M)$.

The half-registers indicated by Source in Chart 1 in that order, are used as source operands. Results are placed in the Destination Register. Allowable source-destination combinations are:

CHART 1

| Source | Destination |
|---|---|
| $\underline{O}$ source | A0A1 |
| A0A1 | C0C1 |
| C0C1 | A0A1 |
| B0B1 | C0C1 |

The $D$ field is implied by the S field, namely, given a sources it can only go to one destination.

$b$=0 indicates that the results are written directly into the indicated destination, over-riding whatever contents were originally there. On the other hand, $b$=1 indicates that the destination register is to be modified by adding modulo-two the results and the original contents of the destination register.

The results $\underline{r}=(r_1, r_2, \ldots r_8)$ are determined from the 8 masks bits, $\underline{m}=(m_1, m_2, \ldots m_8)$, and the source bits, $\underline{s}=(s_1, s_2, \ldots s_8)$, in the following manner.

$$\underline{r}=\alpha_r\,\underline{s}$$

where $\alpha_r=1$ if $[\underline{m}, \bar{\underline{s}}]$ is the zero vector 0 if $[\underline{m}, \bar{\underline{s}}]$ is non-zero It will be remembered that $[\underline{m}, \bar{\underline{s}}]$ is "inner product" of the mask vector $\underline{m}$, and the complement $\bar{\underline{s}}$ of the source vector namely, the bit-ANDing of corresponding bits in $(m_1, m_2, \ldots m_8)$, and $(\bar{s}_1, \bar{s}_2, \ldots \bar{s}_8)$.

Chart 2 illustrates the format for a 16-bit micro instruction bit assignment for the $R$ instruction.

The R instruction is designed to implement the efficient execution of the $R_i$ operations defined previously, and in fact allows the parallel execution of a product of $R_i$'s.

CHART 2

R INSTRUCTION

BIT DESIGNATION

| 0–3 bits | 4 bit | 5 bit | 6 & 7 bits | | | 8–15 bits |
|---|---|---|---|---|---|---|
| | | | | Source | Destin. | 8 bit mask: |
| 0 0 0 0 | $b$ field | 0 | 00 | $\underline{Q}$ Source | AOA1 | (see text) |
| | (see | 0 | 01 | AOA1 | COC1 | |
| | text) | 0 | 10 | COC1 | AOA1 | |
| | | 0 | 11 | BOB1 | COC1 | |

P INSTRUCTION

The P instruction contains the following information: P, $b$ field, Source, Destination, Mask = P, ($b$), S, D, (M) The allowable source-destination combinations are exactly those allowable for the R instruction. Likewise, $b$ is used exactly in the same way as it is used in the R instruction.

The results, $\underline{r} = (r_1, r_2, \ldots, r_8)$ are determined from the 8-bit mask, $\underline{m} = (m_1, m_2, \ldots, m_8)$, and the source bits, $\underline{s}$ $(s_1, s_2, \ldots, s_8)$ in the following manner.

$$\underline{r} = \alpha_p \underline{M}$$

where $\alpha_p = 1$ if $s_8 = 1$ 0 if $s_8 = 0$

Chart 3 illustrates the format for a 16-bit assignment for the P instruction.

The P instruction is designed to implement the efficient execution of the $P_iY$ or $P_iZ$ operations defined previously.

CHART 3

P INSTRUCTION

BIT DESIGNATION

| 0–3 bits | 4 bit | 5 bit | 6–7 bits | | | 8–15 bits |
|---|---|---|---|---|---|---|
| | | | | Source | Destin. | 8 bit mask: |
| 0 0 0 1 | $b$ field | 0 | 00 | $\underline{Q}$ Source | AOA1 | (see text) |
| | (see | 0 | 01 | AOA1 | COC1 | |
| | text) | 0 | 10 | COC1 | AOA1 | |
| | | 0 | 11 | BOB1 | COC1 | |

YS INSTRUCTION

The YS instruction contains the following information. YS, t field, Source, Destination, Mask = YS $t$, S, D, (M)

CHART 4

| Source | Destination |
|---|---|
| $\underline{Q}$ | AOA1 |
| AOA1 | COC1 |
| COC1 | AOA1 |
| BOB1 | COC1 |

The result to be written into the destination is given by $\alpha_y \underline{e}_8$ where $$\alpha_Y = \begin{cases} 1 \text{ if the source } \underline{s} \neq \underline{O} \\ 0 \text{ if the source } \underline{s} = \underline{O} \end{cases}$$

or $$\alpha_Y \underline{e}_8 \begin{cases} e_8 \text{ if source } \neq O \\ \underline{O} \text{ if source } = O \end{cases}$$

However, if $\alpha_y = 1$, then the bits in the DOD1 register selected by the Mask bits are altered as follows, depending on the values of the $t$ field (to, $t_1$: bits 4 and 5):

If the t field is 00, then the Mask-selected bits in the DOD1 register are reset to 0. If the $t$ field is 11, the Mask-selected bits in the DOD1 register are set to 1. If the t field is 01, replace the contents of the DOD1 register with these contents Exclusive-ORed with the Mask. If the $t$ field is 10, do nothing. On the other hand, if $\alpha_y = 0$, the following actions take place.

If the t field is 00, 11, or 01, do nothing. If the $t$ field is 10, replace the contents of the DOD1 register with these contents bit-ANDed with the inverse of the Mask bits.

Chart 5 illustrates the format for the 16-bit microinstruction bit assignment for the YS instruction.

The YS instruction is designed to implement the efficient execution of both the Y operation and part of the $\mu$ operation defined previously.

CHART 5

YS INSTRUCTION

BIT DESIGNATION

| 0–3 bits | 4 & 5 bits | 6 & 7 bits | | | 8–15 bits |
|---|---|---|---|---|---|
| | | | Source | Desti. | 8 bit mask |
| 0 0 1 0 | $t$ field | 0o | $\underline{Q}$ Source | AOA1 | (see text) |
| | (see text) | 01 | AOA1 | COC1 | |
| | | 10 | COC1 | AOA1 | |
| | | 11 | BOB1 | COC1 | |

ZS INSTRUCTION

The ZS instruction contains the following information: ZS, t field, Source, Destination, Mask = ZS, $t$, S, D, (M). The ZS instruction differs from the YS instruction only in that $\alpha_z$ for the ZS instruction is given by:

$$\alpha_Z = \begin{cases} 1 \text{ if the source } \underline{S} = \underline{O} \\ 0 \text{ if the source } \underline{S} \neq \underline{O} \end{cases}$$

which is the reverse definition given for $\alpha_y$ in the YS instruction.

Chart 6 illustrates the format for the 16-bit microinstruction bit assignment bit assignment for the ZS instruction.

The ZS instruction is designed to implement the efficient execution of both the Z operation and part of the micro operations defined previously.

CHART 6

ZS INSTRUCTION

BIT DESIGNATION

| 0–3 bits | 4 & 5 bits | 6 & 7 bits | | | 8–15 bits |
|---|---|---|---|---|---|
| | *t* field: | | Source | Desti. | 8 bit mask: |
| 0 0 1 1 | 00 =reset | 00 | O source | AOA1 | (see text) |
| | )- EX-OR | 01 | AOA1 | COC1 | |
| | 10 = AND | 10 | COC1 | AOA1 | |
| | 11 =set | 11 | BOB1 | COC1 | |

BRANCH INSTRUCTIONS, BZD and BZM

The branch on zero direct instructions contain the following information:

BZD = (L (field), 4-NEXT BITS, 8-LOW BITS)

L = 1 indicates that the next sequential address is stored in a given link address register, whereas L = 0, means no linking action is taken.

The BZD instruction branches if the most recent output of the PU (processing unit) was zero. The branch address is limited to a block of 4K locations with the 8 low-order address bits given by the 8-LOW bit field, and the next 4 higher order address bits given by the 4-NEXT field.

Chart 7 illustrates the format for the 16-bit microinstruction bit assignment for the BZD (Branch on zero, direct) instruction.

CHART 7

BZD INSTRUCTION

BIT DESIGNATION

| 0, 1, 2 bits | 3 bit | 4–7 bits | 8–15 bits |
|---|---|---|---|
| | L field: | 4-NEXT | 8-LOW |
| 1 1 0 | see text | see text | see text |

The Branch on zero multi-way instructions contain the following information;

BZM = (L field, 4–X, 8-HIGH)

The L field is used exactly the way it is used in the BZD instruction.

The BZM (Branch on zero, M-way) instruction branches if the most recent output of the PU was nonzero. The branch address is assembled as follows: The 8 high-order bits of the branch address are taken from the 8 high field. If the 4–X field is zero, then the low order 8 bits of the branch address come from the C Register. If the 4–X field is non-zero, then the low order 4 bits of the branch address come from the C1 half-register, and the 4–X field itself becomes the next 4 higher-order address bit.

Chart 8 illustrates the format for the 16-bit microinstruction bit arrangement for the BZM instruction.

CHART 8

BZM INSTRUCTION

BIT DESIGNATION

| 0–2 bit | 3 bit | 4–7 bits | 8–15 bits |
|---|---|---|---|
| 1 1 1 | L field see text | 4–X 0 0 0 0: C register used for 8 low order bits of branch address $X_4X_5X_6X_7$ = 0000 C1 half register used for low order 4 bits of branch address $X_4X_5X_6X_7$ used for next 4 higher order bits | 8-HIGH high order 8 bits for branch address |

READ/WRITE MICRO-INSTRUCTION STORE/LOCAL STORE

The mnemonic format for these instructions is:

RFS (F,ADR) (Read Fast Store)

WFS (F,ADR) (Write Fast Store)

The FADR is a 13 bit address for micro-instruction store or local store half-words. Distinction between microinstruction store and local store is achieved by apportioning high addresses to micro-instruction store.

Chart 9 illustrates the bit format for the 16-bit microinstruction bit assignment for both the read fast store and the write fast store instruction. The data register into which or from which data is read or written respectively, is the 16 bit L register.

CHART 9

READ/WRITE FAST STORE INSTRUCTION

BIT DESIGNATION

| 0, 1 bit | 2 bit | 3–15 bits |
|---|---|---|
| 1 0 | 0: READ | FADR:13-bit address for |
| | 1: WRITE | up to 8K half-words |

READ/WRITE MAIN STORE/AUXILIARY STORE

The mnemonic format for these instructions is:

R($x$, IADR)

W($x$, IADR)

$x$=1 indicates main store address, whereas $x$=0 indicates auxiliary store access. IADR indicates the register in which the storage address is to be found.

Chart 10 illustrates the format for the 16-bit microinstruction bit assignment for the read and the write main/auxiliary store instructions.

The data register into which or from which data is read or written, respectively, is the 16-bit M register.

CHART 10

READ/WRITE MAIN/AUXILIARY STORE INSTRUCTION

BIT DESIGNATION

| 0–2 bits | 3 bit | 4 bit | 5–7 bits | 8–11 bits | 12–15 bits |
|---|---|---|---|---|---|

| | | | | | |
|---|---|---|---|---|---|
| | (X-field) | | | | |
| 0 1 0 | 0=aux<br>store<br>1=main<br>store | 0=READ<br>1=WRITE | 1 1 1 | if X = 1<br>0100: L Register<br>1000: M Register<br>if $x$ = 0<br>0100:<br>L1 Register<br>1000:<br>M1 Register<br>0001:<br>A0A1 Register<br>0010:<br>C0C1 Register | unused bits |

MOVE INSTRUCTIONS

The mnemonic format and content of these instructions is:

MVB (Source) (Destination)
MVH (Source) (Destination)

MVB moves a byte (8 bits) from a byte source S, to a byte destination D.

MVH moves a half-word (2 bytes) (16 bits) from a half-word source S, to a half-word destination D.

Chart 11 illustrates the format for a 16 bit microinstruction bit assignment for both the MVB and the MVH instructions, and also shows the allowable source-destination combinations allowed.

Note that if these move instructions have any of the AOA1, BOB1, COC1 or DOD1 registers as their destination, the choice is provided of:

1. copying into the destination (bits 0,1,2,4,8 have respective values of 01000
2. replacing the destination contents with these contents EX-ORed with the source (bits 0,1,2,4 have respective values of 0101)
3. replacing the destination contents with these contents bit ANDed with the source (bits 0,1,2,4,8 have respective values of 01001)

CHART 11.—BIT DESIGNATION

| 0 bit | 1 bit | 2 bit | 3 bit | 4 bit | 5 bit, 6 bit, 7 bit, 8 bit | 9 bit, 10 bit, 11 bit, 12 bit | (8 bit), (12 bit), 13 bit, 14 bit, 15 bit |
|---|---|---|---|---|---|---|---|
| 0 | 1 | 0 | 0: 8 bit moves<br>1: 16 bit moves | b: see text | Destination for 8 bit moves | Source for 8 bit moves | When either bits 5, 6, 7, or bits 9, 19, 11=0, 0, 0, then bits 8, 12, 13, 14, 15 are used to indicate one of a possible 32 I/O registers. |
| | | | | | 0 0 0 X: | | |
| | | | | | I/O registers, see bits 12–15 | Same as for destination field | |
| | | | | | 0010: MO register<br>0011: MI register<br>0100: LO register<br>0101: Ll register<br>100X: B register<br>101X: A register<br>110X: C register<br>111X: see chart 10 | See text | Both bits 5, 6, 7=0, 0, 0, and bits 9, 10, 11=0, 0, 0 are not allowed to occur together in the same move instruction. |
| | | | | | 16-bit moves | 16-bit moves | |
| | | | | | 000X: I/O registers, see bits 12–15 | Same as for destination field | |
| | | | | | 001X: L register<br>010X: M register<br>011X: unassigned<br>100X: A, C register<br>101X: B, C register<br>110X: A, B registers<br>111X: see chart 10 | See text | |

4-BIT MOVE

The mnemonic format and content for this instruction is:

MV4 (Source) (Destination) (C field) (G field)

This instruction moves either the high or the low 4 bits from a source S, which can be any of of the A, B, C, or D registers, into either the high or the low 4 bits of a destination D, which can also be any one of the A, B, C or STAT registers. The choice of the appropriate 4 bits is indicated by the C(cross) bit, and the g(gate) bit:

$c$=0, and $g$=0 means the high order 4-bits of the source register are gated into the high-order 4 bits of the destination register.

$c$=0, and $g$=1 means the low order 4-bits of the source register are gated into the low order 4 bits of the destination register.

$c$=1, and $g$=0 means the low order 4-bits of the source register are gated into the high order 4 bits of the destination register.

$c$=1, and $g$=1 means the high order 4-bits of the source register are gated into the low order 4 bits of the destination register.

Chart 12 illustrates the format for a 16 bit assignment for this microinstruction.

CHART 12

4 BIT MOVE INSTRUCTION

BIT DESIGNATION

| 0, 1, 2 bit | 3 bit | 4 bit | 5 bit 6, 7 bit | 8, 9 bit | 10-15 bit |
|---|---|---|---|---|---|
| | | | Source | Destination | |
| 0 0 0 | C=0: straight<br>=1: cross<br>see text | g=1: gate 10 1<br>=0: gate 10<br>see text | 00: D0D1<br>01: A0A1<br>10: C0C1<br>11: B0B1 | 00: D0D1<br>01: A0A1<br>10: C0C1<br>11: B0B1 | unused bits |

Description of a Typical μ-Instruction Sequence

The following list of micro-instructions indicates the manner in which a 32 bit add operation would be accomplished following the principles and utilizing the hardware of the presently disclosed system. Specifically two 32 bit numbers are to be extracted from storage and will be loaded into the appropriate registers as required in various logical operations required by the instant microprogram performed thereon.

It should be noted that the present hardware is equipped for actually processing four bits at a time. That is, actually adding together four bits and developing the carry into the next higher order 4 bits as well as assimilating any possible carries from the immediately proceeding low order 4 bits, if any.

The following tables of micro-instructions utilize the same mnemonic format and carry the specific data as specified previously in the specification relative to the structure of the particular instructions. In the following tables, in the lefthand column, there are several labels indicated which represent the address in the micro-instruction store of the entry point for a given subroutine or successive list of microinstructions for performing a particular operation. The middle column indicates the format of the actual microinstruction itself and the right-hand section of the table contains certain notes describing the particular operation being performed by a given microinstruction where it is thought that this explanation will materially aid in an understanding of just what is being done. Definition of mnemonic terms used in $\mu$-instructions:

XH ( high order 16 bits of word X)
XL(low order 16 bits of word X)
YH(high order 16 bits of word Y)
YL(low order 16 bits of word Y)
RLS=read local store
WLS=write local store
RFS=read fast store
WFS=write fast store
MVB=move a byte (8 bits)

R, BZD, etc. are defined previously together with the contents of the complete instruction fields.

| | | |
|---|---|---|
| RLS | XL | read Local Store at location where low order 16 bits of X are stored |
| MVB | L1, B | move L1 register to B register |
| MVB | L1, C | move L1 register to C register |
| RLS | YL | read Local Store at location where low order 16 bits of Y are stored |
| MVB | X,L1,B | B now contains $\underline{x}_1 \oplus \underline{Y}_1$ (EXCLUSIVE OR'ed) |
| MVB | A.L1,C | C now contains $[\underline{x}_1 . \underline{y}_1]$ (bit ANDed) |
| R | 0,0,A,1 | |
| BZD | L, ADDB0 | |

The above last two instructions actually set up an unconditional branch. The R instruction merely sets up the zero condition for the following "branch on zero" instruction (BZD). The BZD instruction causes the address of the next instruction in this list to be stored in location 0 of the local store and also causes the controls to branch to the address designated by the label ADDBO. The above group of instructions effectively moved or rearranged the contents of the C and B registers so that the B register currently contains the low order four bits which were preprocessed according to the previous subroutine and the D register has the next four higher order bits from the C and B registers preprocessed by said subroutine. Finally, the contents of D are moved to the LO register after which it is written into Local Store at location TEMP. Prior to branching to ADDC, it will be necessary to save the previous link address by saving it in another Local Storage position designated link 2. The storage position designated link 1 is in effect available for use by another BZD and Link Instruction. Finally, an unconditional branch is set up by the last two instructions and the address of the next microinstruction is then stored at address link 1 in the Local Store. The program then branches to the address specified by the label ADDC in the microinstruction store. However, before describing what happens beginning at address ADDC, for sake of clarity, the sequence beginning at address ADD0 will be set forth.

| | | |
|---|---|---|
| ADDBO | R O,O,A,O | Sets carry in $a_8$ to 0 (bit 8 in A register |
| ADDB | MV4 B,D,$h$,1 | Move high 4 bits from source to low 4 bits of Dreg. |
| | MV4 C,B,1,$h$ | B now has parts of the original contents of both C and B registers for low 4 bits |
| | MV4 C,D,$h$,$h$ | D now has parts of the original contens of both C and B registers for next 4 bits |
| | MVB D,LO | Move contents of D to LO register |
| | WLS TEMP | D stored temporarily in Local Storage position designated TEMP |
| | RLS Link 1 | Link 1 information saved in Link 2 |
| | WLS Link 2 | |
| | R O,A,1 | ADDC returns sum of 4 bits in low |
| | BZD L,ADDC | order part of D and carry in $a_8$ |

What this list of instructions (ADDO) accomplishes actually perform the addition of four bits of X to four bits of Y which it does by utilizing the preprocessed contents of the B register. As will be remembered, the low order four bits contain the results of the EXCLUSIVE OR operation and the high order four bits contain the results of the bit ANDing operation. A possible carry to the next higher four bits to be processed on the next pass of the subroutine is stored in the last bit of the A register ($a_8$). The final results of this operation will be stored in the low order four bits of the B register. Before proceeding With the listing of this next subroutine, reference is made to the following table to logically describe what is happening in a simple four bit add operation wherein each bit of the result is expressed in column form under the appropriate operand bit location. It will be noted that there are five columns in this table of said logical formulas and similarly the subsequent listing of the subroutine is broken up into five corresponding groups. Each group in this subroutine performs the indicated logical function in this table.

| | $x_5$<br>$y_5$ | $x_6$<br>$y_6$ | $x_7$<br>$y_7$ | $x_8$<br>$y_8$ |
|---|---|---|---|---|
| [ $x_5y_5$<br>$\veebar$<br>$((x_5 \veebar y_5)(x_6y_6))$<br>$\veebar$<br>$((x_5 \veebar y_5)(x_6 \veebar y_6)(x_7y_7))$<br>$\veebar$<br>$((x_5 \veebar y_5)(x_6 \veebar y_6)(x_7 \veebar y_7)(x_8y_8))$ ] | [ $x_5 \veebar y_5$<br>$\veebar$<br>$x_6y_6$<br>$\veebar$<br>$((x_6 \veebar y_6)(x_7y_7))$<br>$\veebar$<br>$((x_6 \veebar y_6)(x_7 \veebar y_7)(x_8y_8))$ ] | [ $x_6 \veebar y_6$<br>$\veebar$<br>$x_7y_7$<br>$\veebar$<br>$x_8y_8(x_7 \veebar y_7)$ ] | [ $x_7 \veebar y_7$<br>$\veebar$<br>$x_8y_8$ ] | $x_8 \veebar y_8 =$ |

```
ADDO   {R   O,B,C,8
No. 1  {YS  11,C,A,8      D register is set by YR8   (b)
       {R   O,B,C,7
No. 2  {R   1,B,C,4
       {YS  01,C,A,7      D register now contains the
                          result of (P7Y(R4+R7) + YR8)
                            (b)
       {R   O,B,C,6
No. 3  {R   1,B,C,3
       {R   1,B,C,47
       {YS  01,C,A,6      D register now contains the
                          result of (P6Y(R3+R6+R4R7) +
                          P7Y(R4+R7) + YR8)   (b)
       {R   0,B,C,5
       {R   1,B,C,2
No. 4  {R   1,B,C,36
       {R   1,B,C,467
       {YS  01,C,A,5      D register now contains the
                          result of (P5Y(R2+R5+R3R6+R4
                            R6R7)
                          + P6Y(R3+R6+R4R7) +
                          P7Y(R4+R7) + YR8)   (b)
       {R   0,B,C,1
       {R   1,B,C,25
No. 5  {R   1,B,C,356
       {R   1,B,C,4567
       {YS  01,C,A,4      Result is now in d5–d8 and
                          carry in a8 as well as d4
        RETURN
```

The contents of the B register are designated $\underline{b}$.

The last, i.e., RETURN instruction accesses the Local Store at address link 1. The address stored therein is utilized to again access the microinstruction storage at the specified address as the re-entry point into the micro-instruction list. From the previous description this instruction is the one immediately following the first unconditional branch, i.e., BZD. The following list of instructions sequentially causes the next four bits currently stored at location TEMP, i.e., the next four higher order preprocessed bits down into the B register. It moves the four previously processed final sum bits into the LO position of the Local Store Data Register and writes said data bits at address TEMP of said Local Store and unconditionally branches to the label ADDC in the microinstruction storage..

```
RLS     TEMP
MVB     LO,B
MVB     D,LO
WLS     TEMP
R       O,A,1
BZD     1,ADDC
```

We will now describe the modification to the result obtained if one branches to ADDC prior to entering ADDO.

```
R       O,A,C,8        Tests a8 for 1 or 0
BZD     ADDO           Branch (without linking) to Add
                         0
                       since the carry is 0
R       B,C,8    }
P       C,A,4    }     puts (0,0,0, b8, 0,0,0,1) in the A
                 }       register
ZS      01,O,A,O }
MVB     X,A,B,         the B register is now correctly
                         modified
                       to handle a carry of I, i.e.,
                       (i) b8 now contains 1 +
                               (x8 ∨ y8) instead
                              of x8 ∨ Y8
                       (ii) by now contains
                              x8Y8 ∨ (x8 ∨ Y8)
                              instead of x8Y8
```

The following subroutine, i.e., ADDC performs the function of testing for a carry bit in the eighth bit position of the A register. If a 0 is detected the program branches to ADD0. If a 1 is detected the subroutine is continued to its end whereupon it automatically goes to ADD0.

```
ADDC    R    O,C,A,8        Tests for c=1 or 0 in a8
        BZD  ADDO
        R    B,C,8
        P    C,A,4          P4Y(x8 Y8 in bit 8 of B)
        ZS   01,O,A,O       e8 to x8 y8 in bit of B
        MVBX,A,B            B now has x5y5 ...x8y8
                            c(x8 y8)
                            (x5 y5)... (x8 y8 c(x8 y8)
        GO TO ADDO
```

It will now be assumed that both subroutines ADDC and ADDO have been completed and the RETURN INSTRUCTION has caused a link back into the program with result that the following instructions are called. These instructions cause the local storage to be read at location TEMP and the results placed in the appropriate bit locations at the C register and subsequently the contents of the D register are moved similarly into the appropriate bit storage locations of the C register with the result that the complete final eight bit sum is now located in the C register and the carry to the next higher order eight bits is currently located in the eighth bit position of the A register. The final three instructions of this group causes the linking address at location link 2 to be written into location link 1 and finally the location in the micro-instruction store located in link 1 is utilized to reaccess said microinstruction string at the proper location to continue with the following specified instructions.

```
RLS      TEMP
MVB      LO,C
MV4      D,C,1,h        8 bit sum now in C register, carry
                          in a8
RLS      LINK 2
WLS      Link 1
RETURN
```

This next set of instructions literally performs the add operation on the next higher order eight bits of the data operands X and Y and essentially does them in exactly the same way specified above. As will be apparent, this is accomplished by specifying the various unconditional and conditional branches described previously after first preprocessing said next eight bits of the X and Y operands.

```
MVB     C, L1          8 bit sum now in C register, carry
                         in a8
WLS     ZL             8 bit sum now in low order Z of
                         Local Store
RLS     XL
MVB     LO, B
MVB     LO, C
RLS     YL
MVB     X, LO, B       B now contains xo ⊕ yo
MVB     A, LO, C       C now contains [xo1, yo]
R       O, A, 1
BZD     1, ADDB        8 bit sum now in C register, carry
                         in a8
RLS     ZL
MVB     C, LO
WLS     ZL             16 bit sum now in LS(ZL), carry
                         in a8
```

The end of the above named instruction results in the 16 bit final sum bits now being stored in Local Store at address ZL and the carry to be propagated up to the next higher order 16 bits is, as previously described, stored in the eighth bit location of the A register. The subsequent listing of microinstructions accomplishes the summing of the next or high order 16 bits in four bit increments as described previously. Since this program listing is done in essentially the same way and utilizes the same subroutines described previously, it is not thought necessary to describe this in incremental detail.

```
RLS     XH
MVB     L1, B
MVB     L1, C
RLS     YH
MVB     X, L1, B
MVB     A, L1, C
R       o, A, 1
BZD     1, ADDB
MVB     c, L1
WLS     ZH
RLS     XH
MVB     Lo, B
MVB     Lo, C
RLS     YH
MVB     X, Lo, B
MVB     A, Lo, C
R       o, A, 1
BZD     1, ADDB
RLS     ZH
MBV     c, Lo
WLS     ZH
```

The above listing thus completes the micro-program for performing a 32 bit add operation. The actual 32 bits of the sum will be stored at locations ZH and ZL which are some arbitrarily assigned storage locations in the Local Store from which location this result may be subsequently read.

The previous description of microinstruction to perform a 32 bit add was of necessity broken up in its normal sequence in order to enable appropriate descriptions of various subroutines, branching conditions, etc. within the basic micro-program. It will be well recognized, however, that a micro-program of its sort must be stored in a predetermined order within the actual micro-program store and more importantly in consecutive locations in order that the system controls be able to automatically index subsequent operations in a particular stream. This is especially true of course when a branch has been detected and the address of the next instruction must first be extracted by incrementing the address register and then subsequently stored in a portion of the local store as a linking address to get back into the proper location in the micro-program store and thus in the micro-program stream. For this reason, the following is a complete ordered list of the previously described microprogram as it would actually be stored in a typical machine. The only addresses listed are the significant ones pointing to the required subroutines such as ADDB, ADDB0, ADDC, etc.

```
ADD32   RLS     LINK 1
        WLS     LINK A
        RLS     XL
        MVB     L1,B
        MVB     L1,C

        RLS     YL
        MVB     X,L1,B
        MVB     A,L1,C

        R       1,0,A,1
        BZD     L,ADDB0
        MVB     C,L1
        WLS     ZL
        RLS     XL
        MVB     LO,B
        MVB     LO,C
        RLS     YL
        MVB     X,LO,B
        MVB     A,LO,C

        R       1,0,A,1
        BZD     L,ADDB
        RLS     ZL
        MVB     C,LO
        WLS     ZL

RLS     XH
MVB     L1,B
MVB     L1,C

RLS     YH
MVB     X,L1,B
MVB     A,L1,C

R       1,0,A,1
BZD     L, ADDB
MVB     C,L1
WLS     ZH
RLS     XH
MVB     Lo,B
MVB     LO,C

RLS     YH
MVB     X,LO,B
MVB     A,LO,C

R       1,0,A,1
BZD     L, ADDB
RLS     ZH
MVB     C,LO
WLS     ZH

RLS     LINK A
WLS     LINK 1

RETURN

ADDBO   R       0,0,A,0
ADDB    MV4     B,D,h,1
        MV4     C,B,1,h
        MV4     C,D,h,h
        MVB     D,LO
        WLS     TEMP
        RLS     LINK 1
        WLS     LINK 2
        R       1,0,A,1
        BZD     L,ADDC
        RLS     TEMP
        MVB     LO,B

        MVB     D,LO
        WLS     TEMP
        R       1,0,A,1
        BZD     L,ADDC
        RLS     TEMP
        MVB     LO,C

        MV4     D,C,1,h
        RLS     LINK 2
        WLS     LINK 1
        RETURN

ADDC    R       0,A,C,8
        BZD     ADDO
        R       B,C,8
        P       C,A,4
        ZS      01,0,A,0
        MVB     X,A,B
        GO TO ADDO

ADDO    R       0,B,C,8
        YS      11,C,A,8
        R       0,B,C,7
        R       1,B,C,4
        YS      01,C,A,7
        R       0,B,C,6
        R       1,B,C,3
        R       1,B,C,47
        YS      01,C,A,6
```

```
R        0,B,C,5
R        1,B,C,2
R        1,B,C,36
R        1,B,C,467
YS       01,C,A,5
R        0,B,C,1
R        1,B,C,25
R        1,B,C,356
R        1,B,C,4567
YS       01,C,A,4
RETURN
```

In addition to the adding of two vectors as just described, it should be readily apparent that other conventional operations such as subtraction, multiplication, division, rooting, etc. may be performed by the present structured computer system by appropriately combining the specified primitive operators.

In addition to the more conventional arithmetic operations performable by the present system configuration certain special control functions are more readily accomplished than with more conventional hardware configurations. For example, if it is wished to make a compare for equal or certain specified bits ($n$) of an m bit data vector a plurality of operations would be necessary with a conventional fixed length compare circuit. In this latter case, at a minimum a first comparison would be required, a readout and storage operation resulting therefrom and a subsequent compare with a mask for "don't care" bits etc. With the present system such an operation could be accomplished with a single R operation where the bits to be examined are specified by the "mask" and they may be evaluated in a single operation.

The essential features of such control functions appear in the ADDO subroutine of the previously described 32 bit add operation.

DESCRIPTION OF THE DISCLOSED HARDWARE EMBODIMENT

Before proceeding with a description of the actual operation of the present embodiment and, more particularly, a description of the specific elements of hardware activated in accordance with the decoding of a particular microinstruction, there will first be set forth a general description of the organization of the present system, especially with respect to FIG. 1A.

Figure 1B:
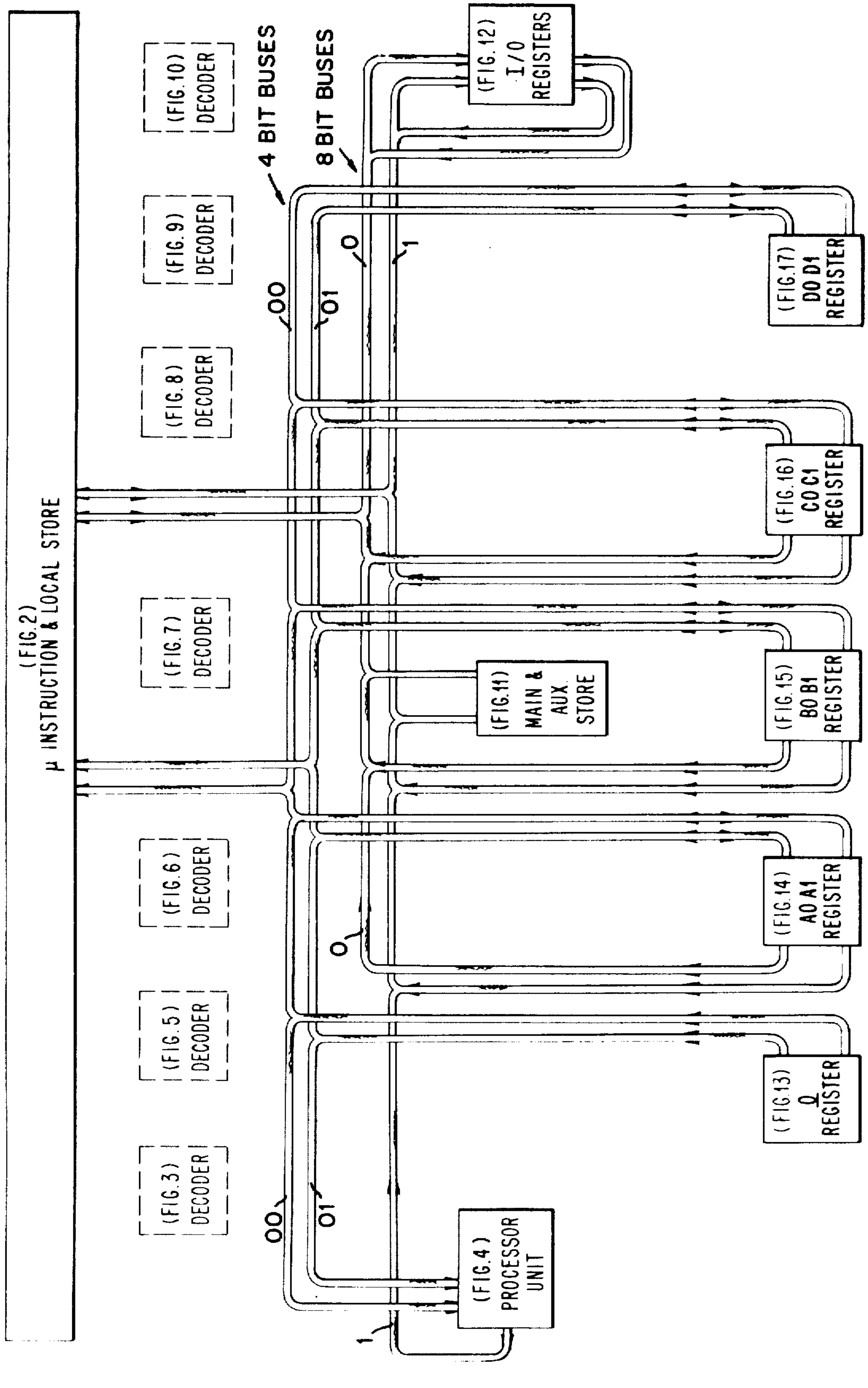
FIG. 1B is a functional block diagram similar to FIG. 1A illustrating the actual data bus interconnection between the various functional blocks.

FIG. 1A and FIG. 1B are identical insofar as showing the same functional units thereon. It should be noted that in FIG. 1B some of these functional units are shown in dotted outline to indicate that they are not directly connected to the data buses. The essential difference between FIGS. 1A and 1B is that FIG. 1A shows the interconnection of the units insofar as various control lines and control cables are concerned whereas FIG. 1B shows the interconnection of the various units to the data buses and thus indicate data flow within the system. It was felt that to attempt to show both control cables and data cables on the same drawing would have made said drawing needlessly complex and difficult to understand. As will be apparent, the functional blocks shown in the dotted lines, namely the decoders, are not directly connected to the data buses as will be apparent from the ensuing specific description. It will further be noted in referring to FIG. 1A that each of the major functional blocks including the various decoders, registers, memories, processor unit, etc., contain a reference numeral to a particular figure therein. This numeral refers to the set of drawings which discloses the specific logical and functional schematic diagrams for that particular broad functional block in FIG. 1A. The interconnection of these units is clearly labeled and for further specific information as to the source and destination of the various cables entering and leaving a given block, reference may be had to the subsequent Line and Cable Function Tables.

The subsequent description discloses the hardware necessary to effect the various sequences of primitive system instructions necessitated by the present structured operation and data language format.

It will, of course, be noted that the individual decoders, seven, shown on FIG. 1A are all connected in parallel to the microinstruction control register on FIG. 2. As will be apparent to one skilled in the art, the only one of the decoders which would be activated by a given micro-instruction would be that whose bit pattern corresponded to the particular wiring configuration of the decoders.

Whenever it is necessary for the reader to refresh his memory as to the individual contents of the microinstruction control register for a given primitive microinstruction, reference should be made back to Section 6 of the specification entitled "Description of Primitive Operator Format Utilized With The Disclosed Embodiment" wherein the naming of the various fields and bit patterns are explained in detail.

Also in the subsequent description when reference is simply made to a figure number without a further letter designation, the composite figure is being referred to not the organization figure. Thus, it will merely be stated for example that the $\mu$ instruction control register 640 is on FIG. 2 not 2C.

The following tables designated as the Line Function Tables and the Cable Function Tables are for the purpose of further explaining the present rather complex system embodiment. In the seven Line Function Tables each table indicates the particular instruction which causes the respective lines to be activated. In the body of the table, each line is designated by reference number, the function performed by the line is also stated, and in most cases, the specific input lines and the manner in which they are logically combined to, in effect, activate said line is set forth. It will be noted in referring to the particular Figures that appropriate logical circuits are provided to effect the logical AND and OR functions specified in said tables.

TABLE 1

4 BIT MOVE INSTRUCTION

| Line No. | Function of Line | Logical Inputs to Activate Line |
|---|---|---|
| 504 | Outgate DO to 4 bit bus 00<br>Outgate D1 to 4 bit bus 01 | (296 OR 298 OR 300 OR 302) AND 304 |
| 506 | Outgate AO to 4 bit bus 00<br>Outgate A1 to 4 bit bus 01 | (296 OR 298 OR 300 OR 302) AND 306 |
| 508 | Outgate CO to 4 bit bus 00<br>Outgate C1 to 4 bit bus 01 | (296 OR 298 OR 300 OR 302) AND 308 |
| 510 | Outgate BO to 4 bit bus 00<br>Outgate B1 to 4 bit bus 01 | (296 OR 298 OR 300 OR 302) AND 310 |
| 512 | Ingate 4 bit bus 00 to DO | (Clock B) AND 312 AND 296 |
| 514 | Ingate 4 bit bus 01 to DO | (Clock B) AND 312 AND 300 |
| 516 | Ingate 4 bit bus 00 to D1 | (Clock B) AND 312 AND 302 |
| 518 | Ingate 4 bit bus 01 to D1 | (Clock B) AND 312 AND 298 |

| | | |
|---|---|---|
| 520 | Ingate 4 bit bus 00 to AO | (Clock B) AND 314 AND 296 |
| 522 | Ingate 4 bit bus 01 to AO | (Clock B) AND 314 AND 300 |
| 524 | Ingate 4 bit bus 00 to A1 | (Clock B) AND 314 AND 302 |
| 526 | Ingate 4 bit bus 01 to A1 | (Clock B) AND 314 AND 298 |
| 528 | Ingate 4 bit bus 00 to CO | (Clock B) AND 316 AND 296 |
| 530 | Ingate 4 bit bus 01 to C0 | (Clock B) AND 316 AND 300 |
| 532 | Ingate 4 bit bus 00 to C1 | (Clock B) AND 316 AND 302 |
| 534 | Ingate 4 bit bus 01 to C1 | (Clock B) And 316 AND 298 |
| 536 | Ingate 4 bit bus 00 to B0 | (Clock B) AND 318 AND 296 |
| 538 | Ingate 4 bit bus 01 to B0 | (Clock B) AND 318 AND 300 |
| 540 | Ingate 4 bit bus 00 to B1 | (Clock B) AND 318 AND 302 |
| 542 | Ingate 4 bit bus 01 to B1 | (Clock B) AND 318 AND 298 |

TABLE 2

RETURN INSTRUCTION

| Line No. | Function of Line | Logical Inputs to Activate Line |
|---|---|---|
| 544 | Reset address assembly register for μ instruction and local store | RETURN AND (Clock A) |
| 546 | Read access local store | RETURN AND (Clock B) |
| 548 | Gate L register to address assembly register for μ instruction and local store (set flip-flop 802 to its "1" state) (this must be done on following cycle | RETURN AND (Clock B) |

TABLE 3

16 BIT MOVE INSTRUCTION

| Line No. | Function of Line | Logical Inputs to Activate Line |
|---|---|---|
| 408 | Ingate L0 from 8 bit bus 0<br>Ingate L1 from 8 bit bus 1 | 170 AND 208 AND (Clock B) |
| 410 | Ingate M0 from 8 bit bus 0<br>Ingate M1 from 8 bit bus 1 | 170 AND 210 AND (Clock B) |
| 412 | Ingate A from logic<br>Ingate C from logic | 170 AND 212 AND (Clock B) |
| 414 | Ingate B from logic<br>Ingate C from logic | 170 AND 214 AND (Clock B) |
| 416 | Ingate A from logic<br>Ingate B from logic | 170 AND 216 AND (Clock B) |
| 604 | Ingate A logic from 8 bit bus 0<br>Ingate C logic from 8 bit bus 1 | 170 AND 212 |
| 606 | Ingate B logic from 8 bit bus 0<br>Ingate C logic from 8 bit bus 1 | 170 AND 214 |
| 608 | Ingate A logic from 8 bit bus 0<br>Ingate B logic from 8 bit bus 1 | 170 AND 216 |
| 418 | Outgate L0 to 8 bit bus 0<br>Outgate L1 to 8 bit bus 1 | 170 AND 218 |
| 420 | Outgate M0 to 8 bit bus 0<br>Outgate M1 to 8 bit bus 1 | 170 AND 220 |
| 422 | Outgate A to 8 bit bus 0<br>Outgate C to 8 bit bus 1 | 170 AND 222 |
| 424 | Outgate B to 8 bit bus 0<br>Outgate C to 8 bit bus 1 | 170 AND 224 |
| 426 | Outgate A to 8 bit bus 0<br>Outgate B to 8 bit bus 1 | 170 AND 226 |
| 428 | Condition A & C registers' logic for bit by bit EX-OR | 170 AND (174 OR 176) AND 212 |
| 430 | Condition B & C registers' logic for bit by bit EX-OR | 170 AND (174 OR 176) AND 214 |
| 432 | Condition A & B registers' logic for bit by bit EX-OR | 170 AND (174 OR 176) AND 216 |
| 434 | Condition A & C registers' logic for bit by bit AND | 170 AND 178 AND 212 |
| 436 | Condition B & C registers' logic for bit by bit AND | 170 AND 178 AND 214 |
| 438 | Condition A & B registers' logic for bit by bit AND | 170 AND 178 AND 216 |
| 440 | Reset A and C logic registers | 170 AND 176 AND 212 AND (Clock A) |
| 442 | Reset B and C logic registers | 170 AND 176 AND 214 AND (Clock A) |
| 444 | Reset A and B logic registers | 170 AND 176 AND 216 AND (Clock A) |
| | Gate A and C registers to their logic registers | 170 AND (174 OR 178) AND 212 AND (Clock A) |
| 448 | Gate B and C registers to their logic registers | 170 AND (174 OR 178) AND 214 AND (Clock A) |
| 450 | Gate A and B registers to their logic registers | 170 AND (174 OR 178) AND 216 AND (Clock A) |

TABLE 4

8 BIT MOVE INSTRUCTION

| Line No. | Function of Line | Logical Inputs to Activate Line |
|---|---|---|
| 452 | Ingate M0 from 8 bit bus 0 | 172 AND 180 AND (Clock B) |
| 454 | Ingate M1 from 8 bit bus 0 | 172 AND 182 AND (Clock B) |
| 456 | Ingate L0 from 8 bit bus 0 | 172 AND 184 AND (Clock B) |
| 458 | Ingate L1 from 8 bit bus 0 | 172 AND 186 AND (Clock B) |
| 460 | Ingate B from logic | 172 AND 188 AND (Clock B) |
| 462 | Ingate A from logic | 172 AND 190 AND (Clock B) |
| 464 | Ingate C from logic | 172 AND 192 AND (Clock B) |
| 598 | Ingate B logic from 8 bit Bus 0 | 172 AND 188 |
| 600 | Ingate A logic from 8 bit bus 0 | 172 AND 190 |
| 602 | Ingate C logic from 8 bit bus 0 | 172 AND 192 |
| 466 | Outgate M0 to 8 bit bus 0 | 172 AND 194 |
| 468 | Outgate M1 to 8 bit bus 0 | 172 AND 196 |
| 470 | Outgate L0 to 8 bit bus 0 | 172 AND 198 |
| 472 | Outgate L1 to 8 bit bus 0 | 172 AND 200 |
| 474 | Outgate B to 8 bit bus 0 | 172 AND 202 |
| 476 | Outgate A to 8 bit bus 0 | 172 AND 204 |
| 478 | Outgate C to 8 bit bus 0 | 172 AND 206 |
| 480 | Condition B register logic for bit by bit EX-OR | 172 AND (174 OR 176) AND 188 |
| 482 | Condition A register logic for bit by bit EX-OR | 172 AND (174 OR 176) AND 190 |
| 484 | Condition C register logic for bit by bit EX-OR | 172 AND (174 OR 176) AND 192 |
| 486 | Condition B register logic for bit by bit AND | 172 AND 178 AND 188 |
| 488 | Condition A register logic for bit by bit AND | 172 AND 178 AND 190 |
| 490 | Condition C register logic for bit by bit AND | 172 AND 178 AND 192 |
| 492 | Reset B logic register | 172 AND 176 AND 188 AND (Clock A) |
| 494 | Reset A logic register | 172 AND 176 AND 190 AND (Clock A) |
| 496 | Reset C logic register | 172 AND 176 AND 192 AND (Clock A) |
| 498 | Gate B register to logic register | 172 AND (174 OR 178) AND 188 AND (Clock A) |
| 500 | Gate A register to logic register | 172 AND (174 OR 178) AND 190 AND (Clock A) |
| 502 | Gate C register to logic register | 1 72 AND (174 OR 178) AND 192 AND (Clock A) |

TABLE 5

R, P, YS, ZS INSTRUCTION

| Line No. | Function of Line | Logical Inputs to Activate Line |
|---|---|---|

| | | |
|---|---|---|
| 332 | Outgate source 0 to 4 bit buses | (R OR P OR US OR ZS) AND 108 |
| 334 | Outgate source A0A1 to 4 bit buses | (R OR P OR YS OR ZS) AND 110 |
| 352 | Outgate source C0C1 to 4 bit buses | (R OR P OR YS OR ZS) AND 112 |
| 350 | Outgate source B0B1 to 4 bit buses | (R OR P OR YS OR ZS) AND 114 |
| 336 | Ingate A0A1 logic from 8 bit bus 1 | (R OR P OR YS OR ZS) AND (108 or 112) |
| 354 | Ingate C0C1 logic from 8 bit bus 1 | (R OR P OR YS (110 OR 114) |
| 338 | Condition A0A1 logic (Mod. 2 addition | (R OR P OR YS OR ZS) AND (108 OR 112) AND 116 |
| 340 | Condition A0A1 logic (Overwrite) | (R OR P OR YS OR ZS) AND (108 OR 112) AND 118 |
| 356 | Condition C0C1 logic (Mod 2 addition | (R OR P OR YS OR ZS) AND (110 OR 114) AND 116 |
| 358 | Condition COC1 logic (Overwrite) | (R OR P OR YS OR ZS) AND (110 OR 114) AND 118 |
| 342 | Gate A0A1 to logic register | (R OR P OR YS OR ZS) AND (108 OR 112) AND 116 AND (Clock A) |
| 360 | Gate C0C1 to logic register | (R OR P OR YS OR ZS) AND (110 OR 114) AND 116 AND (Clock A) |
| 344 | Reset A0A1 logic register | (R OR P OR YS OR ZS) AND (108 OR 112) AND 118 AND (Clock A) |
| 362 | Reset C0C1 logic register | (R OR P OR YS OR ZS) AND (110 OR 114) AND 118 AND (Clock A) |
| 346 | Gate A0A1 logic to A0A1 | (R OR P OR YS OR ZS) AND (108 OR 112) AND (Clock B) |
| 364 | Gate C0C1 logic to C0C1 | (R OR P OR YS OR ZS) AND (110 OR 114) AND (Clock B) |

TABLE 6

BZD, BZM INSTRUCTION

| Line No. | Function of Line | Logical Inputs to Activate Line |
|---|---|---|
| 368 | Ingate cables 126 and 128 to address assembly register for μ instruction and local store<br>Set four high order bits to "0010"<br>Set flip-flop 610 to "1" | BZD AND 132 AND $\overline{130}$ AND (Clock B)<br><br>BZD AND 132 AND 130 AND (Clock B) |
| 370 | Ingate 4 bit bus 01 and cable 126<br>to address assembly register for μ instruction and local store<br>Set flip-flop 612 to "1" | BZM AND 132 AND 138 AND $\overline{130}$ AND (Clock B)<br>Gate C1 register to 4 bit bus 1<br>BZM AND 132 AND 138 AND 130 AND (Clock B) |
| 372 | Ingate 4 bit buses to address as-<br>assembly register for μ and local store<br>Set flip-flop 614 to "1" | BZM AND 132 AND 136 AND $\overline{130}$ AND (Clock B)<br>Gate C Register to 4bit buses<br>BZM AND 132 AND 136 AND 130 AND (Clock B) |
| 374 | Gate address assembly register for μ instruction and local store to LOL1 | (BZD OR BZM) AND 132 AND 130 (Clock A) |
| 376 | Reset address assembly register for μ instruction and local store to zero<br>Set "μL" flip-flop to "0"<br>Set "L access" flip-flop to "write"<br>Through delay, reset μ instruction control register to 0 | (BZD OR BZM) AND 132 AND 130 AND (Clock B) |
| 378 | Ingate cable 128 to address assembly register for μ instruction and local store<br>Set flip-flop 616 to "1" | BZM AND 132 AND $\overline{130}$ AND (Clock B)<br>BZM AND 132 AND 130 AND (Clock B) |

TABLE 7

READ/WRITE MAIN/AUXILIARY STORE INSTRUCTION

| Line No. | Function of Line | Logical Inputs to Activate Line |
|---|---|---|
| 678 | Request main and auxiliary store access | 148 AND (Clock delayed) |
| 388 | Ingate address assembly register for main and auxiliary store from 8 bit buses | 150 AND (Clock B) AND 148 |
| 390 | order half of address assembly register for main and auxiliary store from 8 bit bus 1<br>Reset high order half of address assembly register for main and auxiliary store to zero | 152 AND (Clock B) AND 148 |
| 392 | Initiate write access | 154 AND (Clock B) AND 148 |
| 394 | Initiate Read access | 156 AND (Clock B) AND 148 |
| 396 | Outgate C to 8 bit bus 1 | 168 AND 148 |
| 398 | Outgate A to 8 bit bus 1 | 166 AND 148 |
| 400 | Outgate M1 to 8 bit bus 1 | 164 AND 148 |
| 402 | Outgate L1 to 8 bit bus 1 | 162 AND 148 |
| 404 | Outgate M to 8 bit bus 1 and 8 bit bus 0 | 160 AND 148 |
| 406 | Outgate L to 8 bit bus 1 and 8 bit bus 0 | 158 AND 148 |

Immediately following Tables 1–7 are a group of Tables indicated as the Cable Function Tables. These tables are each identified by a particular cable number which corresponds to a reference number on the drawings, and the individual lines making up the cable are specifically identified by reference numeral. Also, the function each line performs is specified in these tables. In a number of cases where a data transfer cable is being specified only a single function will be described and a plurality of individual wires will be indicated as making up that particular cable all applying to the single function or data group. This is normally indicated in the tables as bits to be transferred from a particular register in the system. Thus, for the Cable Function Table referring to cable No. 564, it is stated that this cable has 23 wires and performs the function of "output bits from micro-instruction control register". Thus, the cable is actually connected to 23 of the bit positions in the actual micro-instruction control register and the cable transfers these bits elsewhere in the system as indicated in the table. Where the wire reference number is the same as the cable reference number, this usually indicates that a data transfer cable is being described and that there is obviously no point in giving separate reference numeral to each of the bit positions on the cable. Where separate functions are described for each wire and the wires have been given separate reference numerals on the drawings these are shown in the Tables.

The Tables are included as an aid in understanding the very complex operations of the present system. Thus, any time, in proceeding through this part of the specification wherein a particular Figure, for example, is being examined and it is desired to determine the exact function of a particular line or cable which is not currently being explained in the specification, it is possible by referring to these Tables to determine the functions performed by the line; and by referring to the source and destination of a particular cable, it is also possible and in most cases easy to determine the circuitry from which a particular line or cable originates and to where it proceeds. It is, of course, to be understood that these tables are merely intended to amplify the accompanying specific description of the embodiment and that this description should be read in detail for a complete and thorough understanding of the operation of the system.

CABLE FUNCTION TABLES

CABLE NO. 132

FROM Processing Unit
TO BZD, BZM Decoder

| DESCRIPTION OF FUNCTION | No. of Wires | Ref No. |
|---|---|---|
| Output of "zero" latch | 1 | 132 |

CABLE NO. 330

FROM R, P, YS, ZS Decoder
TO Processing Unit

| DESCRIPTION OF FUNCTION | No. of Wires | Ref No. |
|---|---|---|
| R Instruction | 1 | R |
| P Instruction | 1 | P |
| YS Instruction | 1 | YS |
| ZS Instruction | 1 | ZS |
| Mask | 116 | 120 |
| Gate Selected "ones" to D0D1 Register | 1 | 100 |
| Gate Selected "zeros" to D0D1 Register | 1 | 102 |
| Gage Mask to D0D1 Register | 1 | 104 |
| Gate Inverse of Mask to D0D1 Register | 1 | 106 |

CABLE NO. 332

FROM R, R, YS, ZS Decoder
TO Q Register

| DESCRIPTION OF FUNCTION | No. of Wires | Ref No. |
|---|---|---|
| Outgate Q to 4 bit buses | 1 | 332 |

CABLE NO. 348

FROM R,P, YS, ZS Decoder
TO A0A1 Register

| DESCRIPTION OF FUNCTION | No. of Wires | Ref No. |
|---|---|---|
| Outgate A0A1 to 4 bit buses | 1 | 334 |
| Ingate A0A1 logic from 8 bit bus 1 | 1 | 336 |
| Condition A0A1 logic block for EX-OR | 1 | 338 |
| Condition A0A1 logic block for EX-OR | 1 | 340 |
| Gate A0A1 to logic block | 1 | 342 |
| Reset A0A1 logic block | 1 | 344 |
| Gate A0A1 logic block to A0A1 | 1 | 346 |

CABLE NO. 350

From R, P, YS, ZS Decoder
To B0B1 Register

| DESCRIPTION OF FUNCTION | No. of Wires | Ref No. |
|---|---|---|
| Outgate B0B1 to 4 bit buses | 1 | 350 |

CABLE NO. 366

FROM R, P, YS, ZS Decoder
TO C0C1 Register

| DESCRIPTION OF FUNCTION | No. of Wires | Ref No. |
|---|---|---|
| Outgate C0C1 to 4 bit buses | 1 | 352 |
| Ingate C0C1 logic from 8 bit bus 1 | 1 | 354 |
| Condition C0C1 logic for EX-OR | 1 | 356 |
| Condition C0C1 logic for EX-OR | 1 | 358 |
| GATE C0C1 to logic Register | 1 | 360 |
| Reset C0C1 logic Register | 1 | 362 |
| Gate C0C1 logic to C0C1 | 1 | 364 |

CABLE NO. 396

FROM Main/Auxiliary Store Decoder

TO C0C1 Register

| DESCRIPTION OF FUNCTION | No. of Wires | Ref No. |
|---|---|---|
| Outgate C to 8 bit bus 1 | 1 | 396 |

CABLE NO. 398

FROM Main/Auxiliary Store Decoder
TO A0A1 Register

| DESCRIPTION OF FUNCTION | No. of Wires | Ref No. |
|---|---|---|
| Outgate A to 8 bit bus 1 | 1 | 398 |

CABLE NO. 552

FROM $\mu$ Instruction and Local Store
TO R, P, YS, ZS Decoder

| DESCRIPTION OF FUNCTION | No. of Wires | Ref No. |
|---|---|---|
| Output bits of $\mu$ instruction control register | 30 | 552 |

CABLE NO. 554

FROM $\mu$ Instruction and Local Store
TO I/O Move Decoder

| DESCRIPTION OF FUNCTION | No. of Wires | Ref No. |
|---|---|---|
| Output bits of $\mu$ instruction register | 20 | 554 |

CABLE NO. 556

FROM $\mu$ Instruction and Local Store
TO BZD, BZM Decoder

| DESCRIPTION OF FUNCTION | No. of Wires | Ref No. |
|---|---|---|
| OUtput bits of $\mu$ instruction control register | 29 | 556 |

CABLE NO. 558

FROM $\mu$ Instruction and Local Store
TO Read/Write Fast Store Instruction Decoder

| DESCRIPTION OF FUNCTION | No. of Wires | Ref No. |
|---|---|---|
| Output bits of $\mu$ instruction control register | 30 | 558 |

CABLE NO. 560

FROM $\mu$ Instruction and Local Store
TO 4 Bit Move - Return Decoder

| DESCRIPTION OF FUNCTION | No. of Wires | Ref No. |
|---|---|---|
| Output bits of $\mu$ instruction control register | 17 | 560 |

CABLE NO. 562

FROM $\mu$ Instruction and Local Store
TO main/Auxiliary Store Decoder

| DESCRIPTION OF FUNCTION | No. of Wires | Ref. No. |
|---|---|---|
| Output bits of $\mu$ instruction control register | 14 | 562 |

CABLE NO. 564

FROM $\mu$ Instruction and Local Store
TO 16 or 8 Bit Move Decoder

| DESCRIPTION OF FUNCTION | No. of Wires | Ref No. |
|---|---|---|
| Output bits of $\mu$ instruction control register | 23 | 564 |

CABLE NO. 566

FROM I/O Move Decoder
TO I/O Registers

| DESCRIPTION OF FUNCTION | No. of Wires | Ref NO. |
|---|---|---|
| Select I/O Register No. 0 | 1 | 232 |
| Select I/O Register No. 1 | 1 | 234 |
| Select I/O Register No. 2 | 1 | 236 |
| Select I/O Register No. 3 | 1 | 238 |

| | | |
|---|---|---|
| Select I/O REGISTER No. 4 | 1 | 240 |
| Select I/O Register No. 5 | 1 | 242 |
| Select I/O register No. 6 | 1 | 244 |
| Select I/O register No. 7 | 1 | 246 |
| Select I/O register No. 8 | 1 | 248 |
| Select I/O register No. 9 | 1 | 250 |
| Select I/O register No. 10 | 1 | 252 |
| Select I/O register No. 11 | 1 | 254 |
| Select I/O register No. 12 | 1 | 256 |
| Select I/O register No. 13 | 1 | 258 |
| Select I/O register No. 14 | 1 | 260 |
| Select I/O register No. 15 | 1 | 262 |
| Select I/O register No. 16 | 1 | 264 |
| Select I/O register No. 17 | 1 | 266 |
| Select I/O register No. 18 | 1 | 268 |
| Select I/O register No. 19 | 1 | 270 |
| Select I/O register No. 20 | 1 | 272 |
| Select I/O register No. 21 | 1 | 274 |
| Select I/O register No. 22 | 1 | 276 |

CABLE NO. 566

FROM I/O Move Decoder
TO I/O Registers

| DESCRIPTION OF FUNCTION | No. of Wires | Ref No. |
|---|---|---|
| Select I/O register No. 23 | 1 | 278 |
| Select I/O register No. 24 | 1 280 | |
| Select I/O register No. 25 | 1 | 282 |
| Select I/O register No. 26 | 1 | 284 |
| Select I/O register No. 27 | 1 | 286 |
| Select I/O register No. 28 | 1 | 288 |
| Select I/O register No. 29 | 1 | 290 |
| Select I/O register No. 30 | 1 | 292 |
| Select I/O register No. 31 | 1 | 294 |
| Outgate I/O register to 8 bit buses | 1 | 228 |
| Ingate I/O register from 8 bit buses | 1 | 230 |

CABLE NO. 568

FROM I/O Move Decoder
TO μ Instruction and Local Store

| DESCRIPTION OF FUNCTION | No. of Wires | Ref No. |
|---|---|---|
| Outgate L to 8 bit buses | 1 | 230 |
| Ingate L from 8 bit buses | 1 | 550 |

CABLE NO. 570

FROM BZD, BZM Decoder
TO μ Instruction and Local Store

| DESCRIPTION OF FUNCTION | No. of Wires | Ref No. |
|---|---|---|
| Address bits | 8 | 126 |
| Address bits | 16 | 128 |
| Ingate cables 126 and 128 to address 1 Assembly register for μ instruction and local store | | 368 |
| Ingate 4 bit bus 01 and cable 126 to address assembly register for μ instruction and local store | 1 | 370 |
| Ingate 4 bit buses to address assembly register for μ instruction and local store | 1 | 372 |
| Gate address assembly register for μ instruction and local store for LOL1 | 1 | 374 |
| Reset address assembly register for μ instruction and local store to 0 Set "μL" flip-flop to "0" Set "L Access" flip-flop to "write" Through delay, reset μ instruction control register to 0 | 1 | 376 |
| Ingate cable 128 to address assembly register for μ instruction and local store | 1 | 378 |

CABLE NO. 572

FROM Read/Write Fast Store Instruction Decoder
TO μInstruction and Local Store

| DESCRIPTION OF FUNCTION | No. of Wires | Ref No. |
|---|---|---|
| Address bits | 26 | 140 |
| Initiate read access | 1 | 382 |
| Initiate write access | 1 | 384 |
| Ingate cable 140 to address assembly register for μ instruction and local store and three high order bits to zero | 1 | 386 |

| | | |
|---|---|---|
| Gate address assembly register for μ instruction and local store to register HOLD | 1 | 672 |
| Gate register HOLD to address assembly register for μ instruction and local store | 1 | 674 |

CABLE NO. 574

FROM 4 Bit Move Return Decoder TO A0A1 Register

| DESCRIPTION OF FUNCTION | No. of Wires | Ref No. |
|---|---|---|
| Outgate A0 to 4 bit bus 00, A1 to 4 bit bus 01 | 1 | 506 |
| Ingate bus 00 to A0 | 1 | 520 |
| Ingate bus 01 to A0 | 1 | 522 |
| Ingate bus 00 to A1 | 1 | 524 |
| Ingate bus 01 to A1 | 1 | 526 |

CABLE NO. 576

FROM 4 Bit Move Return Decoder
TO B0B1 Register

| DESCRIPTION OF FUNCTION | No. of Wires | Ref No. |
|---|---|---|
| Outgate B0 to 4 bit bus 00, B1 to 4 bit bus 01 | 1 | 510 |
| Ingate bus 00 to B0 | 1 | 536 |
| Ingate bus 01 to B0 | 1 | 538 |
| Ingate bus 00 to B1 | 1 | 540 |
| Ingate bus 01 to B1 | 1 | 542 |

CABLE NO. 578

FROM 4 Bit Move Return Decoder TO C0C1 Register

| DESCRIPTION OF FUNCTION | No. of Wires | Ref No. |
|---|---|---|
| Outgate C0 to 4 bit bus 00, C1 to 4 | 1 | 508 bit bus 01 |
| Ingate bus 00 to C0 | 1 | 528 |
| Ingate bus 01 to C0 | 1 | 530 |
| Ingate bus 00 to C1 | 1 | 532 |
| Ingate bus 01 to C1 | 1 | 534 |

CABLE NO. 580

FROM 4 Bit Move Return Decoder
TO D0D1 Register

| DESCRIPTION OF FUNCTION | No. of Wires | Ref No. |
|---|---|---|
| Outgate D0 to 4 bit bus 00, D1 to 4 bit bus 01 | 1 | 504 |
| Ingate bus 00 to D0 | 1 | 512 |
| Ingate bus 01 to D0 | 1 | 514 |
| Ingate bus 00 to D1 | 1 | 516 |
| Ingate bus 01 to D1 | 1 | 518 |

CABLE NO. 582

FROM 4 Bit Move Return Decoder
TO μ Instruction and Local Store

| DESCRIPTION OF FUNCTION | No. Of Wires | Ref No. |
|---|---|---|
| Reset address assembly register for μ instruction and local store | 1 | 544 |
| Read access local store | 1 | 546 |
| Gate L register to address assembly register for μ instruction and local store | 1 548 | |

CABLE NO. 584

FROM Main/Auxiliary Store Decoder
TO μ Instruction and Local Store

| DESCRIPTION OF FUNCTION | No. of Wires | Ref No. |
|---|---|---|
| Outgate L1 to 8 bit bus 1 | 1 | 402 |
| Outgate L0 to 8 bit bus 0 AND L1 to 8 bit bus 1 | 1 | 406 |

CABLE NO. 586

FROM Main/Auxiliary Store Decoder
TO Main/Auxiliary Store

| DESCRIPTION OF FUNCTION | No. of Wires | Ref No. |
|---|---|---|
| Request main/auxiliary store access | 1 | 678 |
| Ingate address assembly register from 8 bit buses | 1 | 388 |
| Ingate low order half of address assembly register from 8 bit bus 1 Reset high order half of address assembly register to zero | 1 | 390 |
| Initiate write access | 1 | 392 |
| Initiate read access | 1 | 394 |
| Outgate M1 to 8 bit bus 1 | 1 | 400 |
| Outgate M0 to 8 bit bus 0 AND M1 to 8 bit bus 1 | 1 | 404 |

CABLE NO. 588

FROM 16 or 8 Bit Move Decoder
TO $\mu$ Instruction and Local Store

| DESCRIPTION OF FUNCTION | No. of Wires | Ref No. |
|---|---|---|
| Ingate L0 from 8 bit bus 0 AND L1 from 8 bit bus 1 | 1 | 408 |
| Outgate LO to 8 bit bus 0 AND L1 to 8 bit bus 1 | 1 418 | |
| Ingate L0 from 8 bit bus 0 | 1 | 456 |
| Ingate L1 from 8 bit bus 0 | 1 | 458 |
| Outgate L0 to 8 bit bus 0 | 1 | 470 |
| Outgate L1 to 8 bit bus 0 | 1 | 472 |

CABLE NO. 590

FROM 16 or 8 Bit Move Decoder
TO main and Auxiliary Store

| DESCRIPTION OF FUNCTION | No. of Wires | Ref No. |
|---|---|---|
| Ingate MO from 8 bit bus 0 AND M1 from 8 bit bus 1 | 1 | 410 |
| Outgate M0 to 8 bit bus 0 AND M1 to 8 bit bus 1 | 1 | 420 |
| Ingate M0 from 8 bit bus 0 | 1 | 452 |
| Ingate M1 from 8 bit bus 0 | 1 | 454 |
| Outgate M0 to 8 bit bus 0 | 1 | 466 |
| Outgate M1 to 8 bit bus 0 | 1 | 468 |

CABLE NO. 592

FROM 16 or 8 Bit Move Decoder
TO A0A1 Register

| DESCRIPTION OF FUNCTION | No. of Wires | Ref No. |
|---|---|---|
| Ingate A from logic | 1 | 412 |
| Ingage A from Logic | 1 | 416 |
| Outgate A to 8 bit bus 0 | | 422 |
| Outgate A to 8 bit bus 0 | 1 | 426 |
| Condition A logic for EX-OR | 1 | 428 |
| Condition A logic for EX-OR | 1 | 432 |
| Condition A logic for AND | 1 | 434 |
| Condition A logic for AND | 1 | 438 |
| Reset A logic register | 1 | 440 |
| Reset A logic register | 1 | 444 |
| Gate A to A logic register | 1 | 446 |
| Gate A to A logic register | 1 | 450 |
| Ingate A from logic | 1 | 462 |
| Outgate A to 8 bit bus 0 | 1 | 476 |
| A logic for EX-OR | 1 | 482 |
| Condition A logic for AND | 1 | 488 |
| Reset A logic register | 1 | 494 |
| Gate A to A logic register | 1 | 500 |
| Ingate A logic from 8 bit bus 0 | 1 | 600 |
| Ingate A logic from 8 bit bus 0 | 1 | 604 |
| Ingate A logic from 8 bit bus 0 | 1 | 608 |

CABLE NO. 594

FROM 16 or 8 Bit Move Decoder
TO B0B1 register

| DESCRIPTION OF FUNCTION | No. of Wires | Ref No. |
|---|---|---|
| Ingate B from logic | 1 | 414 |
| Ingate B from logic | 1 | 416 |
| Outgate B to 8 bit bus 0 | 1 | 424 |
| Outgate B to 8 bit bus 1 | 1 | 426 |
| Condition B logic for EX-OR | 1 | 430 |
| Condition B logic for EX-OR | 1 | 432 |
| Condition B logic for AND | 1 | 436 |
| Condition B logic for AND | 1 | 438 |
| Reset B logic register | 1 | 442 |
| Reset B logic register | 1 | 444 |
| Gate B to logic register | 1 | 448 |
| Gate B to logic register | 1 | 450 |
| Ingate B from logic | 1 | 460 |
| Outgate B to 8 bit bus 0 | 1 | 474 |
| Condition B logic for EX-OR | 1 | 480 |
| Condition B logic for AND | 1 | 486 |
| Reset B logic register | 1 | 492 |
| Gate B to logic register | 1 | 498 |
| Ingate B logic from 8 bit bus 0 | | 606 |
| Ingate B logic from 8 bit bus 1 | | 608 |
| Ingate B logic from 8 bit bus 0 | | 598 |

CABLE NO. 596

FROM 16 or 8 Bit Move Decoder
TO C0C1 Register

| DESCRIPTION OF FUNCTION | No. of Wires | Ref No. |
|---|---|---|
| Ingate C from logic | 1 | 412 |
| Ingate C from logic | 1 | 414 |
| Outgate C to 8 bit bus 1 | 1 | 422 |
| Outgate C to 8 bit bus 1 | 1 | 424 |
| Condition C logic for EX-OR | 1 | 428 |
| Condition C logic for EX-OR | 1 | 430 |
| Condition C logic for AND | 1 | 434 |
| Condition C logic for AND | 1 | 436 |
| Reset C logic register | 1 440 | |
| Reset C logic register | 1 | 442 |
| Gate C to logic | 1 | 446 |
| Gate C to logic | 1 | 448 |
| Ingate C from logic | 1 | 464 |
| Outgate C to 8 bit bus 0 | 1 | 478 |
| Condition C logic for EX-OR | 1 | 484 |
| Condition C logic for AND | 1 | 490 |
| Reset C logic register | 1 | 496 |
| Gate C to logic register | 1 | 502 |
| Ingate C logic from 8 bit bus 0 | 1 | 602 |
| Ingate C logic from 8 bit bus 0 | 1 | 604 |
| Ingate C logic from 8 bit bus 0 | | 606 |

CABLE NO. 622

FROM BZD, BZM Decoder
TO C0C1 Register

| DESCRIPTION OF FUNCTION | No. of Wires | Ref No. |
|---|---|---|
| Gate C1 to 4 bit bus 1 | 1 | 370 |
| Gate C1 to 4 bit bus 1, Gate CO to 4 bit bus 0 | 1 | 372 |

CABLE NO. 632

FROM Processing Unit
TO D0D1 Register

| DESCRIPTION OF FUNCTION | No. of Wires | Ref No. |
|---|---|---|
| Input to D0D1 register | 16 | 122 |
| Gate D logic to D0D1 register | 1 | 624 |
| Gate D register to logic | 1 | 626 |
| Gate cable 122 to D0D1 logic | 1 | 628 |
| Gate cable 122 to D0D1 register | 1 | 630 |
| Condition D0D1 register logic for EX-OR | 1 | 634 |
| Condition D0D1 register logic for AND | 1 | 636 |

Proceeding now with the description of the disclosed hardware embodiment, it will be seen that in FIG. 1A, the overall block diagram, there are shown the various units of the machine and the interconnecting cables. In addition to the interconnecting cables shown on FIG. 1A, certain of the units communicate over one or more of four special purpose data buses. These buses are shown on FIG. 1B and comprise the four bit bus 00, four bit bus 01, the eight bit bus 0, and the eight bit bus 1.

Figure 4A:
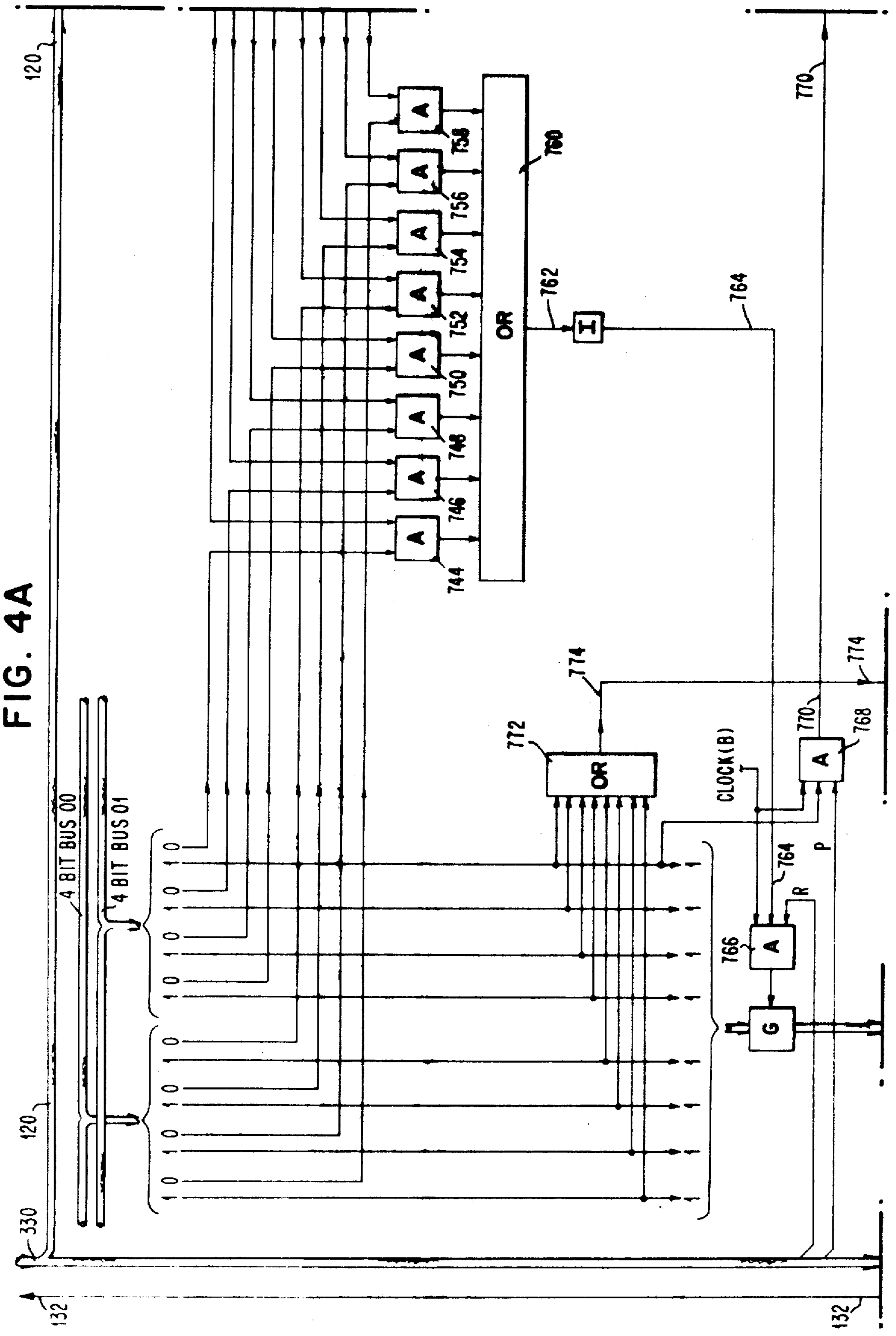
FIGS. 4A–4E comprise a composite logical schematic diagram of the block indicated Processing Unit on FIG. 1A.
Figures 4, 4B:
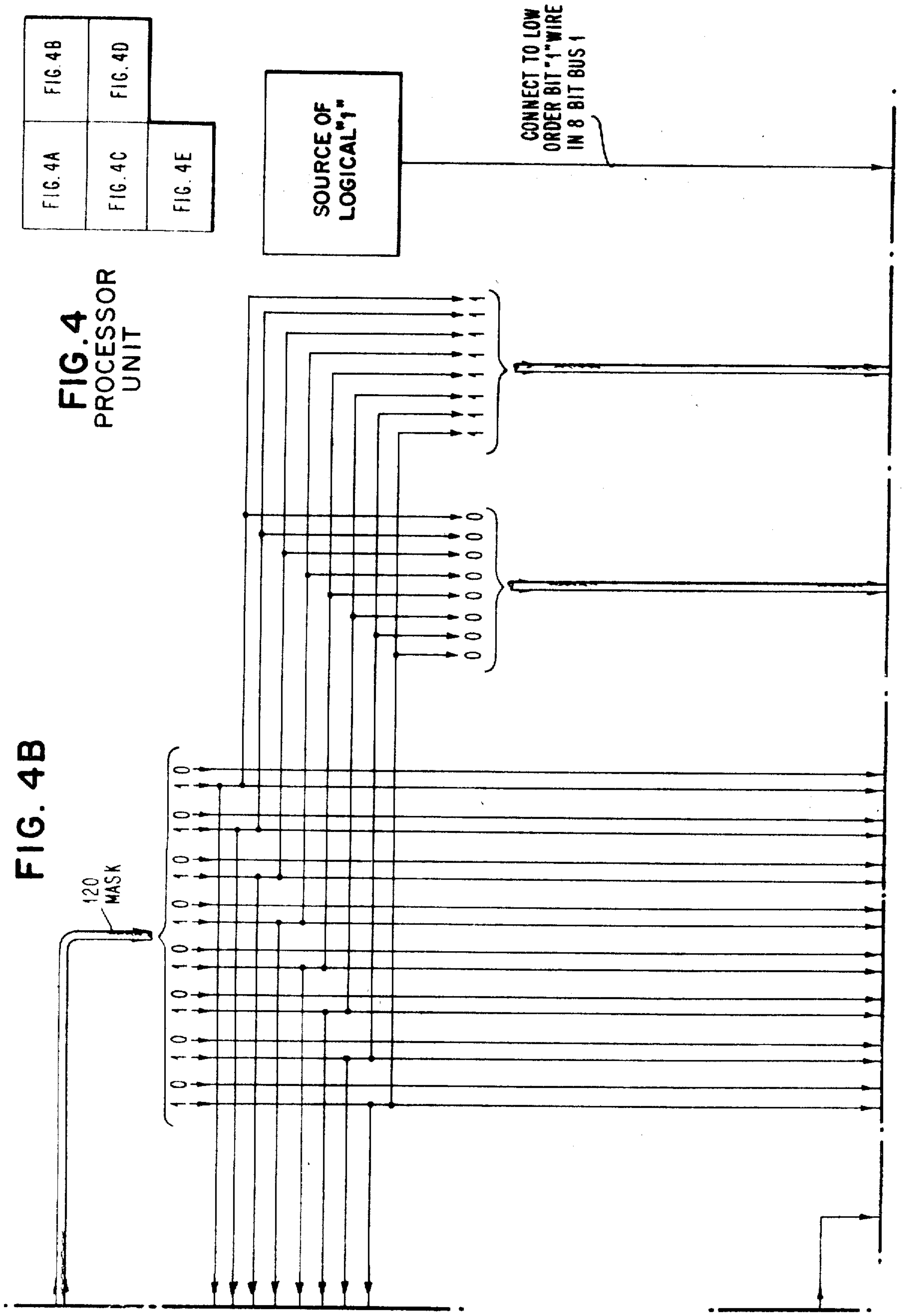
FIG. 4 is an organizational drawing for FIGS. 4A through 4E.
Figure 4C:
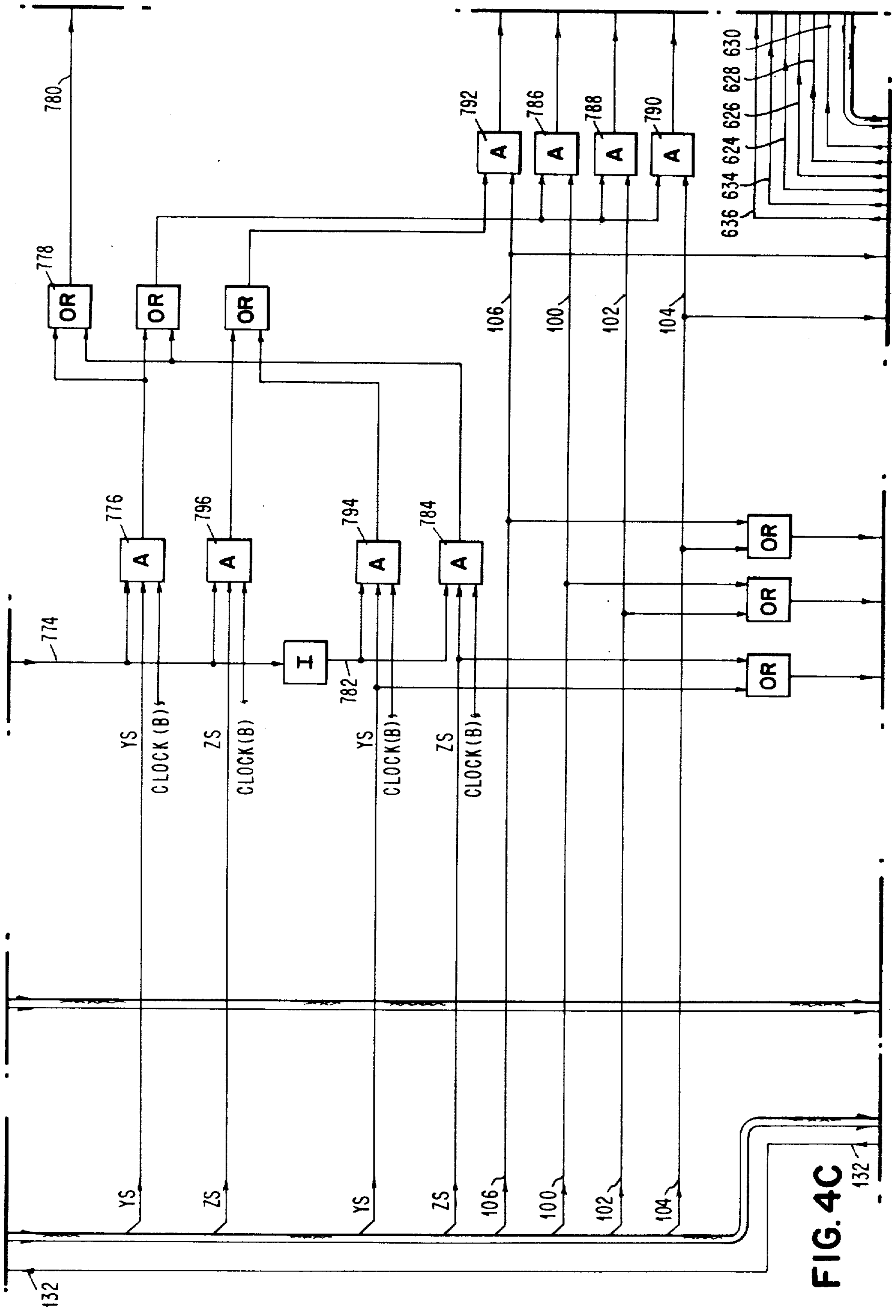
Figure 4D:
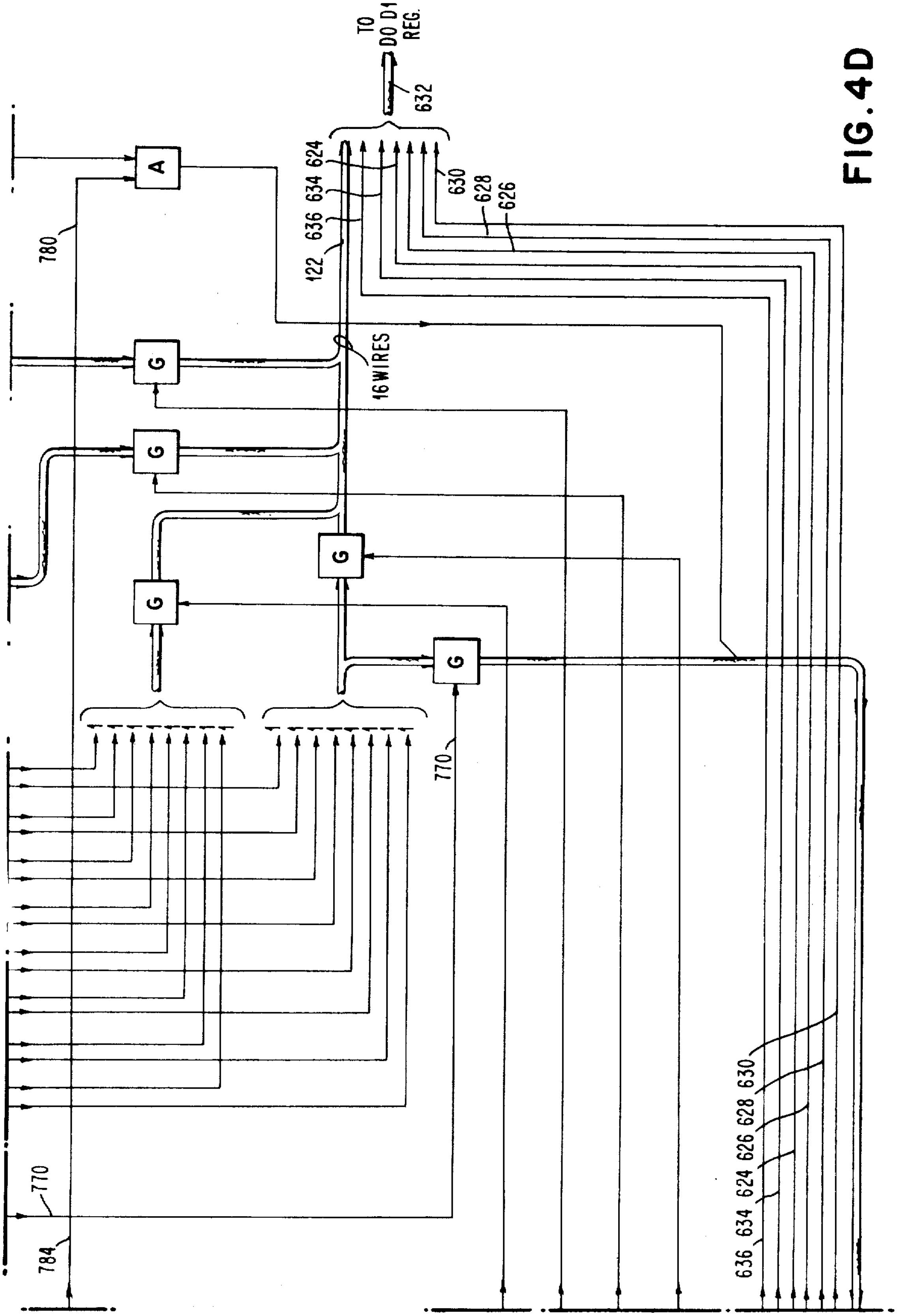
Figure 4E:
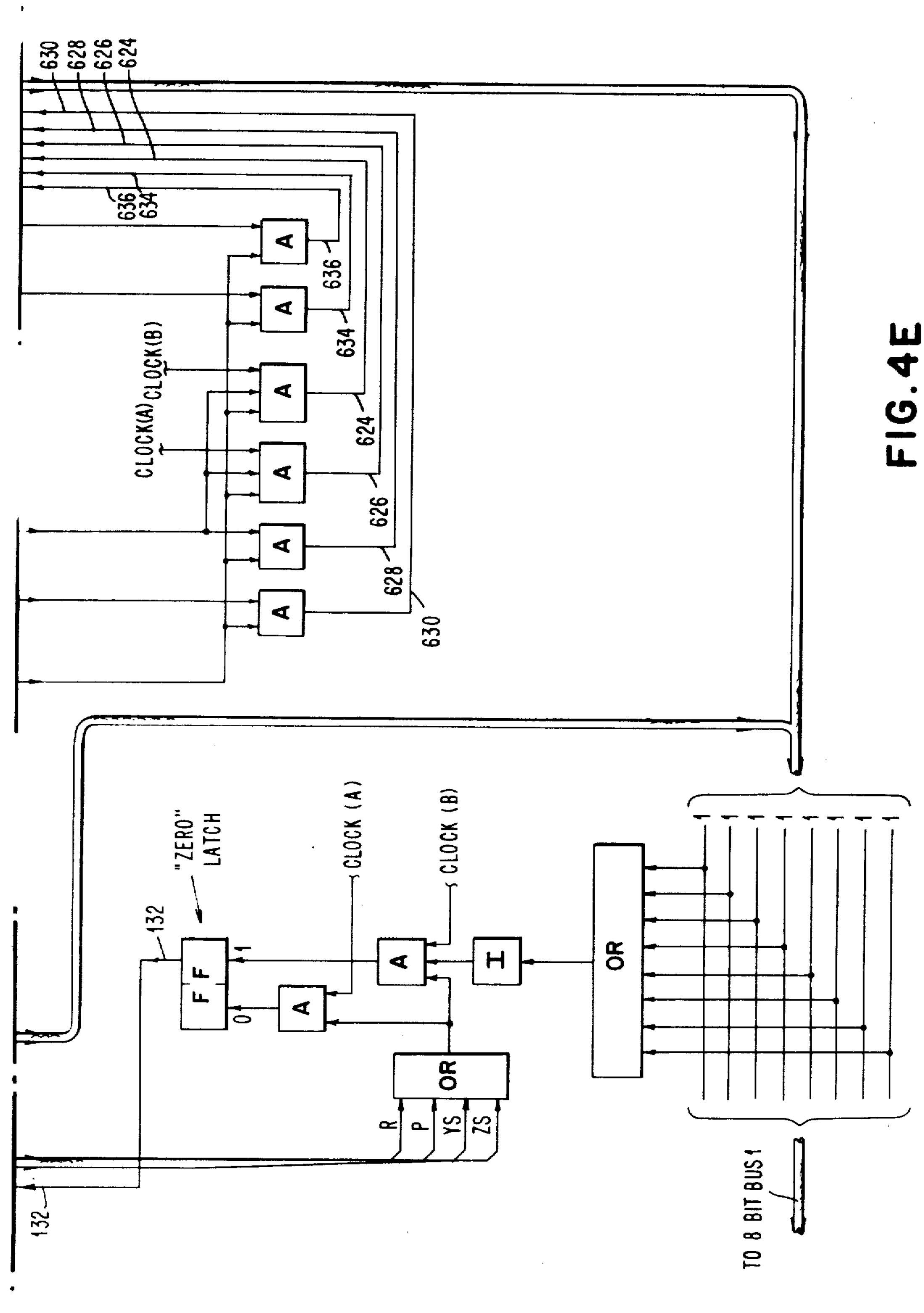

The processing unit, FIG. 4, can receive information from the 4 bit bus 00 and the 4 bit bus 01. It can transmit information to the 8 bit bus 1.

The $\mu$ instruction and local store unit shown on FIG. 2 can receive information from the 4 bit bus 00 or from the 4 bit bus 01. It can either receive or transmit information over the 8 bit bus 0 and the 8 bit bus 1.

The main and auxiliary store unit shown on FIG. 11 can receive information from the 8 bit bus 0 and the 8 bit bus 1. It can also transmit information to the 8 bit bus 0 and the 8 bit bus 1.

Figure 12A:
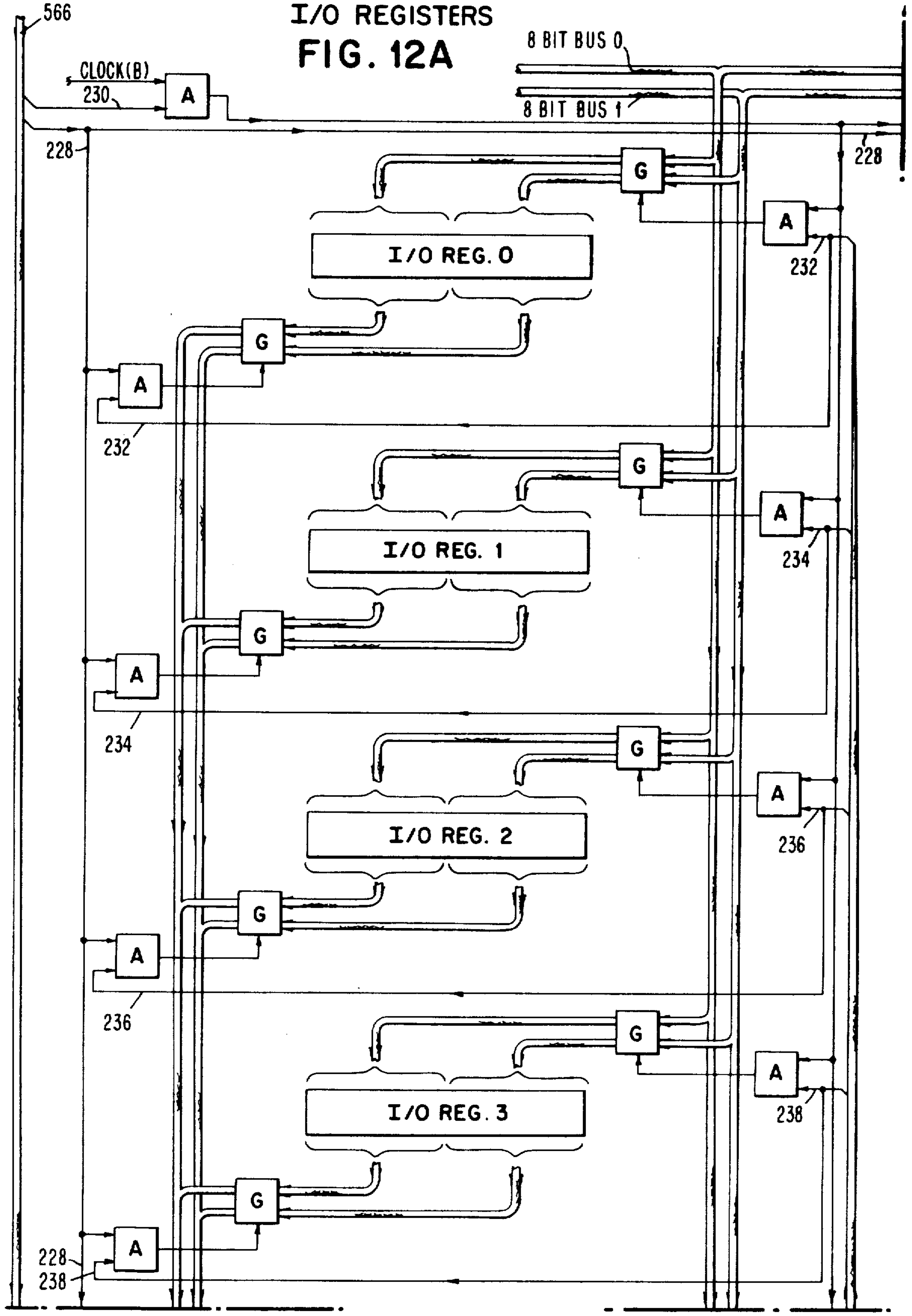
FIGS. 12A–12H comprise a composite logical schematic and functional diagram of the block marked I/O Registers on FIG. 1A.
Figure 12B:
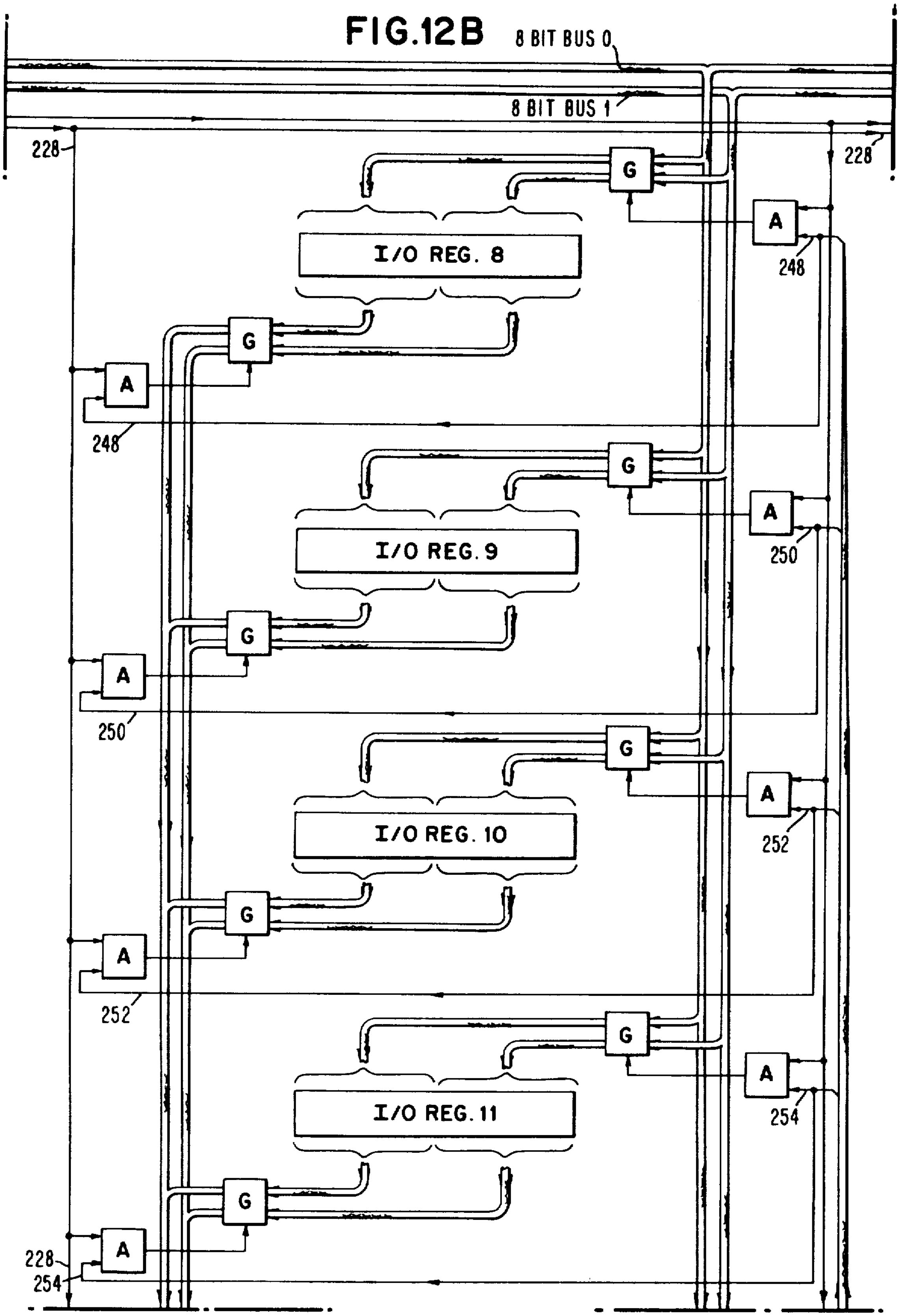
Figure 12C:
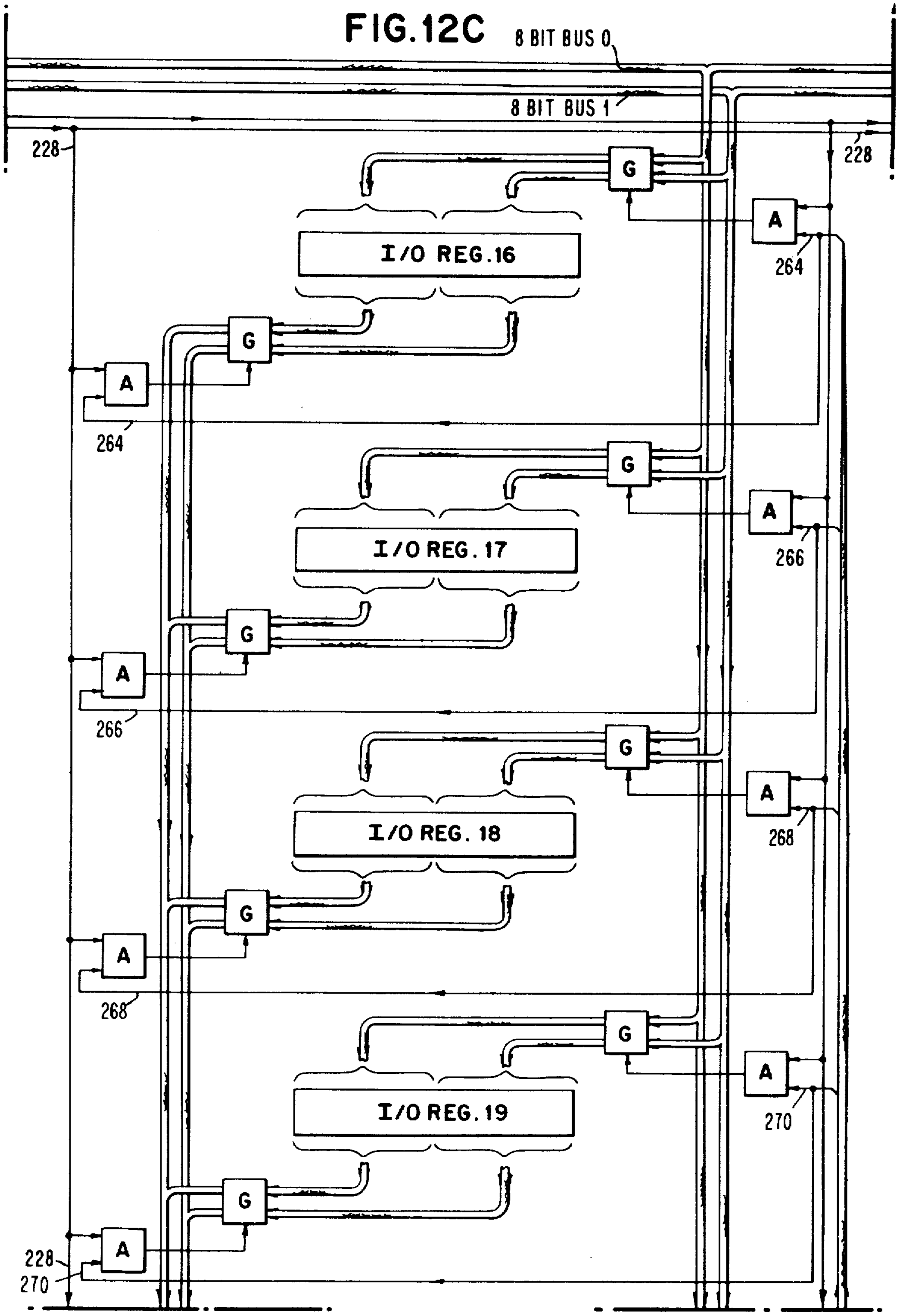
Figure 12D:
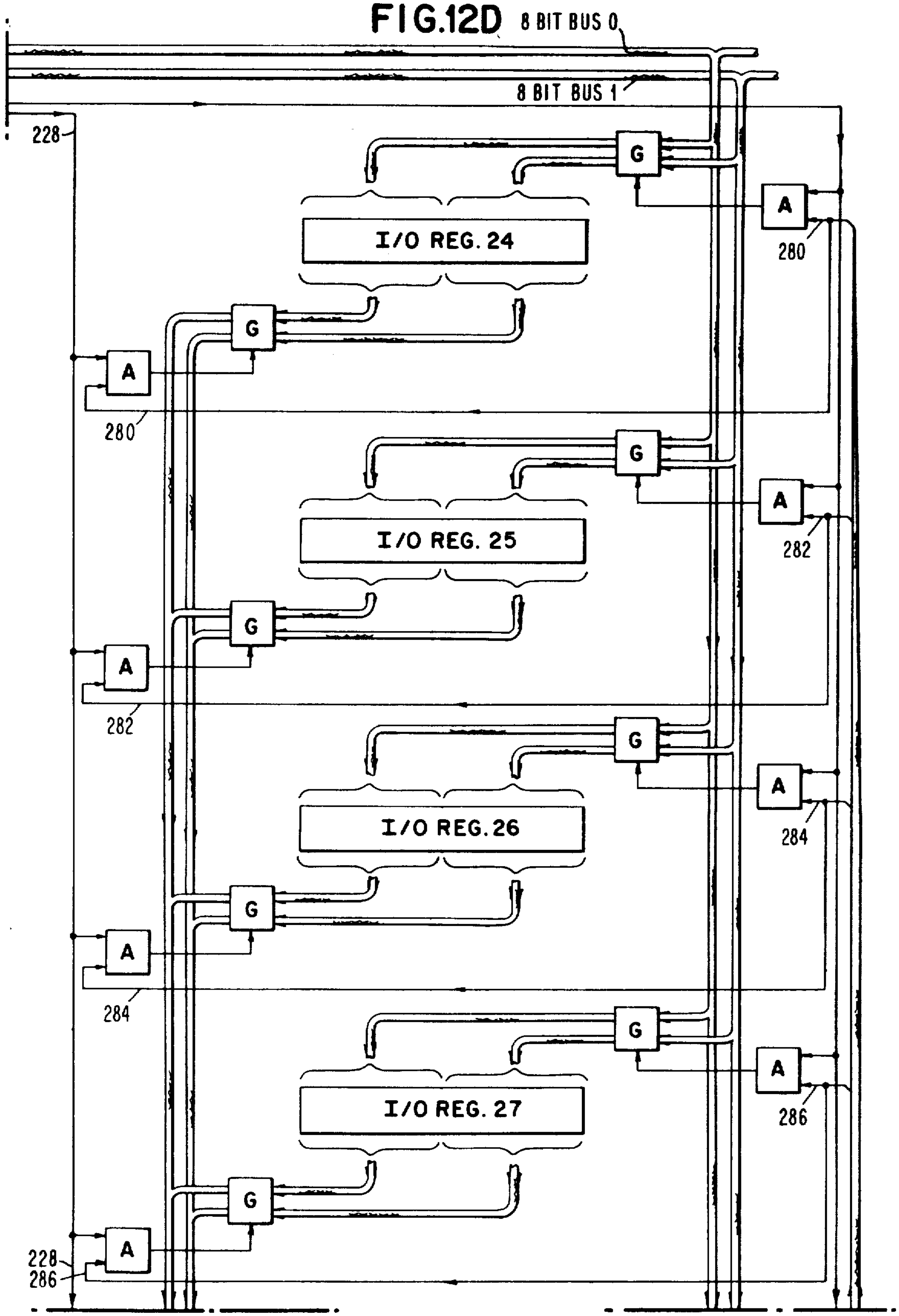
Figure 12E:
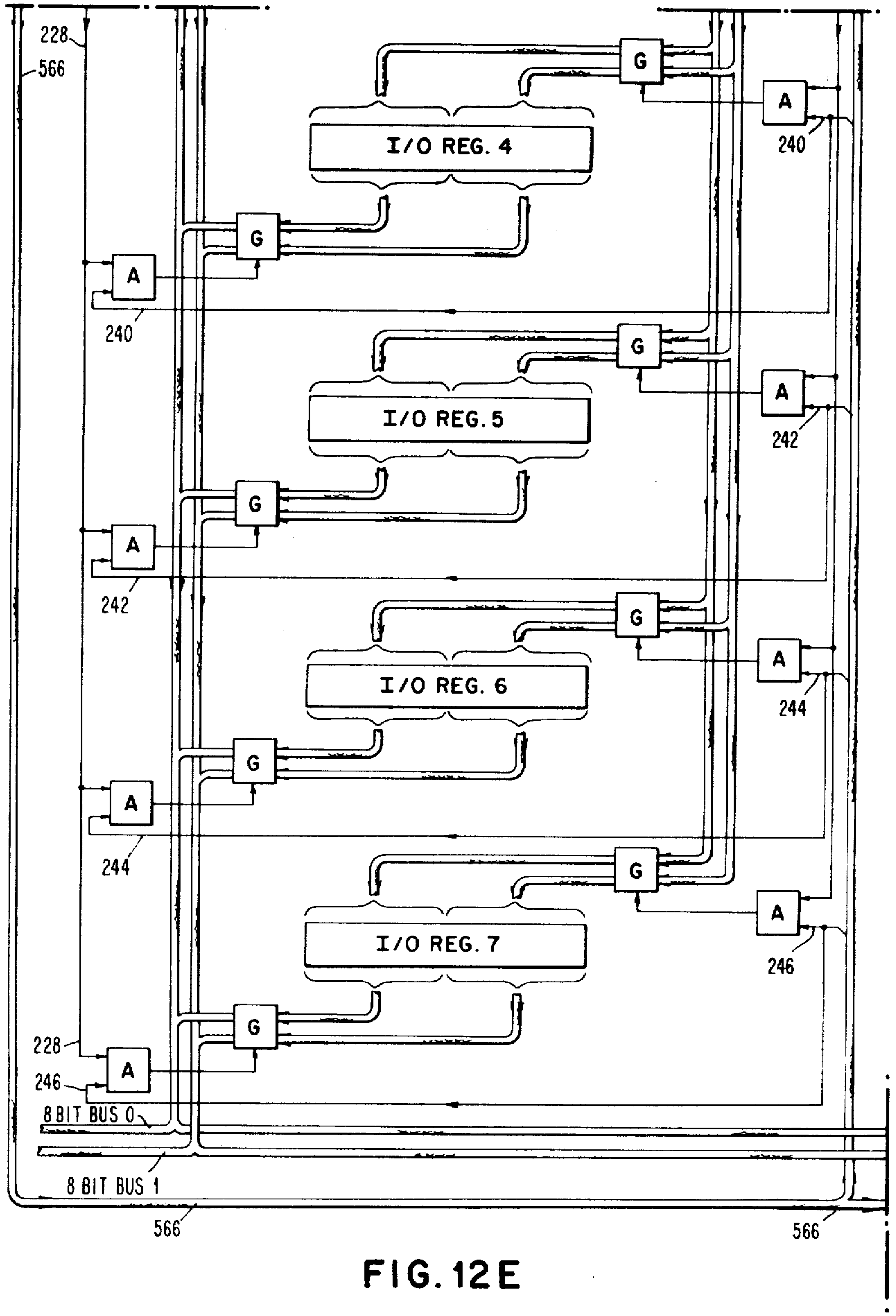
Figure 12F:
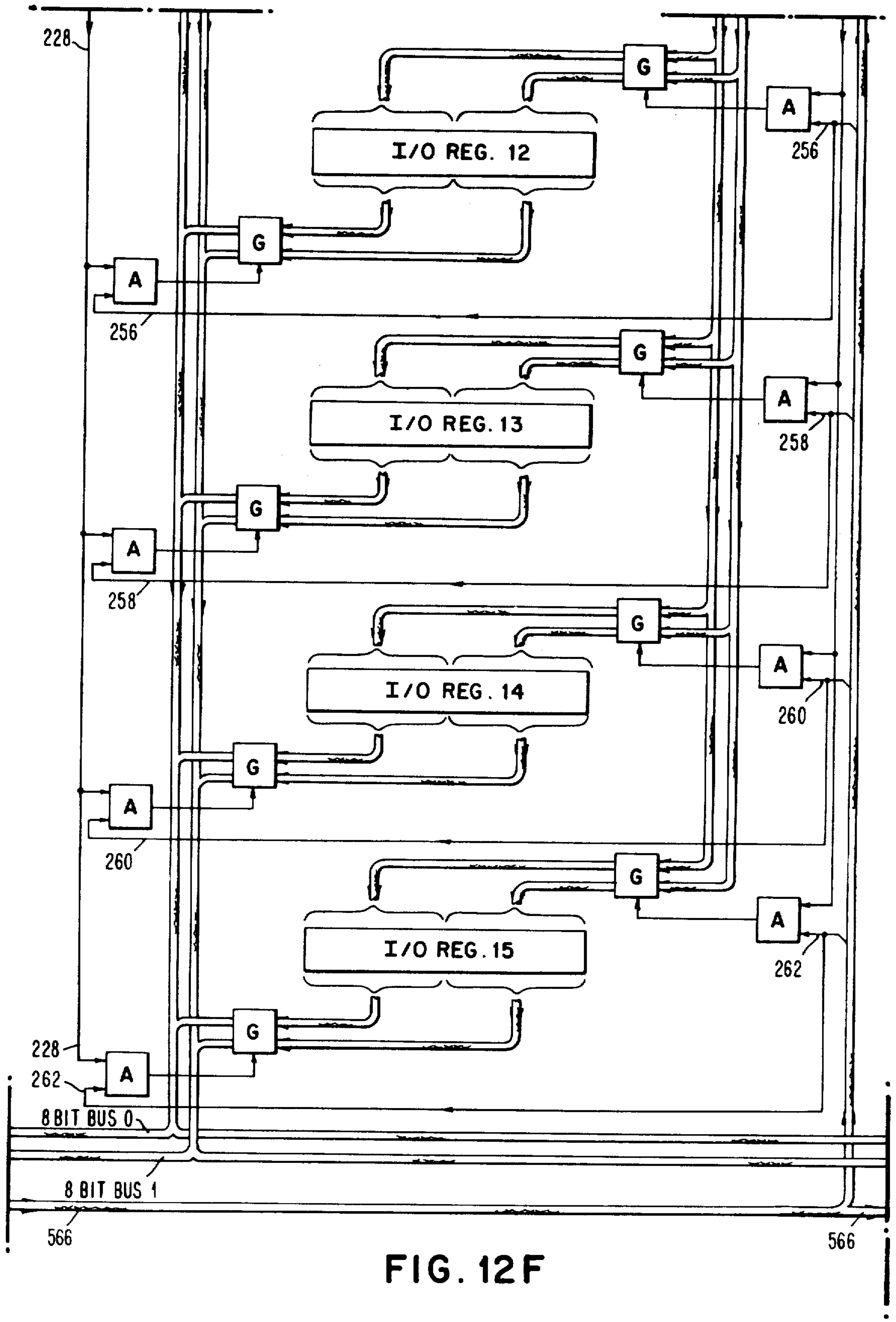
Figure 12G:
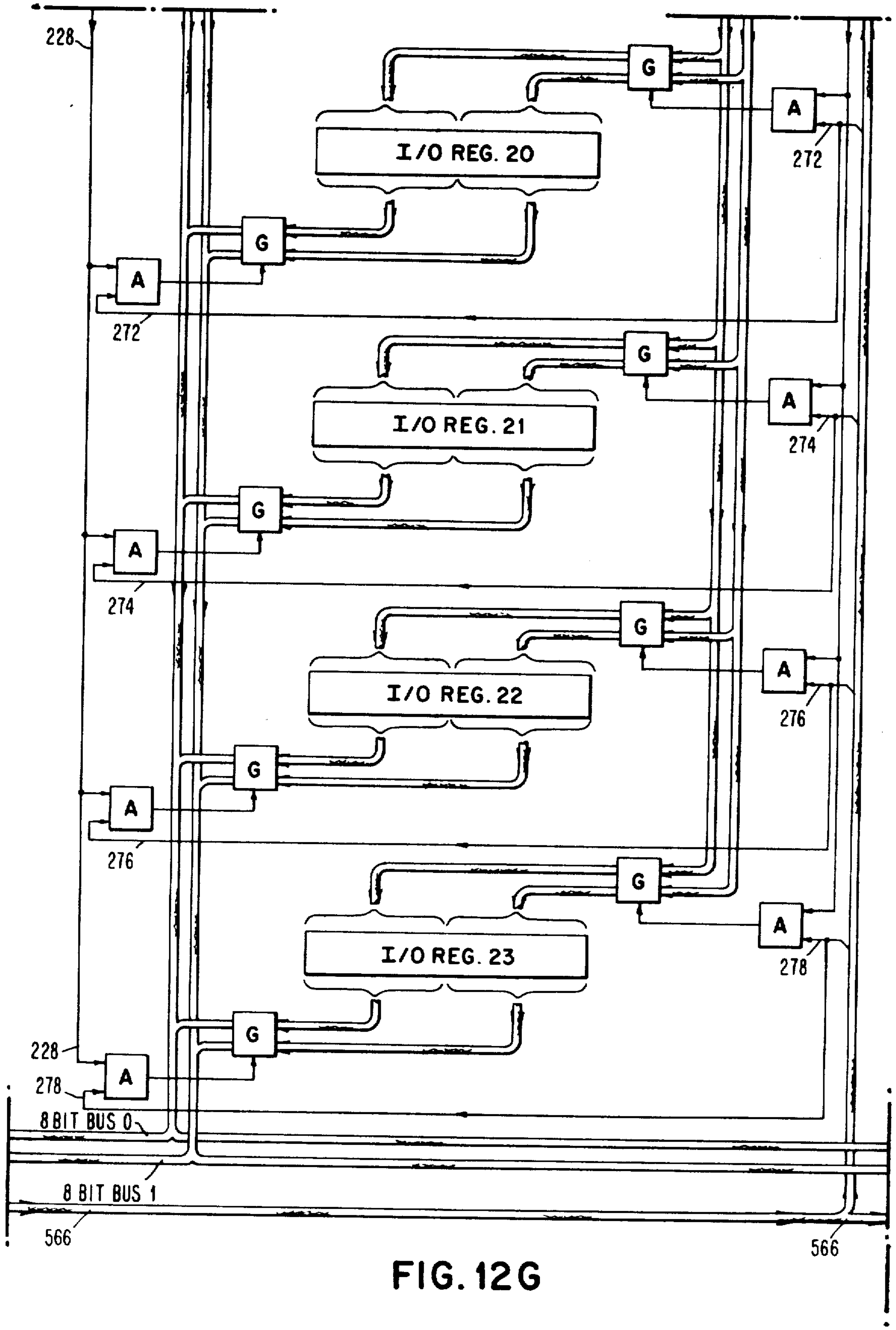
Figures 12, 12H:
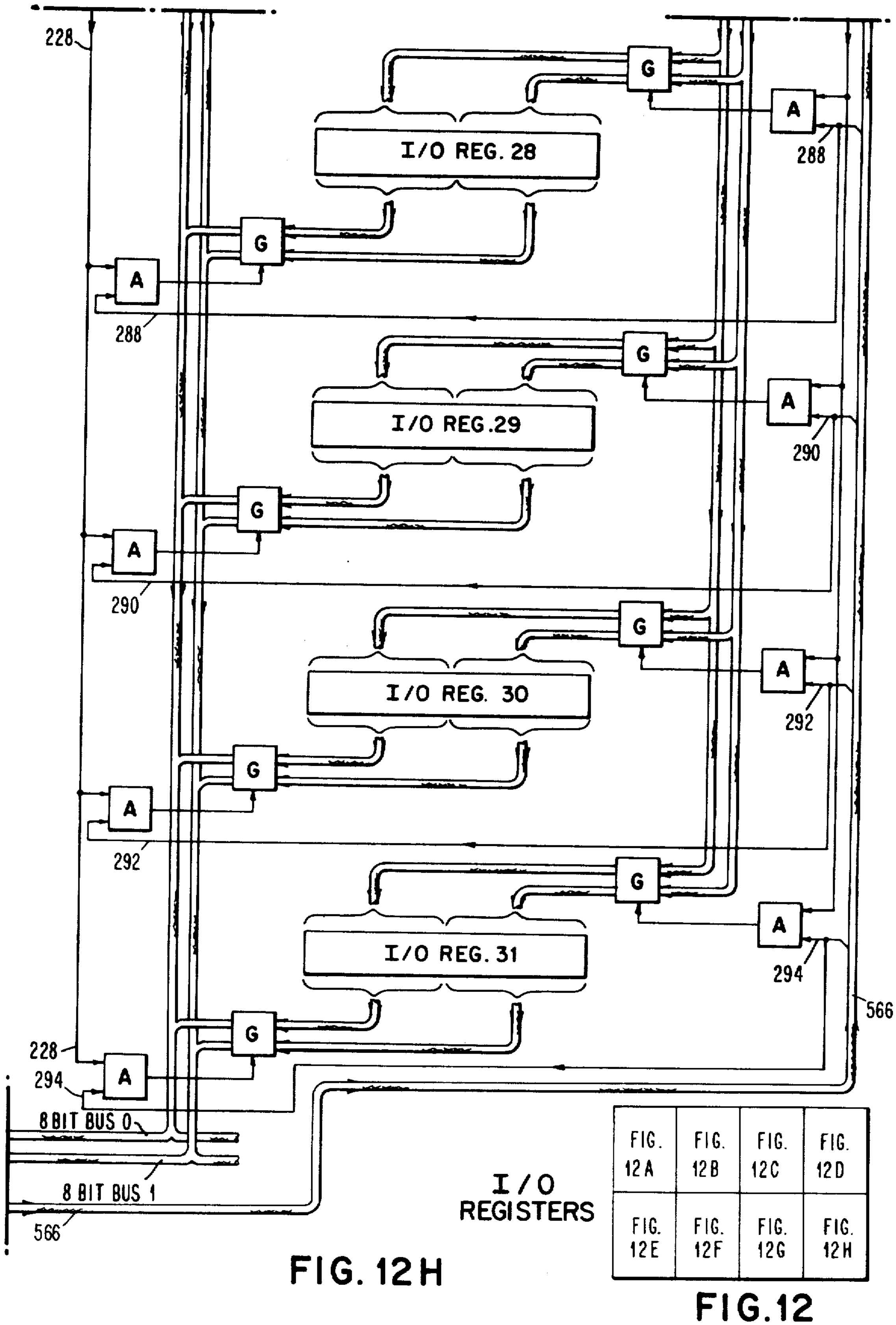
FIG. 12 is an organizational drawing of FIGS. 12A through 12H.

The I/O registers shown on FIG. 12 can receive information from the 8 bit bus 0 and the 8 bit bus 1. They can also transmit information to the 8 bit bus 0 and the 8 bit bus 1.

Figure 13:
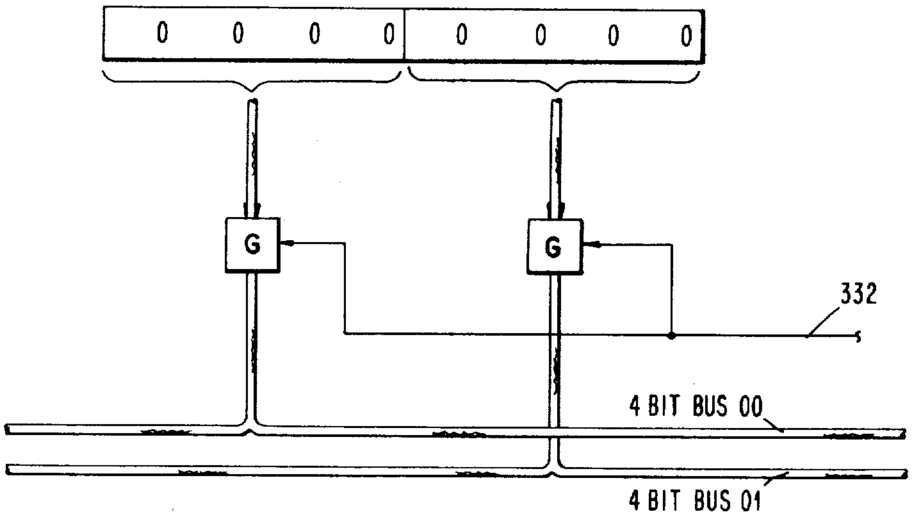
FIG. 13 comprises a logical schematic diagram of the block marked Q Source Register on FIG. 1A.

The Q source register shown on FIG. 13 can transmit information to the 4 bit bus 00 and the 4 bit bus 01.

Figures 14, 14A:
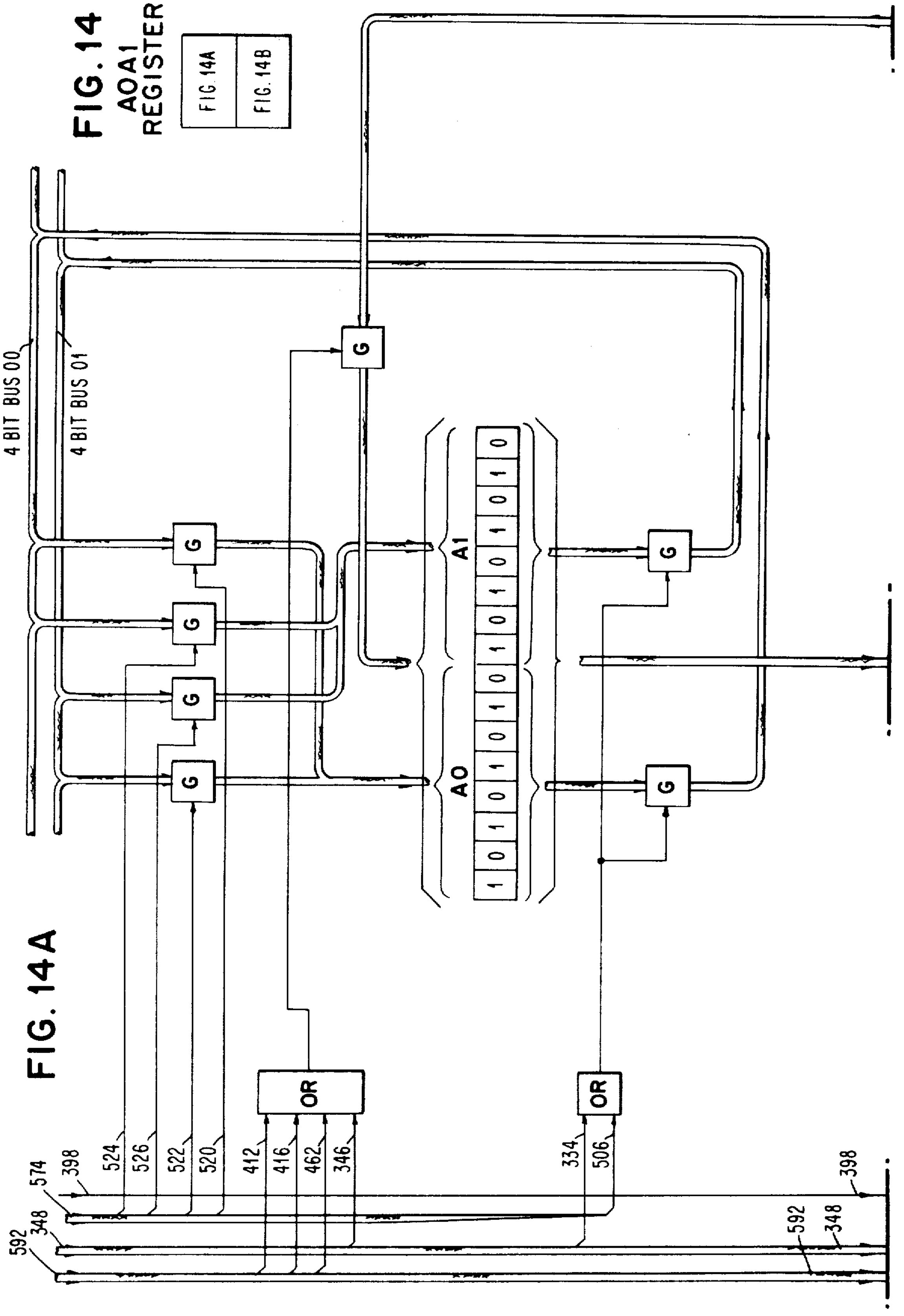
FIG. 14 is an organizational drawing of FIGS. 14A and 14B.
FIGS. 14A and 14B comprise a composite logical schematic diagram of the block marked A0A1 Register on FIG. 1A.
Figure 14B:
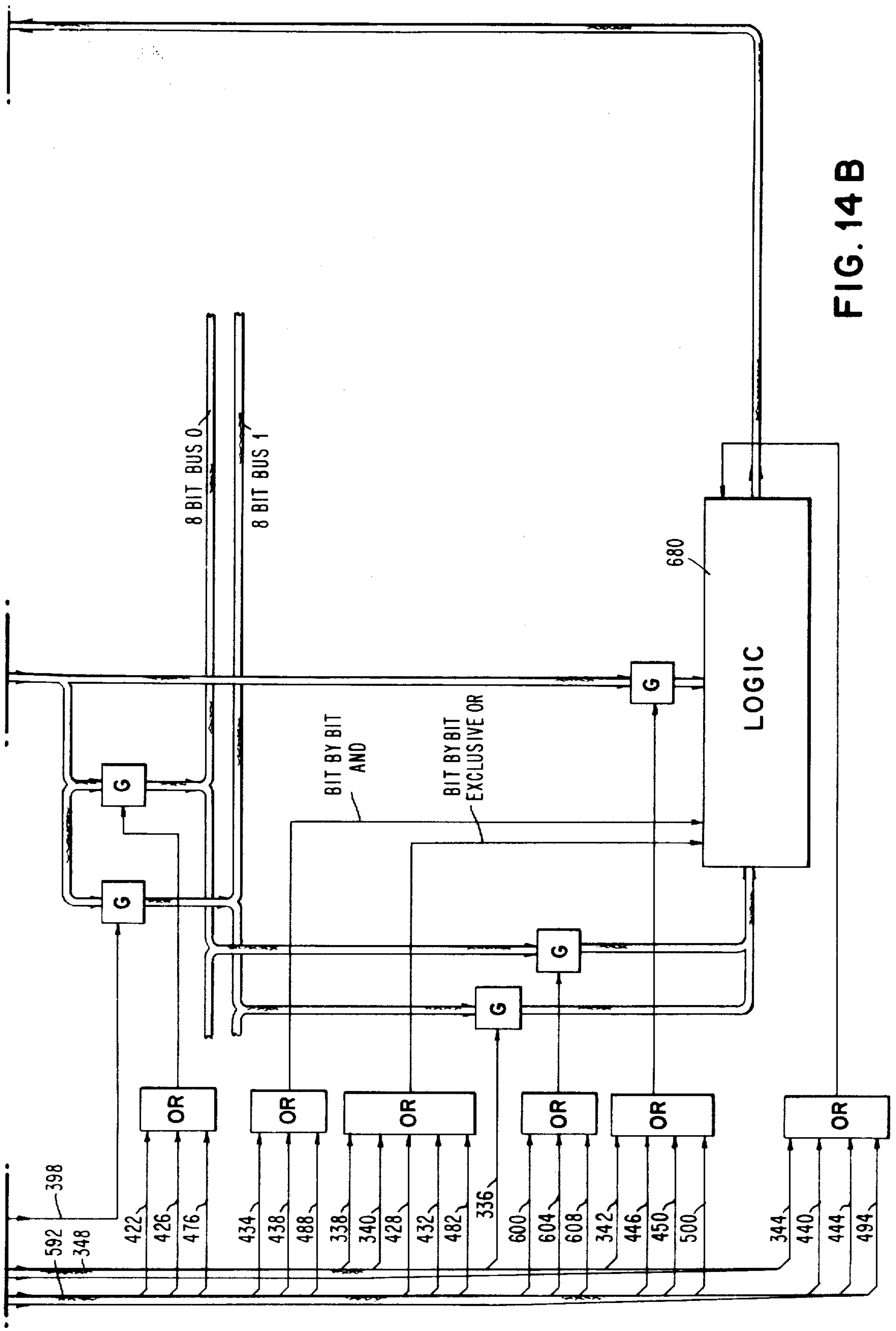

The AOA1 register shown on FIG. 14 can receive information from the 4 bit bus 00, the 4 bit bus 01, the 8 bit bus 0 and the 8 bit bus 1. It can also transmit information to the 4 bit bus 00, the 4 bit bus 01, the 8 bit bus 0 and the 8 bit bus 1.

Figures 15, 15A:
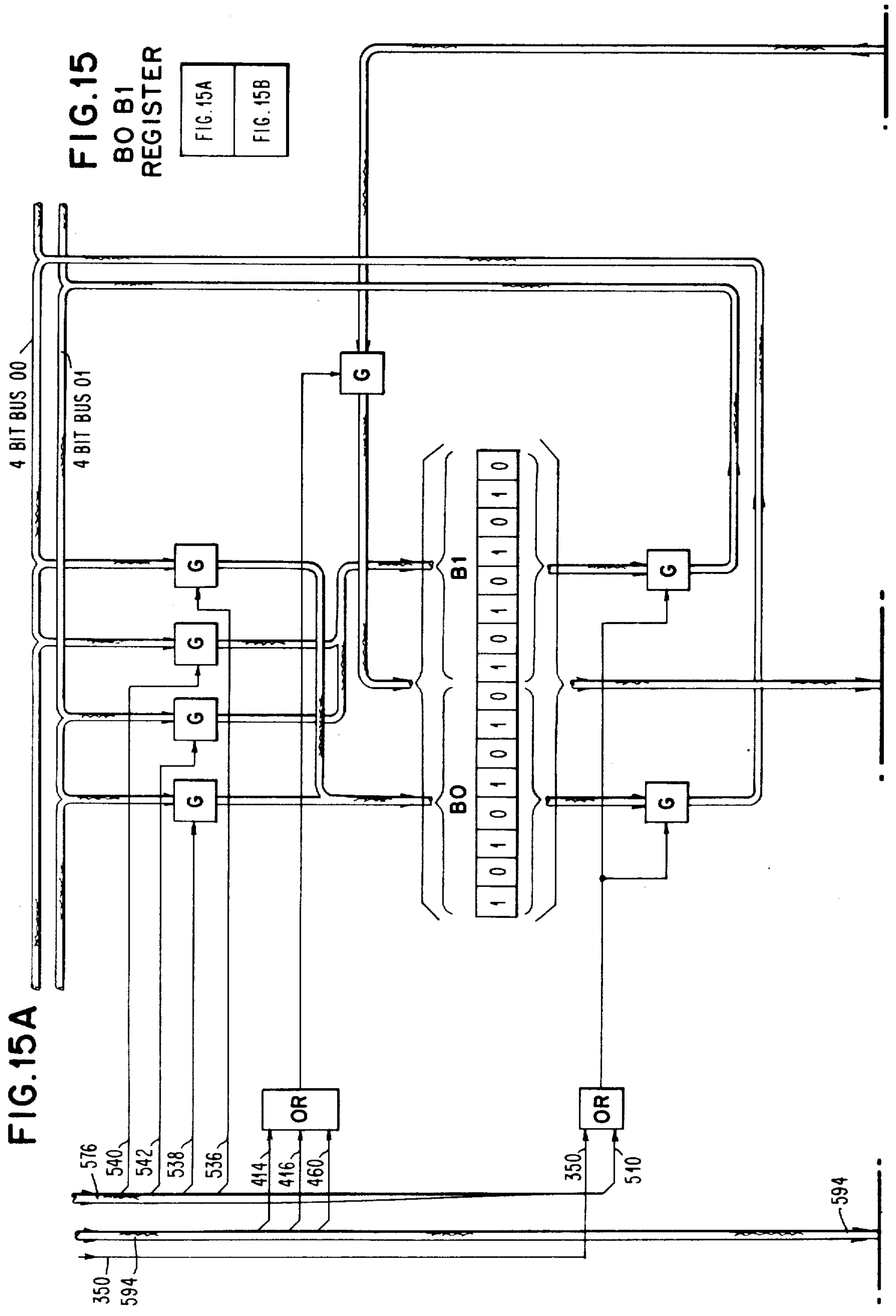
FIG. 15 is an organizational drawing of FIGS. 15A and 15B.
FIGS. 15A and 15B comprise a composite logical schematic diagram of the block marked B0B1 Register on FIG. 1A.
Figure 15B:
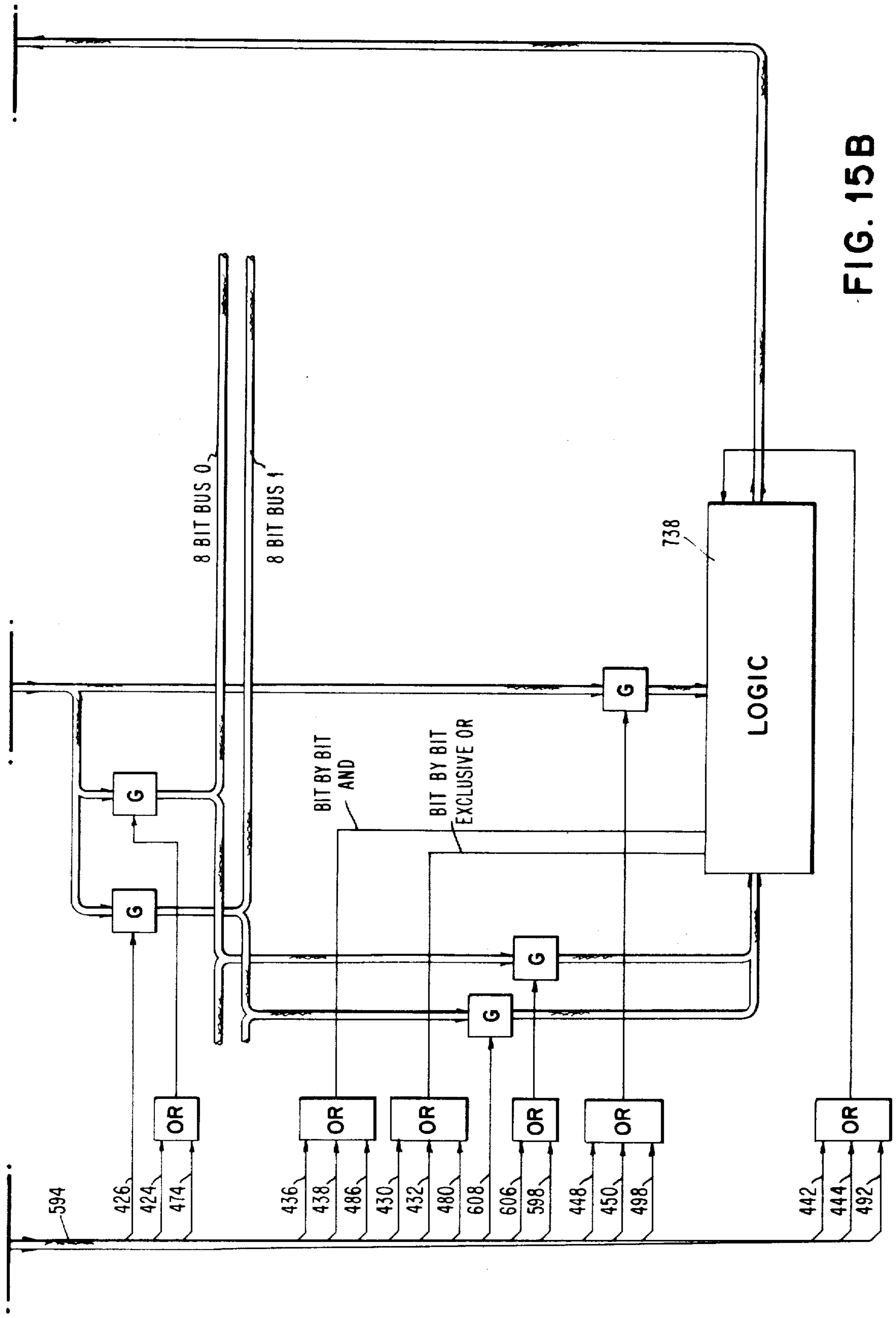

The BOB1 register shown on FIG. 15 can receive information from the 4 bit bus 00, the 4 bit bus 01, the 8 bit bus 0 and the 8 bit bus 1. It can also transmit information to the 4 bit bus 00, the 4 bit bus 01, the 8 bit bus 0 and the 8 bit bus 1.

Figures 16, 16A:
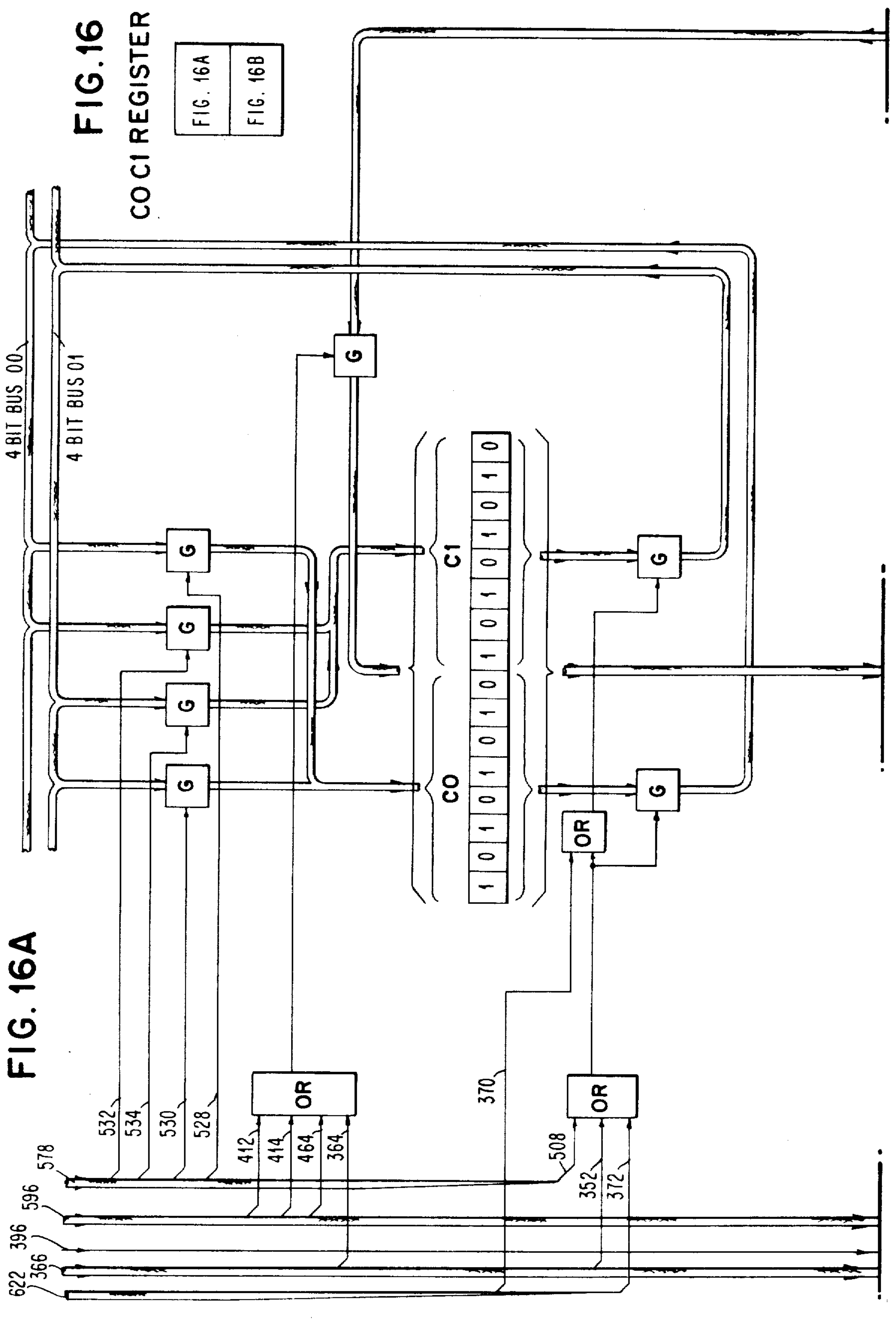
FIG. 16 is an organizational drawing for FIGS. 16A and 16B.
FIGS. 16A and 16B comprise a composite logical schematic diagram of the block marked C0C1 Register on FIG. 1A.
Figure 16B:
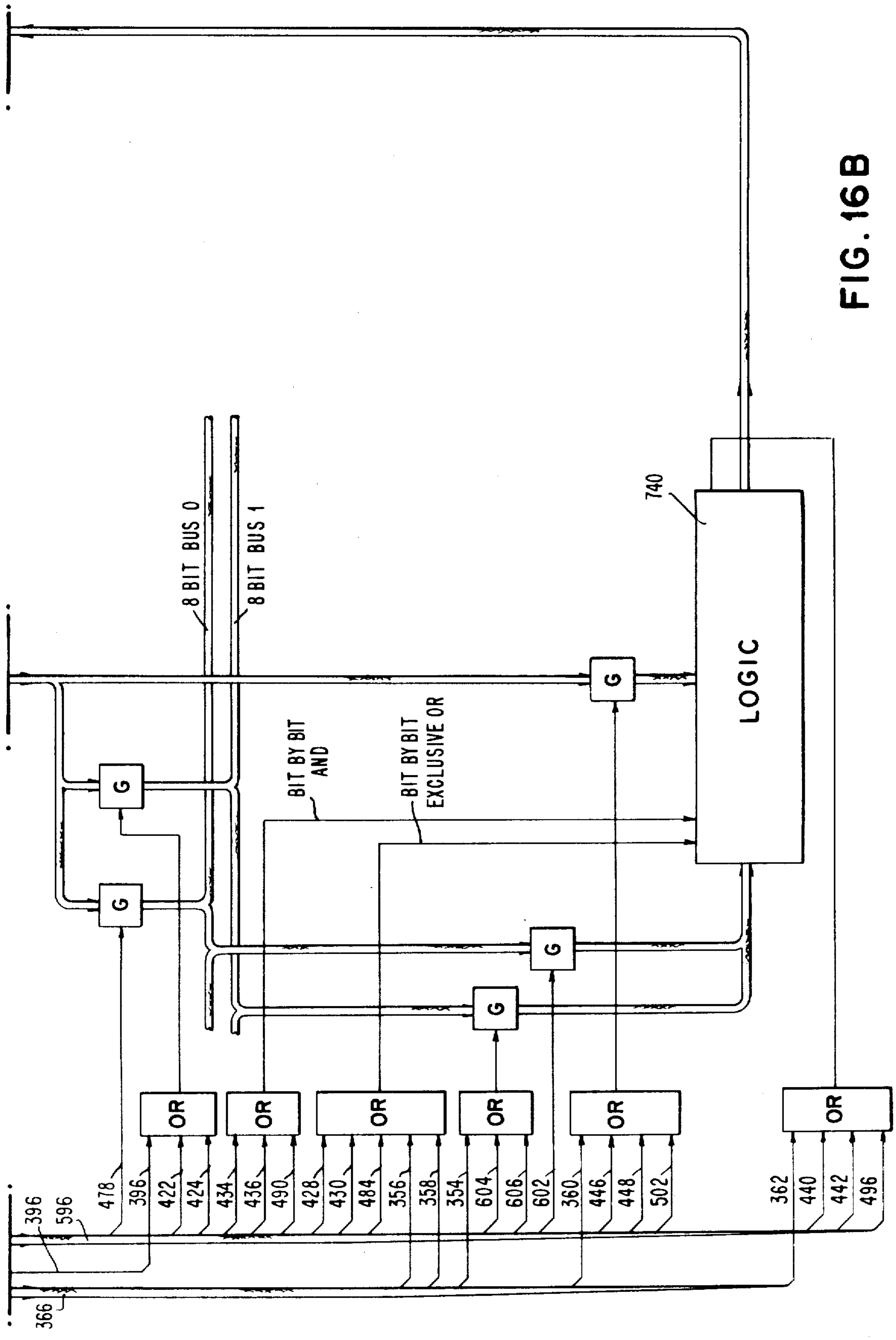

The COC1 register shown on FIG. 16 can receive information from the 4 bit bus 00, the 4 bit bus 01, the 8 bit bus 0 and the 8 bit bus 1. It can also transmit information to the 4 bit bus 00, the 4 bit bus 01, the 8 bit bus 0 and the 8 bit bus 1.

Figure 17:
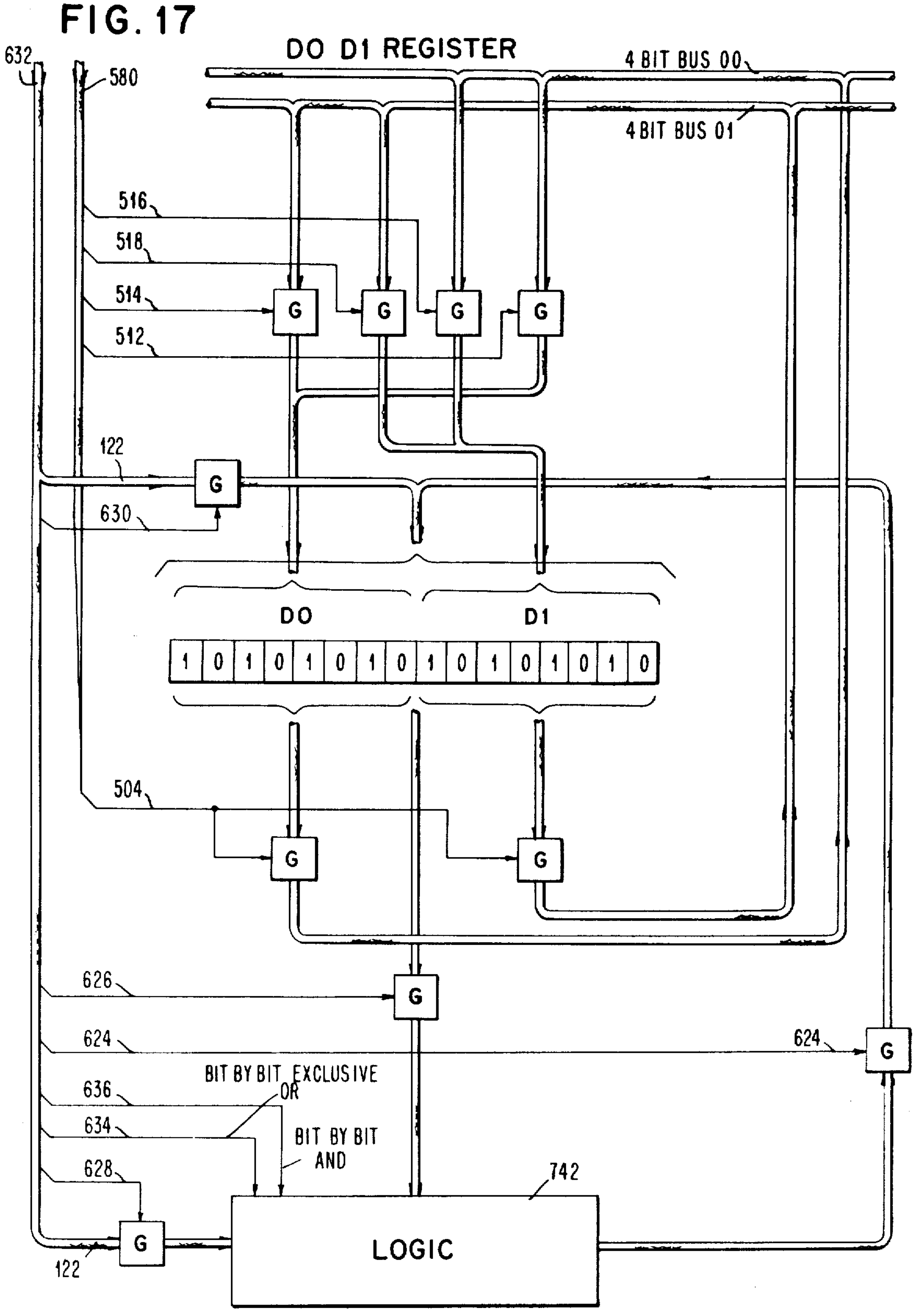
FIG. 17 comprises a composite logical schematic diagram of the block marked D0D1 Register on FIG. 1A.

The DOD1 register shown on FIG. 17 can receive information from the 4 bit bus 00, and 4 bit bus 01. It can also transmit information to the 4 bit bus 00 and the 4 bit bus 01.

μ INSTRUCTION AND LOCAL STORE (FIG. 2)

This unit is the control portion of the machine and will be described generally as follows. A more detailed description of the various circuits will appear in connection with the description of the various instructions and their executions. This unit operates on every cycle either to load an instruction into the μ instruction control register 640 near the bottom of FIG. 2 or to write the information contained in the "L0L1" register 642 into the "local store" portion of the store or to read a word from the local store into the "L0L1" register 642.

The storage unit itself is divided up into eight boxes labelled "storage box No. 0" through "storage box No. 7". Each storage box is addressable by the low order 13 bits contained in the address assembly register 644. This means that each storage box has a capacity of 8192 words. The particular storage box is selected by the three high order bits contained in the address assembly register 644. For example, if these three bits are 000, storage box No. 0 will be addressed. If these three bits are 001, storage box No. 1 will be addressed. If these three bits are 111, a storage box No. 7 will be addressed. Storage boxes No. 1–No. 7 contain the μ instructions. Storage box No. 0 is reserved for the local store. The same address assembly register 644 is used both for the local store data contained in storage box No. 0 and for the μ instruction store contained in boxes 1–7. A separate data register 642 is used for the local store information contained in storage box No. 0 and this local store is capable of either a read access or a write access. The data register for storage boxes No. 1–7 is called the "μ instruction control register" 640, and the μ instruction store which, as explained before is contained in storage boxes 1–7, is a read only store.

It should be understood that although, in the present embodiment, the μ instruction store which is contained in Storages Boxes 1–7 is shown as a read only store, it could also be a read-write store. In other words, information could be transferred from the Main Store to the LOL1 register and from there stored into the μ instruction store. This procedure would be followed if it were desired to change the μ instruction. However, it is believed that such procedures are well known. For the sake of simplicity in the present embodiment they have been omitted.

In the same cycle, either the μ instruction store or the local store can be accessed. Both cannot be accessed in the same cycle. As will be explained in more detail later, a μ instruction store cycle may be followed by a local store cycle and the local store cycle may be caused by an instruction in the previous cycle which appeared in the μ instruction store register 640.

Figure 19:
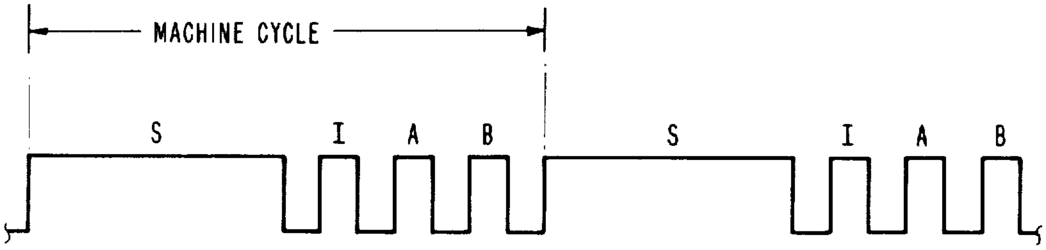
FIG. 19 is a timing diagram of the essential timing clock for the present invention.

Referring to the timing chart (FIG. 19) the S pulse is used to access either the local store or the μ instruction store. On FIG. 2, it will be noted that the μ access flip-flop 646 determines which store will be accessed by the S clock pulse. If flip-flop 646 is in its "1" state, the S clock pulse, which is applied on wire 648, will pass through AND circuit 650 to line 652 which extends to storage boxes 1–7 as a "read" access. If flip-flop 646 is in its "0" state, the S pulse on wire 648 will pass through AND circuit 654 and be presented to both AND circuits 656 and 658. AND circuits 656 and 658 are controlled by the "L" access flip-flop 650. If flip-flop 660 is in its "1" state, AND circuit 658 will be enabled in order to provide a "read" access of the local store. If the flip-flop is in its "0" state, AND circuit 656 will be enabled in order to provide a "write" access of the local store. It will be noted that flip-flop 646 is set to "1" every cycle by the A clock pulse. It can be said that flip-flop 646 is normally in its "" state and is only turned to its "0" state for one cycle. After this one cycle, flip-flop 646 reverts back to its "1" state. It will also be noted that when flip-flop 646 is set to its "0" state by the pulse on wire 662, that a branch circuit exists via wire 664 which extends through the DELAY unit 656 to reset the μ instruction control register 640 to all zero's. The purpose of this is to render the μ instruction control register 640 ineffective during a local store cycle.

It will be noted that the address assembly register 644 is capable of being incremented by the I clock pulse which appears on wire 668. The purpose of the incrementing is to call out μ instructions in sequence. If the read/write fast store decoder unit shown on FIG. 6 calls for a local store operation on the next cycle, this incremented address in register 644 is stored in the HOLD register 676 for one cycle. In other words, the incremented address is first transferred to the HOLD register 676 and on the succeeding cycle, which is the local store cycle, the contents of the HOLD register 676 are transferred back to the address assembly register 644.

In the case of a "branch and link" instruction, which would be decoded by the BZD, BZM decoder shown on FIG. 5, it is also necessary to store the incremented address which is in register 644 in order to return to it at some later time. In this case, the incremented address is stored in the 0 position of the local store on the cycle succeeding the decoding of the branch instruction. A "return from branch" instruction would be decoded by the decoder shown on FIG. 9. On the cycle after the return instruction is decoded, the local store is accessed and the incremented address, which is located in position 0 of the local store is transferred back to the address assembly register 644. The seven output cables at the bottom of FIG. 2 extend to the seven decoders shown on the block diagram of FIG. 1A. These decoders will now be described in detail.

R, P, YS, ZS, DECODER

Figures 3, 3A:
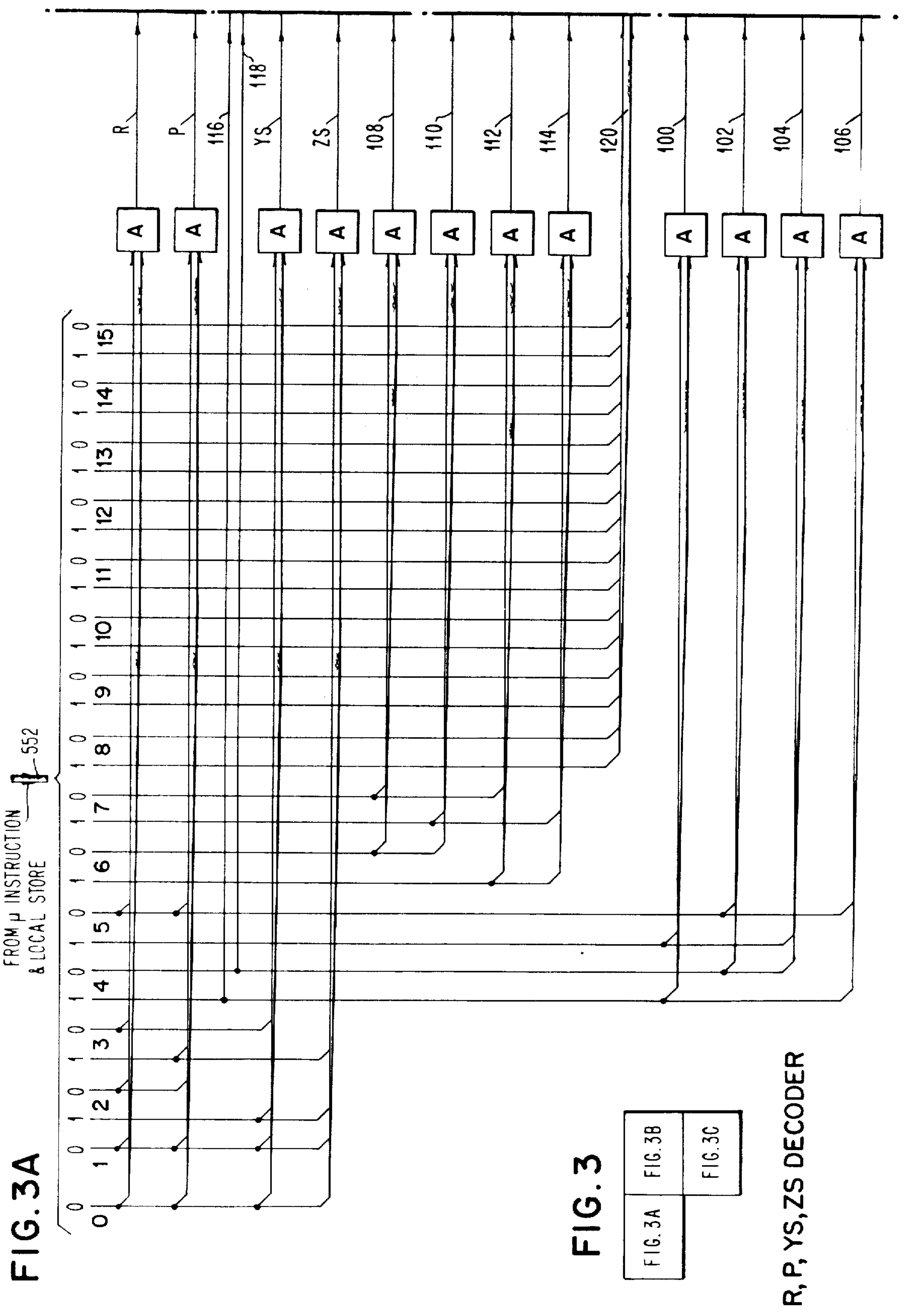
FIG. 3 is an organizational drawing for FIGS. 3A through 3C.
FIGS. 3A–3C comprise a composite logical schematic diagram of the block marked R, P, YS, ZS decoder on FIG. 1A.
Figure 3B:
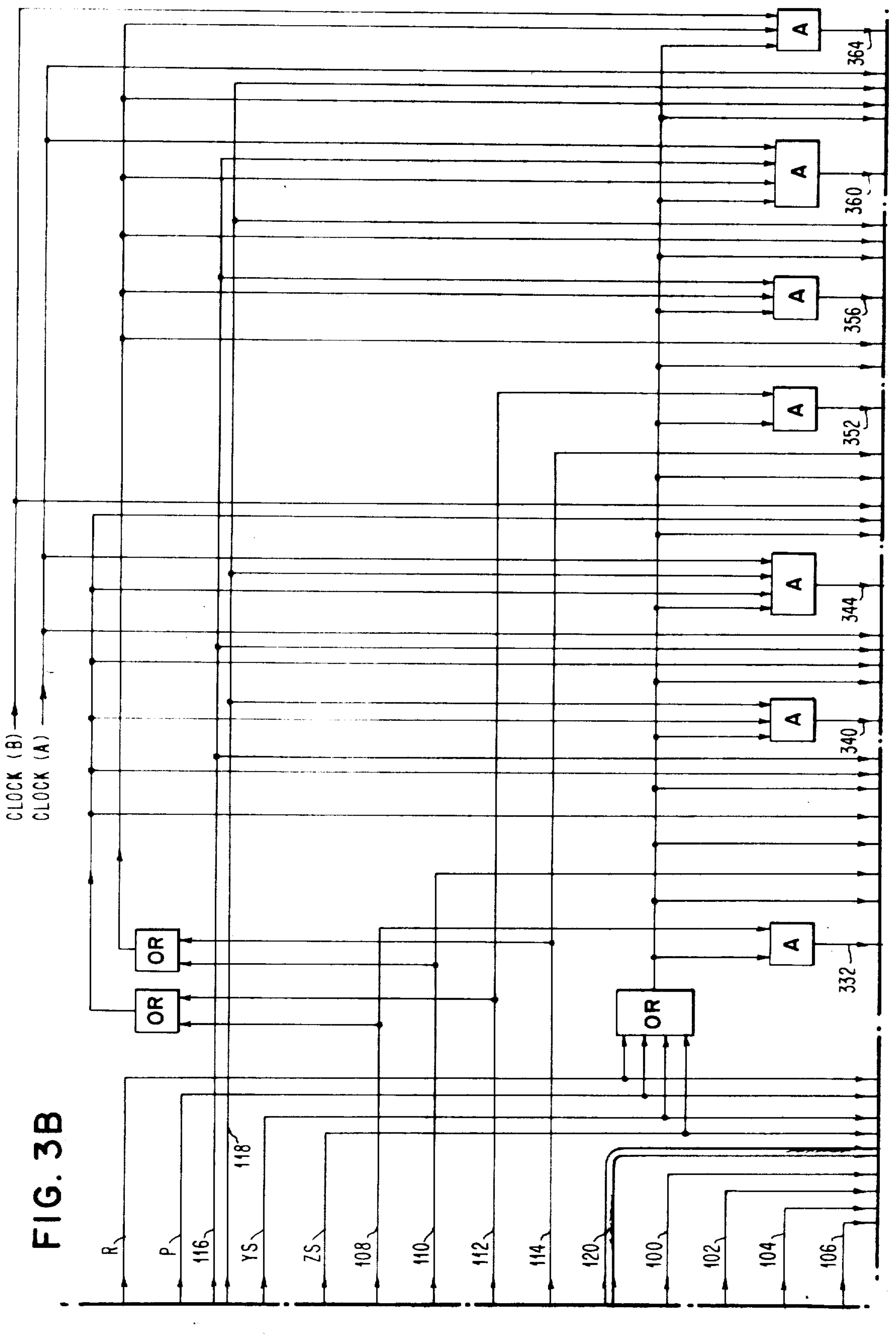
Figure 3C:
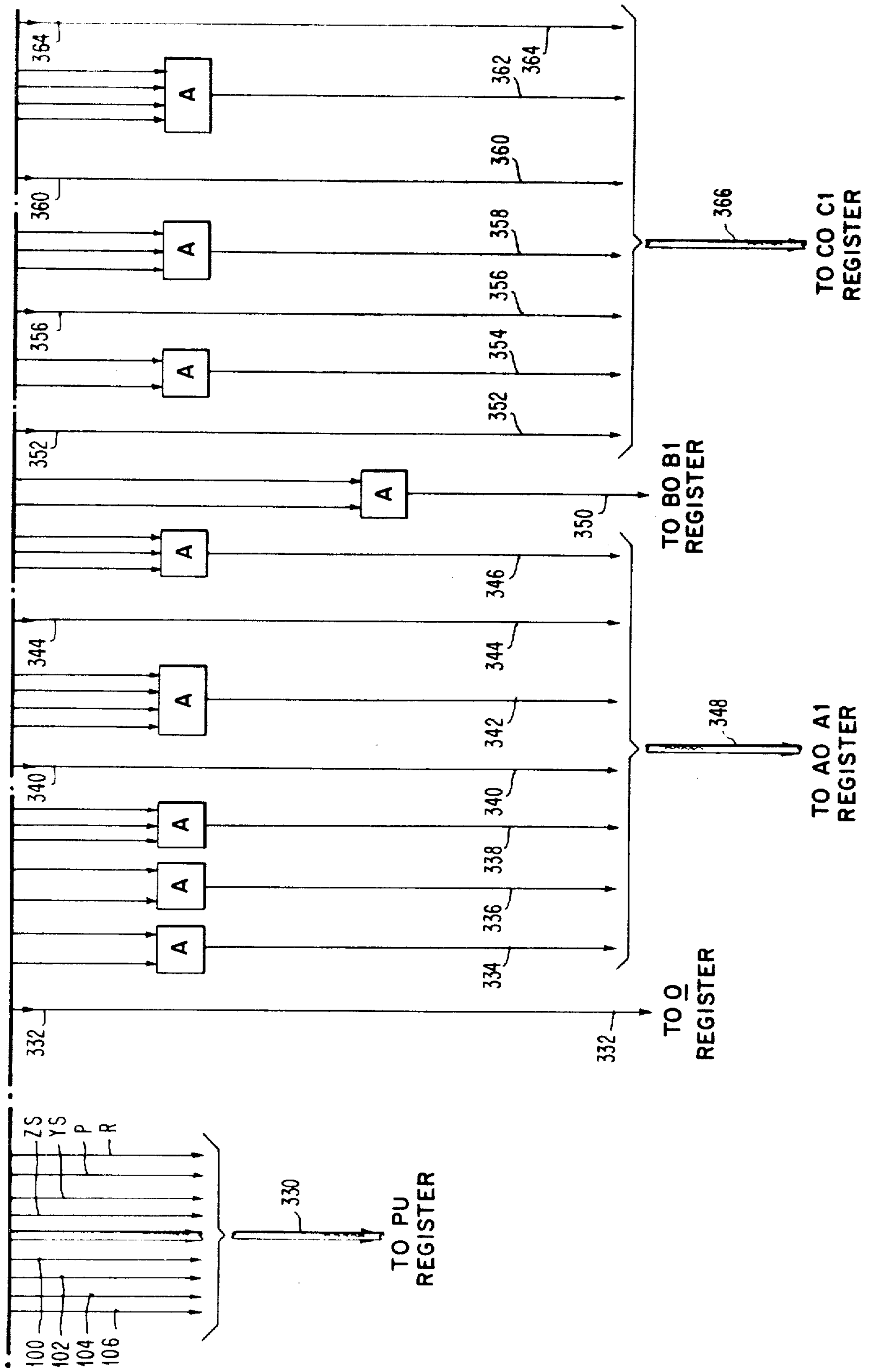

Reference should now be made to FIG. 3. On FIG. 3, if the bits coming in on cable 552 numbered 0, 1, 2, 3 and 5 are all "0", the line labelled R will be active. This means that an "R" instruction has been decoded. If the bits numbered 0, 1, and 2 are all zeros, bit No. 3 is a "1" and bit No. 5 is a "0", the line labelled P will be active which means that a P instruction has been decoded. If bit No. 4 is a "1", line 116 will be active and if bit No. 4 is a "0", line 118 will be active. If line 116 is active, it means that the contents of the destination register will be replaced with the contents of the destination register exclusively ORed with the result. If line 118 is active, it means that the contents of the destination register will be overwritten with the result. The manner in which this is done will be understood later when the source and destination registers are described in detail.

If, on FIG. 3, the number 0 bit is a "0", the number 1 bit is a "0", the number 2 bit is a "1", and the number 3 bit is a "0", a YS instruction will be decoded which means that the line labelled YS will be active. If the number 0 bit is a "0", the number 1 bit is a "0", the number 2 bit is a "1" and the number 3 bit is a "1", a ZS instruction will be decoded which means that the line labelled ZS will be active.

The manner in which the source and destination registers for the R, P, YS, and the ZS instructions are selected will next be described. If the number 6 bit is a "0", and the number 7 bit is a "0", line 108 will be active which means that the source is the Q register and the destination is the AOA1 register. If the number 6 bit is a "0" and the number 7 bit is a "1", line 110 will be active which means that the source register is AOA1 and the destination register is COC1. If the number 6 bit is a "1", and the number 7 bit is a "0", line 112 will be active which means that the source register is COC1 and the destination register is AOA1. If the number 6 bit is a "1" and the number 7 bit is a "1", line 114 will be active which means that the source register is BOB1 and the destination register is COC1.

Cable 120 (FIG. 3) contains the right most eight bits that are present in the μ instruction control register. In the case of the R, P, YS, and the ZS instructions, these eight bits are known as the "mask".

In addition to the normal source and destination registers which, as explained before, are selected by the lines 108 through 114 inclusive, there are certain operations which can be performed in the DOD1 register block under certain conditions. The normal source and destination registers are the same for all of the R, P, YS, and ZS instructions. The wires 100–106 are used only in the case of a YS instruction or a ZS instruction. Wire 100 is active if the number 4 bit is a "1" and the number 5 bit is a "1". Wire 102 is active if the number 4 bit is a "0" and the number 5 bit is a "0". Wire 104 is active when the number 4 bit is a "0" and the number 5 bit is a "1". Wire 106 is active if the number 4 bit is a "" and the number 5 bit is a "0". On a YS instruction, the wires 100–106 inclusive can be effective if there is one or more "1's" in the source register. On a ZS instruction, the wires 100–106 inclusive are effective only if there are no "1's" in the source register. On FIG. 3, it will be noted that the wires described so far are contained in the cable 330 which extends to the processing unit shown on FIG. 4.

The cables 332, 348, 350 and 366 extend to the different source and destination registers used in connection with the R, P, YS, and ZS instructions. Before explaining the purpose of these wires, a register such as AOA1 will be first generally described.

Referring to FIG. 14, it will be noted that the AOA1 register is made up of two parts. The lefthand four bits is referred to as AO and the righthand four bits is referred to as A1. Associated with the AOA 1 register is the logic box labelled 680 near the bottom of FIG. 14. This logic box 680 will next be described.

Figure 18:
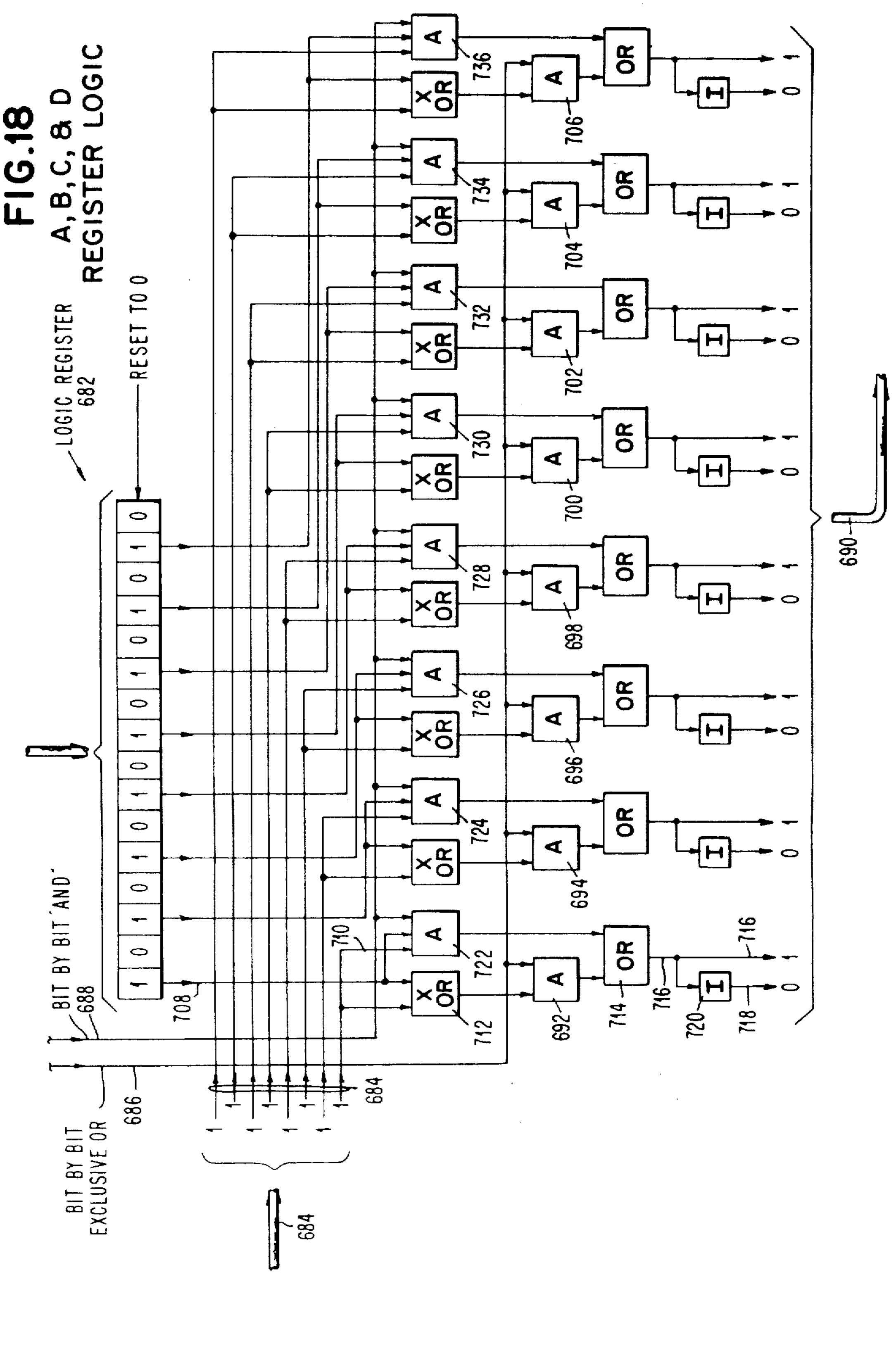
FIG. 18 comprises a logical schematic diagram of the blocks marked Logic and is designated on the figure as Logic Blocks A,B,C and D. This drawing comprises a logical schematic diagram of the circuitry included in said logic blocks.

Reference should now be made to FIG. 18. At the top of FIG. 18 is a register 682 which is known as the "logic register" and into which the contents of the register AOA1 can be gated. in other words, the contents of register AOA1 can be selectively transferred to the logic register 682. The logic register 682 is, thus, one input to the logic circuits which are in the box labelled 680 on FIG. 14. The other data inputs to the logic circuits are the eight wires labelled 684 at the left of FIG. 18. These wires 684 can come from either the 8 bit bus 0 or the 8 bit bus 1. On FIG. 18, two wires 686 and 688 are used to condition the logic circuit. If line 686 is active, the logic circuits are conditioned to form a bit by bit EXCLUSIVE OR. If wire 688 is active, the logic circuits are conditioned to form a bit by bit AND. The output wires of the logic circuit are the 16 lines labelled 609 on FIG. 18 and an inspection of FIG. 14 will show that these wires can be gated into register AOA1.

Referring to FIG. 18, if wire 686 is active, AND circuits 692 through 706 inclusive will be enabled. This will allow wire 708, which is the "1" output of the leftmost flip-flop of register 682 to be one input to the EXCLUSIVE OR circuit 712. The other input to the EXCLUSIVE OR circuit will be wire 710 which is the high order "1" bit of the bundle of wires generally represented by the reference character 684. The output of EXCLUSIVE OR circuit 712 is applied to AND circuit 692 which, if the EXCLUSIVE OR circuit 712 is satisfied, will have an output to the OR circuit 714. The output of OR circuit 714 appears on wire 716 and will be the "1" input to the leftmost flip-flop of register AOA1. The "0" input to the same flip-flop is generated by the inverter 720, the output of which appears on line 718. Thus, if one or the other of the inputs to the EXCLUSIVE OR circuit 712 is active, EXCLUSIVE OR circuit 712 will have an output which appears on wire 716. In this case there will be no output on wire 718.

If both inputs to EXCLUSIVE OR circuit 712 are present, EXCLUSIVE OR circuit. 712 will not have an output and wire 716 will not be active. In this case, wire 718 will be active which indicates a "0" output of the EXCLUSIVE OR circuit 712. If neither of the inputs to EXCLUSIVE OR circuit 712 are active, wire 716 again will be inactive and wire 718 will be active. The action for the other 7 bits in the logic circuits is exactly the same as just described for the leftmost bit and can easily be understood by an inspection of FIG. 18.

To perform a bit by bit AND Operation, wire 688 must be active. The active condition of wire 688 will enable the AND circuits 722 through 736 inclusive. Under these circumstances, wire 708 on FIG. 18 will furnish one input to the AND circuit 722 and wire 710 will furnish the other input to AND circuit 722. The output of AND circuit 722 extends through the OR circuit 714 and will appear on wire 716. If there is no output on wire 716, wire 718 will have an output. If both inputs to AND circuit 722 are present, wire 716 will be active and wire 718 will be inactive. If only one or no input to AND circuit 722 is active, wire 716 will be inactive and wire 718 will be active.

There are three different operations which can be performed by the logic shown on FIG. 18. The data coming in on wires 684 can be bit by bit EXCLUSIVELY ORed with the contents of the register AOA1and the result placed back in register AOA1. The data coming in on wire 684 can be bit by bit ANDed with the contents of register AOA1 and the result of the ANDing put back in register AOA1. Finally, the data on line 684 can overwrite the register AOA1. In order to accomplish the bit by bit INCLUSIVE ORing, or the bit by bit ANDing, the register AOA1 is first gated to the logic register 682 at A time in the cycle. At B time in the cycle, the output wires 690 are gated back to the register AOA1. To overwrite the register AOA1, the logic register 682 must be reset to "0" at A time. The EXCLUSIVE OR control line 686 is made active for this overwriting operation. At B time, the wires 690 are gated back to the register AOA1, and it can be seen that this effectively overwrites the register AOA1 because the result of the logic operation is to EXCLUSIVELY OR the input wires 684 with all zeros in the logic register 682. The result of this operation is to overwrite the register AOA1 with the data which appears on the input lines 684.

Going back to FIG. 3, the function of each of the wires in the output cables 332, 348, 350 and 366 will next be described. Reference should first be made directly to FIG. 3 and FIG. 13. From the description of FIG. 3, it will be remembered that if wire 108 is active, it means that the source register is the Q register shown on FIG. 13. Wire 332 extends from FIG. 3 to FIG. 13 and is effective to gate the lefthand portion of the register Q to the 4 bit bus 00 and the righthand portion of register Q to the 4 bit bus 01. Wire 332 is only active on an R, P, YS, or ZS instruction when wire 108 is active. The remainder of the wires to be described are only active for the four instructions just mentioned. Reference will only be made to the control wires which become active other than the R, P, YS and ZS wires. Wire 334 becomes active if wire 110 is active. Wire 334 extends to FIG. 1A and is used to outgate A0 to the 4 bit bus 00 and A1 to the 4 bit bus 01. Wire 336 is active if either wire 108 or wire 112 is active. It extends to FIG. 14 and is used to ingate the logic block 680 from the 8 bit bus 1. Wire 338 is active if either wire 108 or wire 112 is active and if wire 116 is active. It extends to FIG. 14 and is used to condition the logic in box 680 for bit by bit EXCLUSIVE ORing. Wire 340 is active if either wires 108 or 112 are active and, if wire 118 is active. It extends to FIG. 14 and is used to condition the logic in box 680 for EXCLUSIVE ORing. Wire 342 is active if either wires 108 or 112 are active and, if wire 116 is active at A time in the cycle only. Wire 342 extends to FIG. 14 and is used to gate the AOA1 register to the logic register in the logic box 680. At A time in the cycle, wire 344 is active if either wires 108 or 112 are active and if wire 118 is active. Wire 344 extends to FIG. 14 and is used to reset the logic register in the logic box 680. Wire 346 is active at B time in the cycle if either wires 108 or 112 are active. Wire 346 extends to FIG. 14 where it is used to gate the output of the logic box 680 to the register AOA1. Wire 350 is active if wire 114 is active. It extends to FIG. 15 where it is used to outgate BO to the 4 bit bus 00 register and B1 to the 4 bit bus 01.

On FIG. 3, cable 366 will next be described. Reference should be made also to FIG. 16. Wire 352 is active if wire 112 is active. Wire 352 extends to FIG. 16 where it is used to outgate CO to the 4 bit bus 00 and outgate C1 to the 4 bit bus 01. Wire 354 is active if either of the wires 110 or 114 are active. Wire 354 extends to FIG. 16 where it is used to ingate the logic block 740 from the 8 bit bus 1. Wire 356 is active if either of the wires 110 is active and if wire 116 is active. Wire 356 extends to FIG. 16 where it is used to condition the logic circuits 740 for bit by bit EXCLUSIVE ORing.

Wire 358 is active if either of the wires 110 or 114 are active and if wire 118 is active. Wire 358 extends to FIG. 16 where it is used to condition the logic circuits 740 for bit by bit EXCLUSIVE ORing. At A time in the cycle, wire 360 is active if either of the wires 110 or 114 are active and, if wire 116 is active. Wire 360 extends to FIG. 16 where it is used to gate the register COC1 to the logic register contained in the logic circuits 740. At A time in the cycle, wire 362 is active if either wires 110 or 114 are active and, if wire 118 is active. Wire 362 extends to FIG. 16 where it is used to reset the logic register contained in the logic circuits 740. At B time in the cycle, wire 364 is active if either of the wires 110 or 114 are active. Wire 364 extends to FIG. 16 where it is used to gate the output of the logic circuits 740 to the register COC1. This completes the description of the R, P, YS and ZS decoder shown on FIG. 3.

Reference should next be made to the processing unit shown on FIG. 4.

The processing unit can use as source registers either the Q register, the AOA1 register, the COC1 register or the BOB1 register. These registers can be connected to the processing unit by the 4 bit bus 00 and the 4 bit bus 01 shown at the top left of FIG. 4. The processing unit can output its result to the 8 bit bus 1 which can be connected to the destination registers AOA1 or COC1. The processing unit can also output results via cable 632 which extends to the DOD1 register. The control inputs from the R, P, YS and ZS decoder shown on FIG. 3 are the wires labelled R, P, YS, ZS, 100, 102, 104, 106 and the cable 120 which contains the "mask" bits.

The execution of an R instruction will first be described. The R instruction first determines whether or not the source bits are "1's" in the same positions that the mask bits are "1". In other words, for each "1" bit in the mask is there or is there not a corresponding "" bit in the source data? To do this, the mask bits are ANDed with the inverse of the source bits by means of the AND circuits 744–758 inclusive. On FIG. 4, it will be noted that the outputs of these just mentioned AND circuits all extend to OR circuit 760. The OR circuit 760 will not have an output on wire 762 if there is a "1" bit in the source for every "1" bit in the mask. If wire 762 is not active, wire 764 will be active to enable the AND circuit 766. When the B pulse is applied to AND circuit 766, it will have an output which is effective to gate the source to the 8 bit bus 1. If wire 762 is active, nothing will be gated to the 8 bit bus 1 and the effect of this will be to transmit all zeros to the destination register.

To execute the P instruction, it must first be determined if the right most bit of the source is a "1" or a "0". To do this, the line labelled P is applied to AND circuit 768 which at B time in the cycle will have an output if the rightmost bit in the source is a "1". This output will appear on wire 770 which is effective to gate the mask to the 8 bit bus 1. If the rightmost bit of the source is a "0", nothing will be gated to the 8 bit bus 1 which means that all zeros will be transmitted to the destination register.

To execute the YS instruction, it is first necessary to determine if the source bits are all zero or not all zero. If the source bits are not all "0", OR circuit 772 will have an output on wire 774. The active state of wire 774 extends to AND circuit 776 which at B time in the cycle will have an output which extends through OR circuit 778 to wire 780 which is effective to gate a logical "1" to the low order bit "1" wire in the 8 bit bus 1. In this manner, seven "0's" and a "1" are sent to the destination register. If wire 774 is not active, AND circuit 776 will not have an output which means that nothing will be applied to the 8 bit bus 1 and all zeros will be transmitted to the destination register.

To execute the ZS instruction, it again must be determined if the source bits are all zero or not all zero. The ZS instruction, however, operates exactly in reverse to the YS instruction. If OR circuit 772 does not have an output on wire 774, wire 782 will be active and, at B time in the cycle, AND circuit 784 will have an output which extends through OR 778 to wire 780 which gates seven leftmost zeroes and a single rightmost "1" to the 8 bit but 1. If wire 782 is not active, AND circuit 784 will not have an output which means that nothing will be applied to the 8 bit bus 1 and therefore, all zeros will be transmitted to the destination register.

Going back to the execution of the YS instruction, it will be noted that the output of AND circuit 776 is applied as an input to each of the AND circuits 786, 788 and 790. The other input to AND circuit 786 is wire 100. The other input to AND circuit 788 is wire 102 and the other input to AND circuit 790 is the wire 104. If AND circuit 786 has an output, it is effective to transmit the bits in the mask which are currently set to "1" as ones to the DOD1 register. If AND circuit 788 has an output it is effective to transmit the bits in the mask which are currently set to "1", as zeroes to the DOD1. If AND circuit 790 has an output, it is effective to transmit the mask as an input to the logic box associated with the DOD1 register. The result of this will be to replace the contents of the DOD1 register with the contents of the DOD1 register EXCLUSIVELY ORed with the mask.

Again referring to the execution of the YS instruction, it will be noted that if wire 782 is active, AND circuit 794 will have an output at B time which will be applied to AND circuit 792. The other input to AND circuit 792 is wire 106. If AND circuit 792 has an output, it will effective to transmit the inverse of the mask to the logic box associated with the DOD1 register and the result will be to replace the contents of the DOD1 register with the contents of DOD1, bit ANDed with the inverse of the mask. It is believed that a further explanation of the functions of AND circuits 786 and 788 will be desirable. If AND circuit 786 has an output, it is used to set the bits in the DOD1 register to "1" every place that there is a "1" in the mask. The function of AND circuit 788 is to set the bits in DOD1 register to "0" in every position where there is a "1" in the mask. It will be noted that cable 122 that extends to the DOD1 register has 16 wires in it so that in one case, the bits can be set to "1" and in the other case the bits can be set to "0".

Going back to the execution of the ZS instruction, it will be noted that if AND circuit 784 has an output, it will be applied as an input, to each of the AND circuits 786, 788 and 790, the function of which has been previously explained. If AND circuit 796 has an output, it will be applied as an input to AND circuit 792, the function of which has been previously explained.

The function of the control wires in cables 632 which extends from the processing unit to the DOD1 register will next be explained. Referring to FIG. 26, it will be noted that cable 122 can be gated directly to the DOD1 register or through the logic circuits 742 to the DOD1 register. The cable 122 uses 16 wires when it is used to gate directly into the DOD1 register. Only the eight "1" wires are used as an input to the logic box 742. The following control wires to be described are effective only on a YS or a ZS instruction. Wire 630 is active if either wire 100 or wire 102 is active. Wire 630 extends to FIG. 17 where it is used to gate cable 122 directly to the DOD1 register. Wire DOD1 is active if either wires 104 or 106 are active. Wire 628 extends to FIG. 17 where it is used to gate the input cable 122 to the logic circuits 742. At this point, it should be mentioned that the logic circuits 742 do not need an input to reset the logic register. This is because it is not necessary, in any case, to overwrite the contents of the DOD1 register.

At A time, wire 626 is active if either of wires 104 or 106 are active. Wire 626 extends to FIG. 17 where it is used to gate the DOD1 register to the register in the logic circuits 742. At B time, wire 624 is active if either of wires 104 or 106 are active. Wire 624 extends to FIG. 17 where it is used to gate the output of the logic circuits 742 to the DOD1register. Wire 634 is active if wire 104 is active. Wire 634 extends to FIG. 17 where it is used to condition the logic circuits 732 for bit by bit EXCLUSIVE ORing. Wire 636 is active if wire 106 is active. Wire 636 extends to FIG. 17 where it is used to condition the logic circuits 732 for a bit by bit ANDing operation. On FIG. 4, one circuit remains to be described. This is the "0" latch circuit shown at the lower left hand portion of FIG. 4. It will be noted that on an R, P, YS or ZS instruction, this "0" latch is always set to "0 " at A time. Also, on an R, P, YS or ZS execution cycle, if there is no output to the 8 bit bus 1 from the processing unit, this same "0" latch will be set to "1" at B time. When the "0" latch is set to its "1" state, wire 132 will be active. Wire 132 extends to the BZD, BZM decoder and its purpose will be explained later.

Figure 5A:
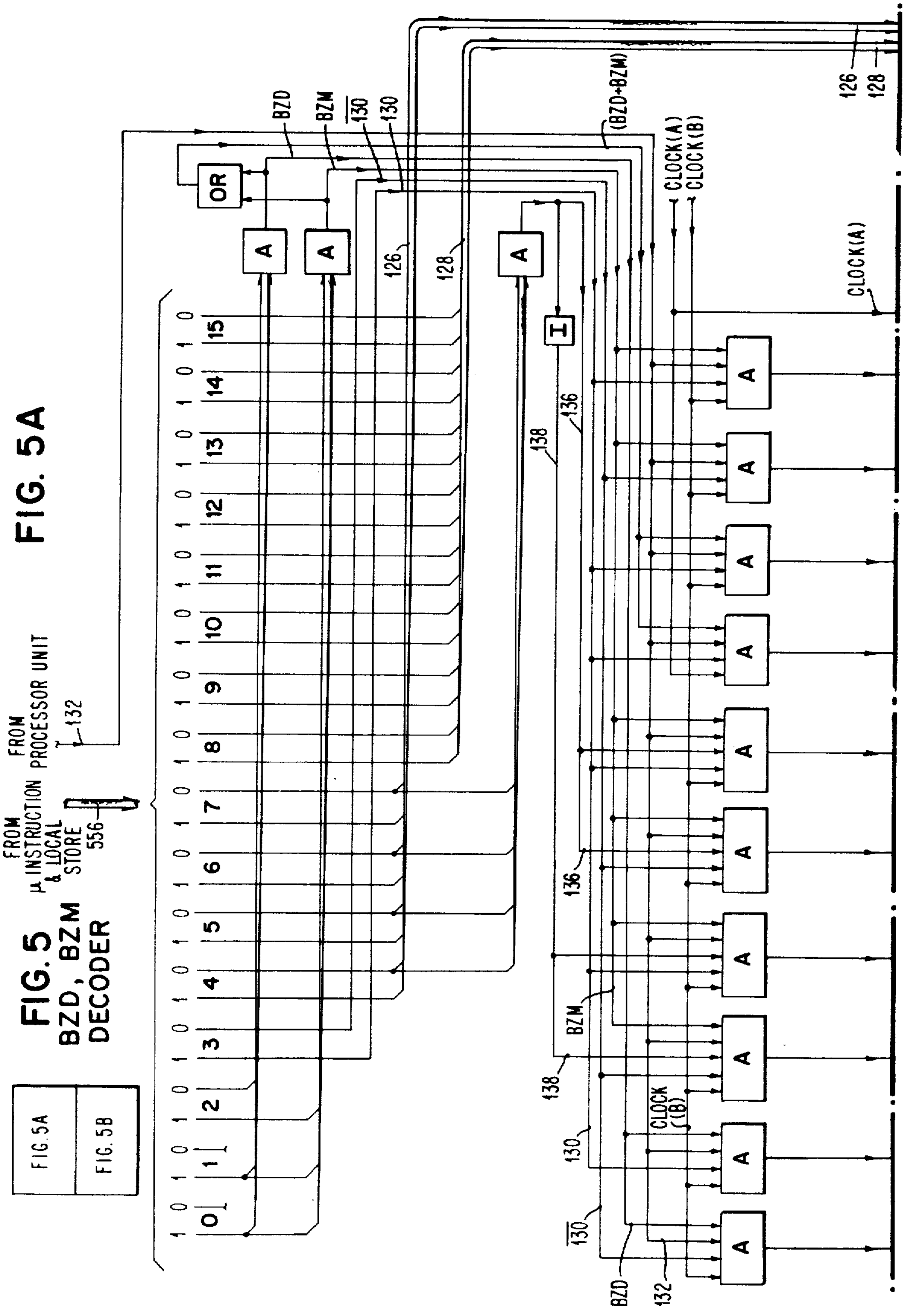
FIGS. 5A and 5B comprise a composite logical schematic diagram of the block marked BZD, BZM Decoder on FIG. 1A.
Figure 5B:
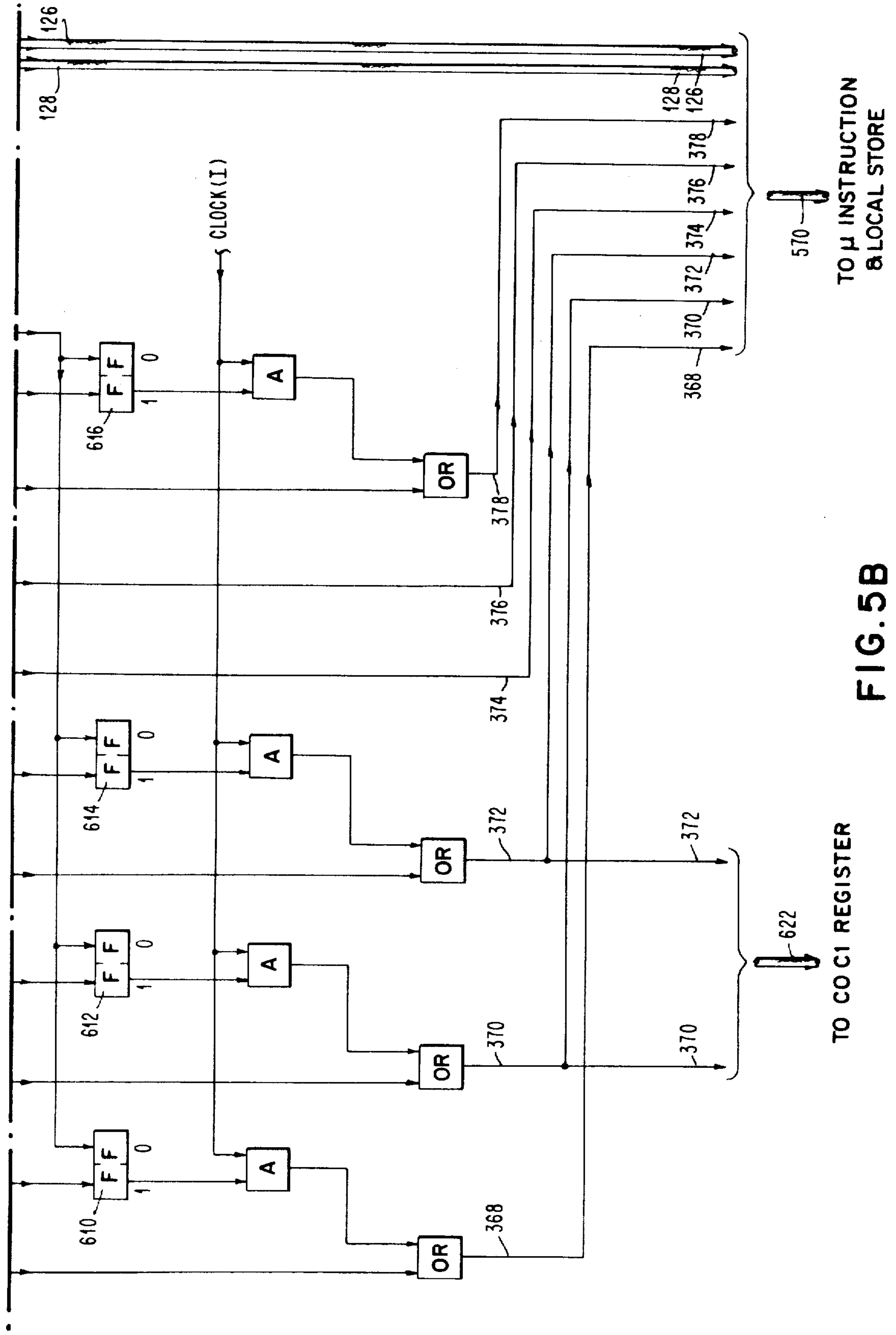

The next unit to be described is the BZD, BZM decoder shown on FIG. 5. These instructions are only effective if the most recent output of the processing unit was 0. It will be noted, on FIG. 5, that wire 132 comes from the "0" latch in the processing unit. Referring to FIG. 5, if the 0 bit is a "1", the 1 bit is a "1" and the number 2 is a "0", the wire labelled BZD will be active which means that a BZD instruction has been decoded. If the number 0 bit is a "1", the number 1 bit is a "1" and the number 2 bit is a "1", the wire labelled BZM will be active which means that a BZM instruction has been decoded. As will be remembered from the two preceding sections of the specification, BZD and BZM mean "branch or zero direct" and "branch or zero multi-way" respectively.

If the number 3 bit is a "1", wire 130 will be active which means that the next sequential address must be stored before the branch is taken, If the number 3 bit is a "0", the line labelled $\overline{130}$ will be active which means that it is not necessary to store the next sequential address. Cable 126 contains the bits numbered 4–7 inclusive and cable 128 contains the bits numbered 8–15 inclusive. Cables 126 and 128 are used in assembling the branch address. Wire 136 is active, if the bits numbered 4–7 are all zero. Wire 138 is active if the bits numbered 4–7 are not all zero. The execution of a BZD instruction without linking will first be described. Reference should also be made to FIG. 2 which is the $\mu$ instruction and local store. At B time in the cycle, wire 368 (FIG. 5) will be active because the wires labelled BZD, 132 and $\overline{130}$ are all active. Wire 368 extends to FIG. 2 where it is used to gate cable 128 to bits 1–8 inclusive of register 644. Wire 368 is also used to gate cable 126 to bits 9–12 inclusive of register 644 and also to set the four high order bits of register 644 to "0010". In this manner, the address assembly register 644 is loaded for the next $\mu$ instruction cycle.

The execution of a BZM instruction without linking will next be described. For the BZM instruction, there are two ways that the address assembly register 644 (FIG. 2) can be assembled according to whether line 136 or line 138 is active on FIG. 5. At B time in the cycle wire 370 will be active if wires 132, 138 and Not 130 ($\overline{130}$) are also active. Wire 370 extends to FIG. 16 where it is used to gate the COC1 register to the 4 bit bus 01. Wire 370 also extends to FIG. 2 where it is used to gate the 4 bit bus 01 to bits 1, 2, 3 and 4 register 644. On FIG. 2, wire 370 is also used to gate cable 126 to bits 5, 6, 7 and 8 of the assembly register 644. Also, at B time in the cycle, wire 378 will be active because wires 132 and $\overline{130}$ are both active. Wire 378 extends to FIG. 2 where it is used to gate cable 128 to bits 9, 10, 11, 12, 13, 14, 15 and 16 of the address assembly register 644. In this manner, the address is assembled for the next $\mu$ instruction for a BZM instruction without linking, provided that wire 138 is active.

If wire 136 is active, the address is assembled in a different manner as follows. At B time in the cycle, wire 372 will be active because wires 132, 136 and $\overline{130}$ are active. Wire 372 extends to FIG. 16 where it is used to gate the CO register to the 4 bit bus 00 and the C1 register to the 4 bit bus 01. Wire 372 also extends to FIG. 2 where it is used to gate the 4 bit bus 01 to bits 1, 2, 3 and 4 of register 644. On FIG. 2, wire 372 is also used to gate the 4 bit bus 00 to bits 5, 6, 7 and 8 of the address assembly register 644. Wire 378 is again active to gate cable 128 to bits 9, 10, 11, 12, 13, 14, 15, and 16 of register 644. In this manner, the address for the next $\mu$ instruction is assembled for the BZM instruction for the case where wire 136 is active.

If linking is desired, wire 130 will be active. In general, when linking is desired, it is necessary to store the incremented sequential address in the zero position of the local store on the cycle following the decoding of a branch instruction. It is during this local store cycle that the address for the next $\mu$ instruction is assembled in register 644. In the case of linking, for either a BZD or a BZM instruction, at A time in the cycle that the instruction is decoded, wire 374 becomes active, because wires 132 and 130 are both active. Wire 374 extends to FIG. 2 where it is used to gate the contents of register 644 to register 642. At B time, in the cycle during which the branch instructions are decoded, wire 376 becomes active because wires 132 and 130 are both active. Wire 376 extends to FIG. 2. On FIG. 2, it is used to reset all bits in register 644 to zero. On FIG. 2, wire 376 is also used to reset the "$\mu$ L" flip-flop 646 to its "0" state. On FIG. 2, wire 376 is also used to reset the "L access" flip-flop 660 to its "0" state. Still on FIG. 2, wire 376 is used through a delay, to reset the $\mu$ instruction control register 640 to all zeroes. A local store cycle will now follow during which the next sequential address is stored in the local store at address zero. During a branch decoding cycle with linking, certain flip-flops (FIG. 5) such as flip-flops 610, 612, 614 and 616 are set. These flip-flops are then effective in the following or local store cycle to assemble the $\mu$ instruction address in register 644. For example, on a BZD instruction with linking, at B time in the instruction decode cycle, flip-flop 610 will be set to its "1" state because wires 132 and 130 are both active. In the following cycle at I time, the "1" state of flip-flop 610 is effective to produce a pulse on wire 368 which, as mentioned before, extends to FIG. 2 and is used to gate cable 128 to bits 1, 2, 3, 4, 5, 6, 7, and 8 of the address assembly register 644.

Wire 368 also gates cable 126 to bits 9, 10, 11 and 12 of register 644 and sets the four high order bits of this register to "0010". At B time, in the cycle during which a BZM instruction is decoded and provided that wires 132, 138 and 130 are active. flip-flop 612 will be set to its "1" state. At I time in the following cycle, because flip-flop 612 is in its "1" state, a pulse will be produced on wire 370. Wire 370 extends to FIGS. 16 and 5 and its function has been previously described. At B time, during the decoding of a BZM instruction, if wires 132, 136 and 130 are all active flip-flop 614 will be set to its "1" state. On the following cycle, at I time, the "1" state of flip-flop 614 is effective to allow a pulse to be produced on wire 372. Wire 372 extends both to FIG. 5 and FIG. 16 (its function has been previously described). At B time during the decoding of a BZM instruction, if wires 132 and 130 are both active, flip-flop 616 will be set to its "1" state. At I time, in the following cycle, the "1" state of flip-flop 616 will allow a pulse to be produced on wire 378 which extends to FIG. 2. The function of wire 378 has been previously described. At A time, in the local store cycle, clip-flop 610, 612, 614 and 616 are all reset to their "0" states. This completes the description of the decoding and execution of the BZD and the BZM instructions.

Figure 6:
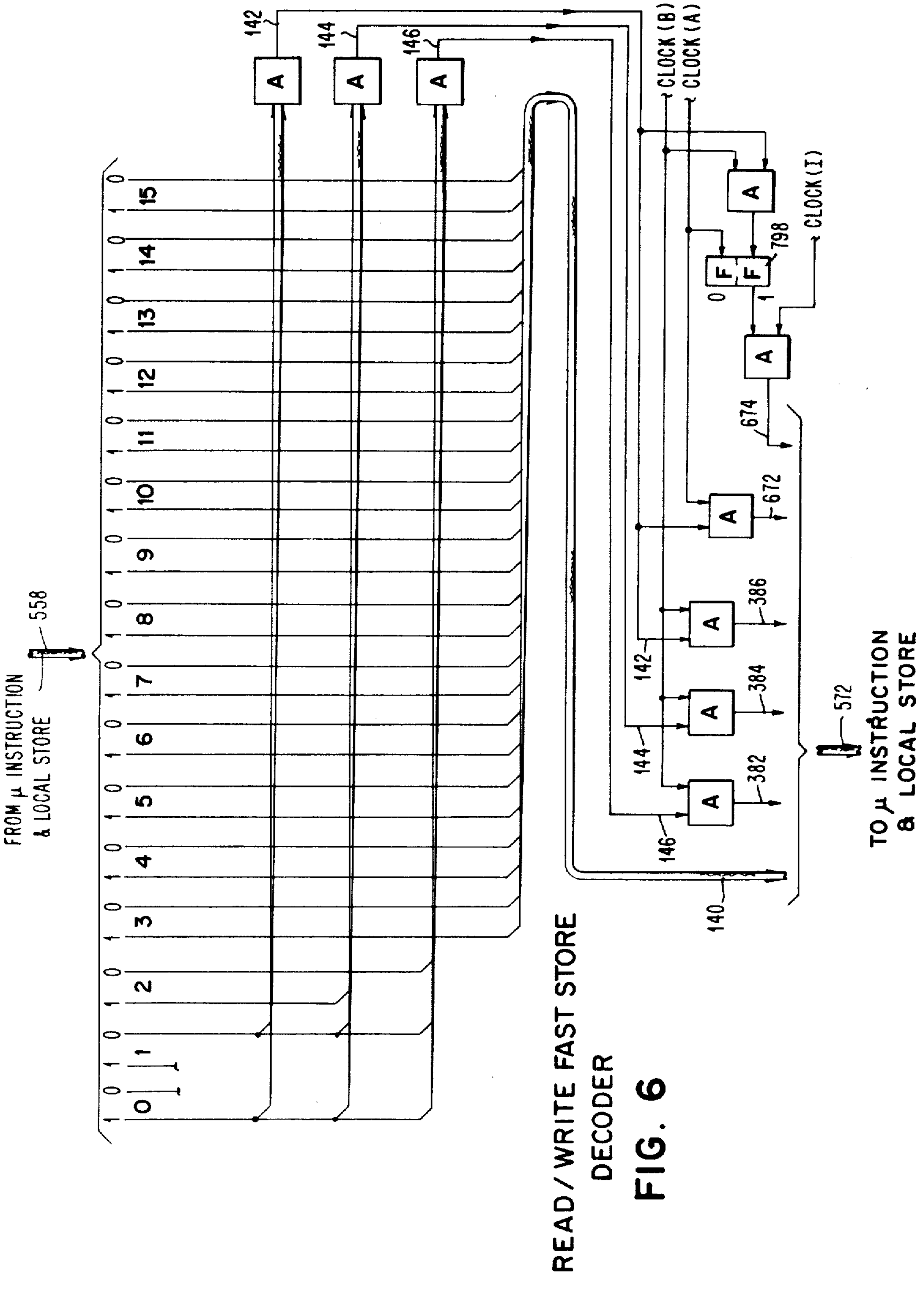
FIG. 6 is a logical schematic diagram of the block marked Read/Write Fast Store Decoder on FIG. 1A.

Reference should next be made to the read/write fast store decoder shown on FIG. 6. On FIG. 6, if the number 0 bit is a "1" and the number 1 bit is a "0", line 142 will be active which means that the next cycle will be a local store cycle. If bit number 0 is a "1", bit number 1 is a "0" and bit number 2 is a "1", line 144 will be active which means that the next cycle will be a local store "write" cycle. If bit number 0 is a "1", bit number 1 is a "0" and bit number 2 is a "0", line 146 will be active which means that the next cycle will be a read local store cycle. Cable 140 contains a 13 bit address for this following local store cycle. Referring to FIG. 6, at A time in the cycle, wire 672 will be active. Wire 672 extends to FIG. 2 where it is used to gate the contents of register 644 to the "hold" register 676. In this manner, the next sequential address is preserved. If the instruction is a "read" instruction, at B time during the decode cycle, wire 382 will become active. Wire 382 extends to FIG. 2 where it is used to reset the $\mu$ access flip-flop 646 to its "0" state. Wire 382 is also used to set the "L Access" flip-flop 660 to its "1" state. If the instruction is a "write" instruction, at B time during the decode cycle, wire 384 will become active. Wire 384 extends to FIG. 2 where it is used to reset the $\mu$ access flip-flop 646 to its "0" state. Wire 384 is also used to reset the "L Access" flip-flop to its "0" state. On either a "read" or a "write" access, wire 386 will become active at B time during the decode cycle. Wire 386 extends to FIG. 2 where it is used to reset bits 14, 15, and 16 to all zeros. On FIG. 2, wire 386 is also used to gate cable 140 to bits 1–13 of register 644. In this manner, the address for the local store operation is assembled in the address assembly register 644. On FIG. 6, at B time in the decode cycle, the flip-flop will be set to its "1" state. At I time in the following or local store cycle, a pulse will be produced on wire 674 which extends to FIG. 2. Wire 674 is used to gate the HOLD register 676 to the address assembly register 644. In this manner, the next sequential address is placed back in the address assembly register 644. This completes the description of the decoding and execution of the read/write fast store instruction.

Reference should next be made to FIGS. 2, 7, 11, 14 and 16. The operation of the read/write main/auxiliary storage decoder will next be described. On FIG. 7, if the number 0 bit is a "0", the number 1 bit is a "1", the number 2 bit is a "0", the number 5 bit is a "1" the number 6 bit is a "1", and the number 7 bit is a "1", line 148 will be active which means that a read/write main/auxiliary store instruction has been decoded. If the number 3 bit is a "1", line 150 will be active. If line 150 and line 148 are active, it means that the access is to main store. If the number 3 bit is a "0", line 152 will be active. If both lines 152 and 148 are active, it means that there will be an auxiliary store access. If the number 4 bit is a "1", line 154 will be active. The active state of line 154 along with the active state of either lines 150 or 152 and the active state of line 148 means that the access is a "write" access. If the number 4 bit is a "0", line 156 will be active. The active state of line 156 along with the active state of either lines 150 or 152 and the active state of line 148 means that a "read" access is to be performed. On FIG. 7, the wires 158–168 indicate the source of the address which is to be gated into the address assembly register for the main and auxiliary store 800 shown on FIG. 11.

Figure 7:
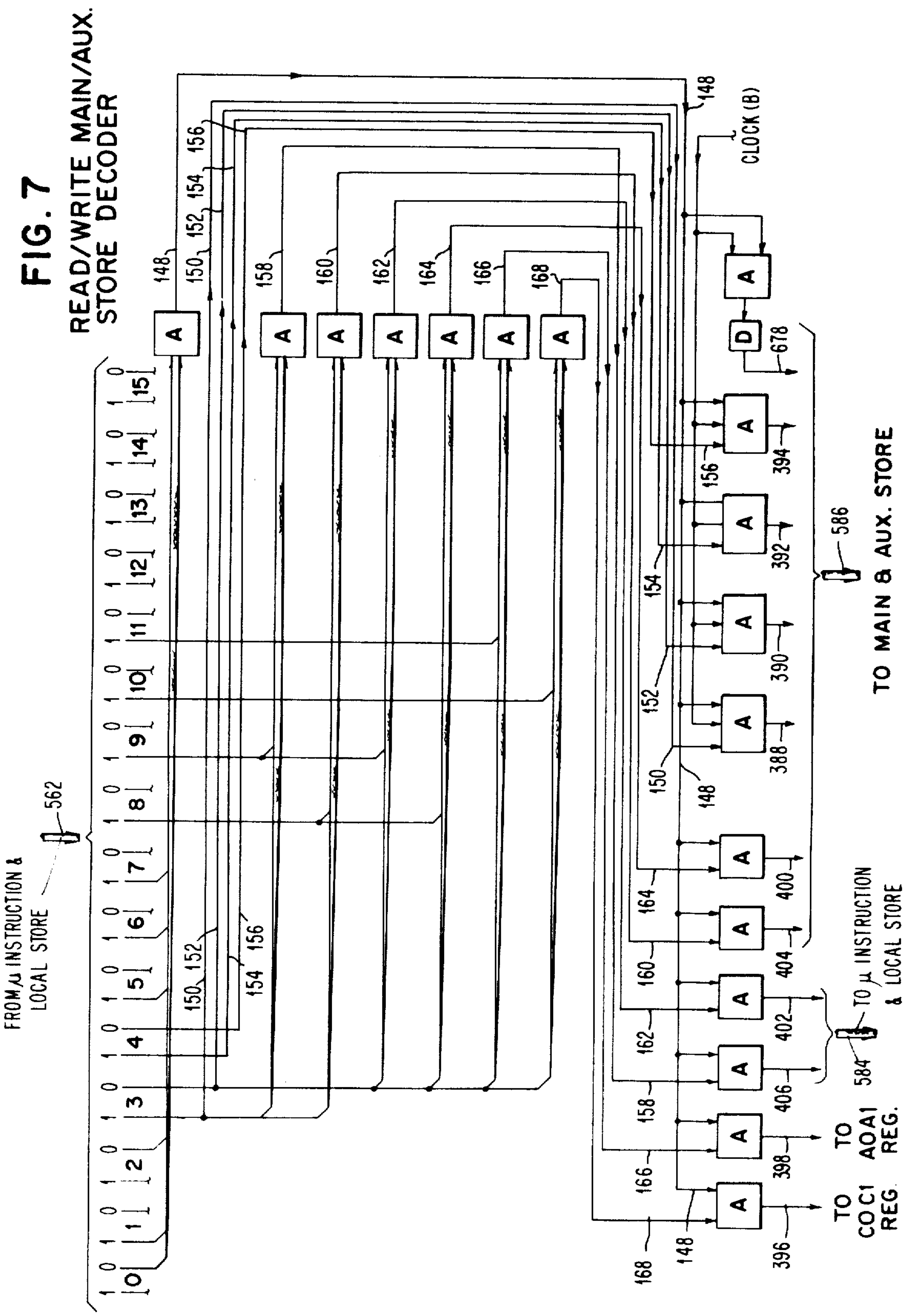
FIG. 7 comprises a logical schematic diagram of the block indicated Main/Auxiliary Store Decoder on FIG. 1A.

On FIG. 7, if the number 3 bit is a "1" and the number 9 bit is a "1", line 158 will be active which, in conjunction with the active state of line 148, means that the source of the address is in the LOL1 register and is a 16 bit address which can be used for a main store access. If the number 3 bit is a "1" and a number 8 bit is a "1", line 160 will be active, which in conjunction with the active state of line 148, will indicate that the source of the address is in register MOM1 and also can be a 16 bit address. If the number 3 bit is a "0" and the number 9 bit is a "1", line 162 will be active which, in conjunction of the active state of line 148, will indicate that the source of the address is in the register L1. In this case, the source of the address is only eight bits so it can only be used for an auxiliary store access. If the number 3 bit is a "0", and the number 8 bit is a "1", line 164 will be active which, in conjunction with the active state of line 148, will indicate that the source of the address is in the register M1. Again the address can only be an eight bit address. If the number 3 bit is a "0" and the number 11 bit is a "1", line 166 will be active which, in conjunction with the active state of line 148, will indicate that the source of the address is in the AOA1 register which is only an eight bit address. If the number 3 bit is a "0" and the number 10 bit is a "1", line 168 will be active. The active state of this line ANDed with the active state of lien 148 will indicate that the source of the address is in register COC1, which again is an eight bit address.

On FIG. 7, the wire 396 extends to FIG. 16 and is used to gate the contents of the register COC1 to the 8 bit bus 1. The wire 398 extends to FIG. 14 and is used to gate the contents of the register AOA1 to the 8 bit bus 1. The wire 406 extends to FIG. 2 and is used to gate the register LO to the 8 bit bus 0. On FIG. 2, the wire 406 is also used to gate the register L1 to the 8 bit bus 1. The wire 402 extends to FIG. 2 and is used to gate the register L1 to the 8 bit bus 1. The wire 404 extends to FIG. 11 and is used to outgate the MO register to the 8 bit bus 0 and also to outgate the M1 register to the 8 bit bus 1. The wire 400 extends to FIG. 11 and is used to outgate the M 1 register to the 8 bit bus 1. The wire 388 extends to FIG. 11 and is used to ingate the right hand eight bits of the assembly register 800 from the 8 bit bus 1 and to ingate the left hand eight bits of the assembly register 800 from the 8 bit bus 0. The wire 390 extends to FIG. 11 and is used to ingate the right hand eight bits of the register 800 from the 8 bit bus 1. On FIG. 11, the wire 390 is also used to reset the left hand eight bits of the register 800 to 0. This is necessary for an auxiliary store instruction. The wire 392 extends to FIG. 11 and is used to condition the store for a "write" operation. The wire 394 extends to FIG. 11 and is used to condition the store for a "read" operation. The wire 678 extends to FIG. 11 and is used to start the operation of the store access. It will be noted that this pulse is slightly delayed in order to permit the controls to be properly conditioned before the store is set in operation. This completes the description of the main and auxiliary store decoder.

Figures 8, 8A:
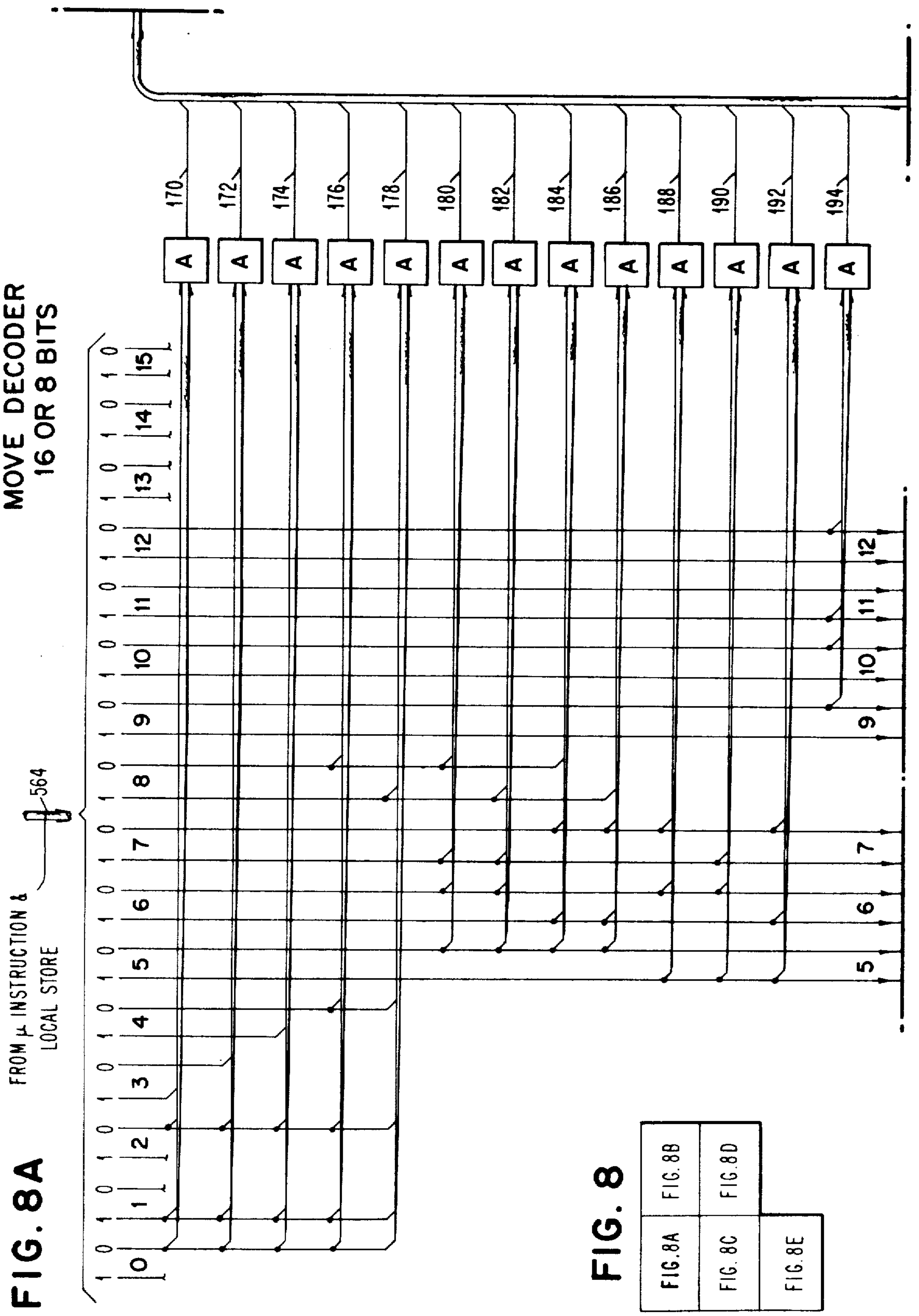
FIG. 8 is an organizational diagram of FIGS. 8A through 8D.
FIGS. 8A–8D comprise a composite logical schematic diagram of the block indicated as 16 or 8 Bit Move Decoder on FIG. 1A.
Figure 8B:
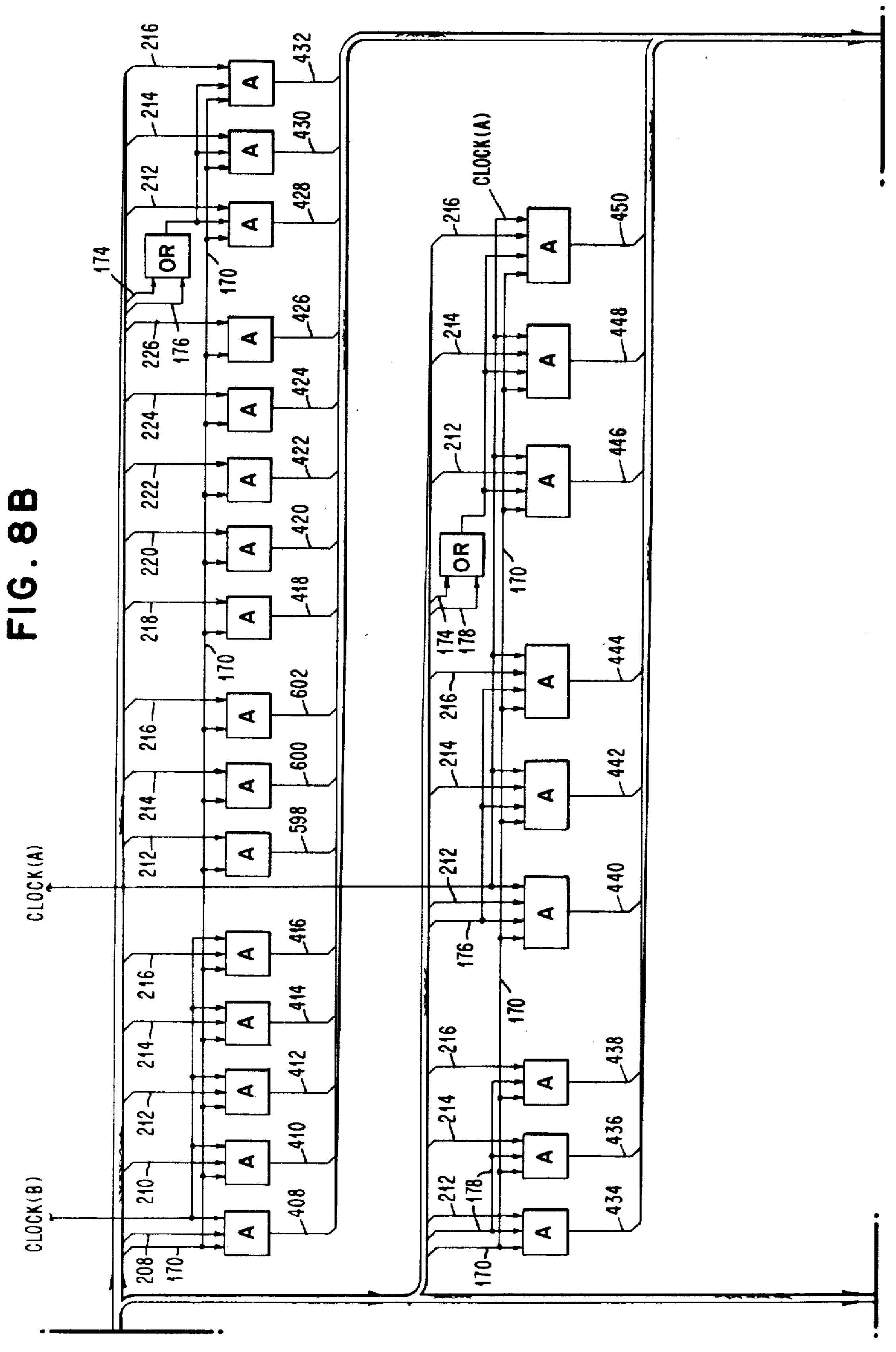
Figure 8C:
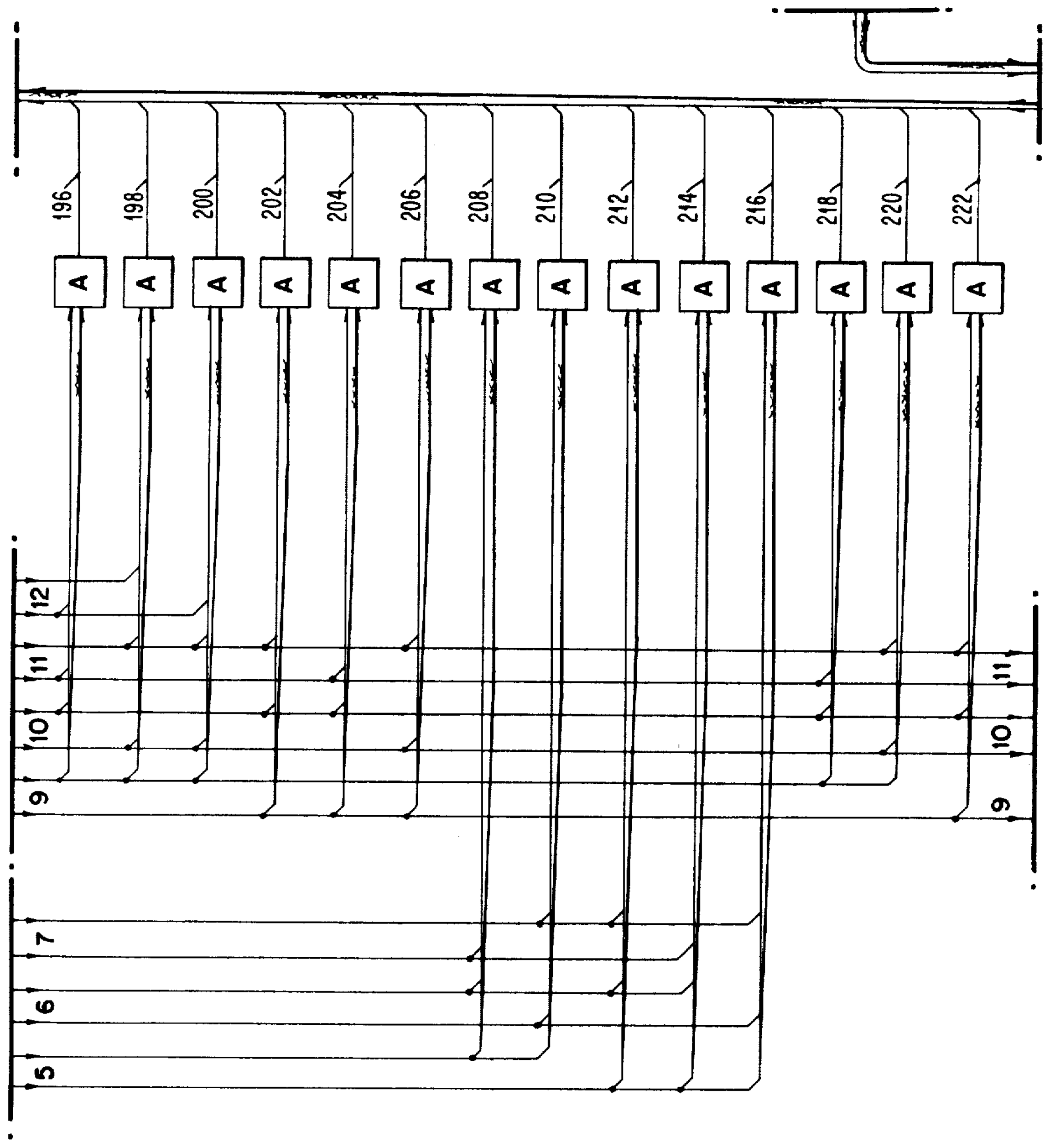
Figure 8D:
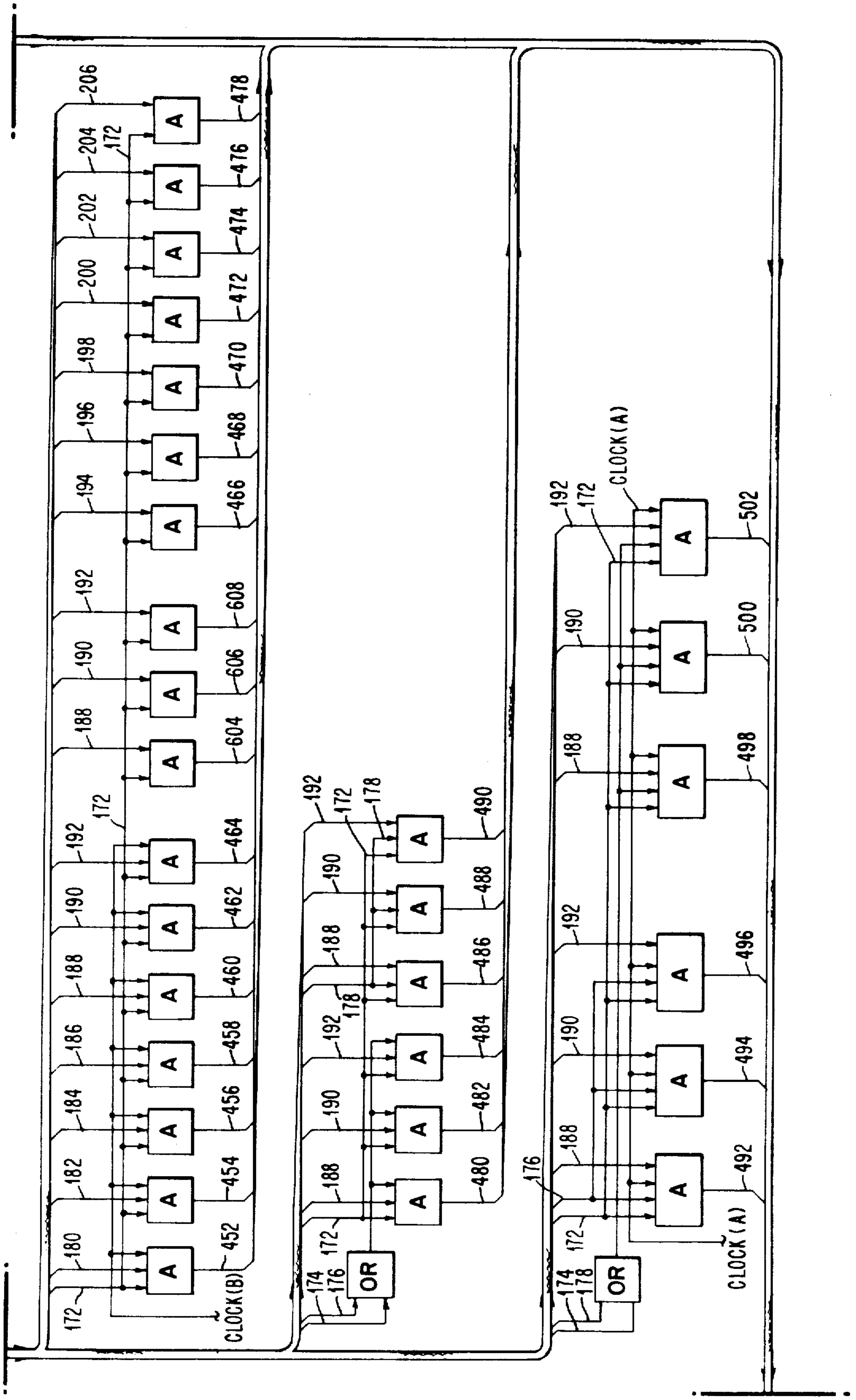
Figure 8E:
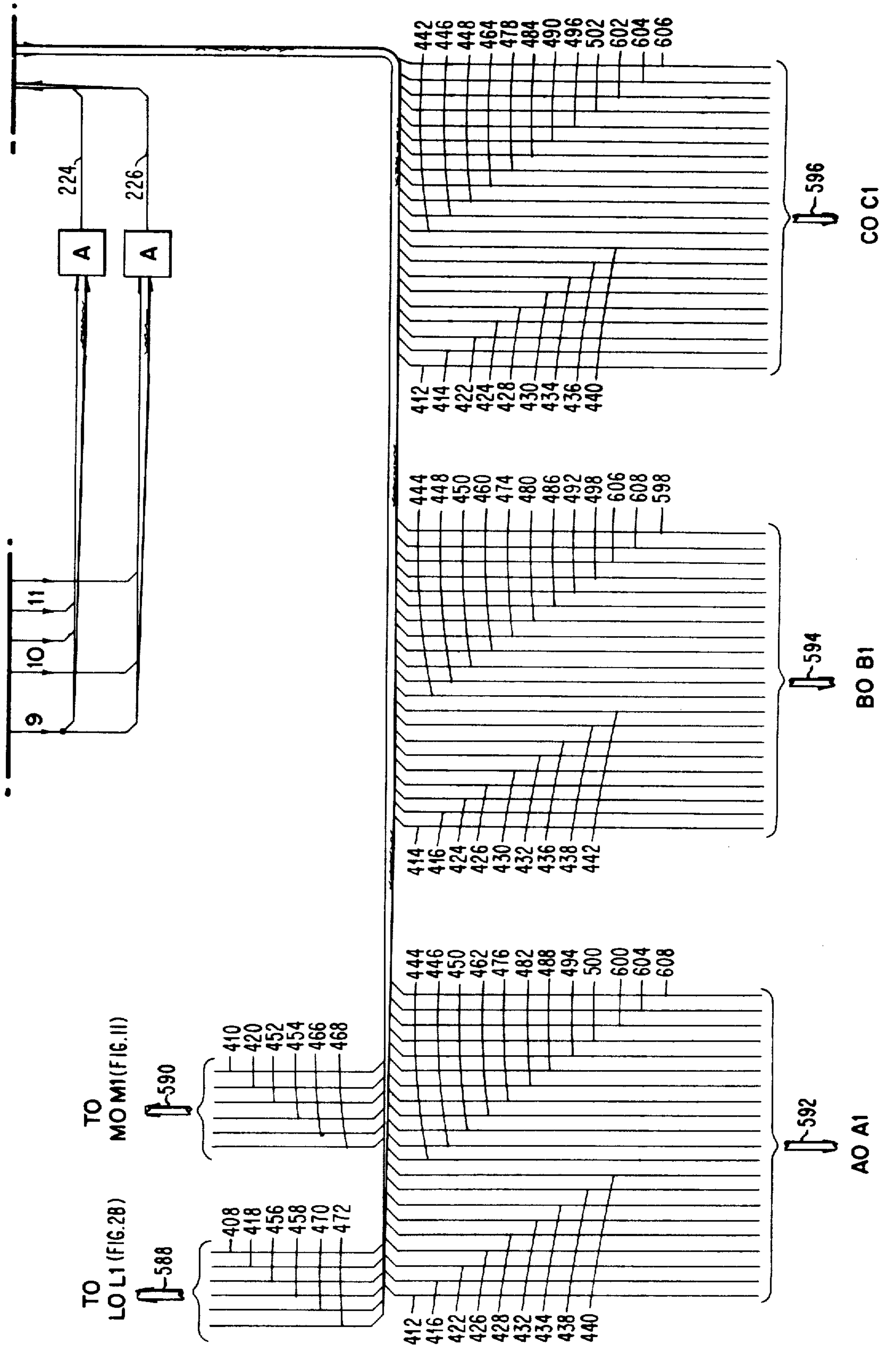

The next unit to be described in the 16 or 8 bit move decoder shown on FIG. 8. Referring now to FIG. 8 wire 170 is active for a 16 bit move. Wire 172 is active for an eight bit move. If wire 174 is active, it means that the source is bit by bit EXCLUSIVELY ORed with the contents of the destination register. If wire 176 is active, it means that the source register overwrites the contents of the destination register. If wire 178 is active, it means that the source register is bit by bit ANDed with the contents of the destination register. The last three statements apply only if the destination register is AOA1, BOB1 or COC1. Wires 180–192 indicate the destination register for the eight bit move. For example, if wire 180 is active, it means that the destination is register MO. If wire 182 is active, it means that the destination is register M1. If wire 184 is active, it means that the destination is LO. If wire 186 is active, it means that the destination is register L1. If wire 188 is active, it means that the destination register is BOB1. If wire 190 is active, it means that the destination register is AOA1. If wire 192 is active, it means that the destination register is COC1.

Wires 194–206 inclusive indicate the source register for the eight bit move. If wire 194 is active, the source register is the register MO. If wire 196 is active, the source is M1. If wire 198 is active, the source is register LO. If wire 200 is active, the source is register L1. If wire 202 is active, the source is register BOB1. If wire 204 is active, the source is AOA1. If wire 206 is active, the source is COC1.

The wires 208–216 inclusive indicate the destination registers for the 16 bit moves. If wire 208 is active, the destination is register LOL1. If wire 210 is active, the destination register is MOM1. If wire 212 is active, the high order eight bits go to register AOA1, and the low order eight bits go to register COC1. If wire 214 is active, the high order eight bits go to register BOB1, and the low order eight bits go to register COC1. If wire 216 is active the lefthand eight bits go to register AOA1 and the low order eight bits go to register BOB1.

The wires 218–226 indicate the source registers for the 16 bit moves. If wire 218 is active, the source register is LOL1. If wire 220 is active, the source is register MOM1. If wire 222 is active, the high order 8 bits come from register AOA1, and the low order 8 bits come from register COC1.

If wire 224 is active, the source of the high order eight bits is the BOB1 register and the source of the low order eight bits is the COC1 register. If wire 226 is active, the source of the high order eight bits is the register AOA1 and the source of the low order eight bits is the register BOB1.

Referring to FIG. 8, on a 16 bit move, one of the wires in the group 408–416 inclusive can become active at B time in the cycle under the following conditions. Wire 408 can be active if wire 208 is active. Wire 408 extends to FIG. 2 where it is used to ingate the register LO from the 8 bit bus 0. On FIG. 2, wire 408 is also used to ingate the register L1 from the 8 bit bus 1. Wire 410 can become active if wire 210 is active. Wire 410 extends to FIG. 11 where it is used to ingate the register MO from the 8 bit bus 0. On FIG. 11, the wire 410 is also used to ingate the register M1 from the 8 bit bus 1. Wire 412 can be active if wire 212 is active. Wire 412 extends to FIG. 14 where it is used to gate the output of the logic circuit 680 to the AOA1 register. Wire 412 also extends to FIG. 16 where it is used to gate the output of the logic circuit 740 to the register COC1. Wire 414 can be active if wire 214 is active. Wire 414 extends to FIG. 15 where it is used to gate the output of the logic circuit 738 to register BOB1. Wire 414 also extends to FIG. 16 where it is used to gate the output of the logic circuit 740 to the register COC1. Wire 416 is active if wire 216 is active. Wire 416 extends to FIG. 14 where it is used to gate the output of the logic circuit 680 to the register AOA1. Wire 416 also extends to FIG. 15 where it is used to gate the output of the logic circuit 738 to the register BOB1.

The wires 604, 606, and 608 are active during a 16 bit move decode cycle as follows. Wire 604 is active if wire 212 is active. Wire 604 extends to FIG. 14 where it is used to gate the 8 bit bus 0 to the logic circuit 680. Wire 604 also extends to FIG. 16 where it is used to gate the 8 bit bus 1 to the logic circuit 740. Wire 606 is active if wire 214 is active. Wire 606 extends to FIG. 15 where it is used to gate the 8 bit bus 0 to the logic circuit 738. Wire 606 also extends to FIG. 16 where it is used to gate the 8 bit bus 1 to the logic circuit 740. Wire 608 is active if wire 216 is active. Wire 608 extends to FIG. 14 where it is used to gate the 8 bit bus 0 to the logic circuit 680. Wire 608 also extends to FIG. 15 where it is used to gate the 8 bit bus 1 to the logic circuit 738.

The wires 418–426 inclusive can be active on a 16 bit decode cycle under the following conditions. Wire 418 is active if wire 218 is active. Wire 418 extends to FIG. 2 where it is used to outgate the register LO to the 8 bit bus 0. On FIG. 2, wire 418 is also used to outgate the register L1 to the 8 bit bus 1. Wire 420 is active if wire 220 is active. Wire 420 extends to FIG. 11 where it is used to outgate the register MO to the 8 bit bus 0. On FIG. 11, wire 420 is also used to outgate the register M1 to the 8 bit bus 1. Wire 422 is active if wire 222 is active. Wire 422 extends to FIG. 14 where it is used to outgate the register AOA1 to the 8 bit bus 0. Wire 422 also extends to FIG. 16 where it is used to outgate the register COC1 to the 8 bit bus 1. Wire 424 is active if wire 224 is active. Wire 424 extends to FIG. 15 where it is used to outgate the register BOB1 to the 8 bit bus 0. Wire 424 also extends to FIG. 16 and is used to outgate the register COC1 to the 8 bit bus 1. Wire 426 is active if wire 226 is active. Wire 426 extends to FIG. 14 where it is used to outgate the register AOA1 to the 8 bit bus 0. Wire 426 also extends to FIG. 15 where it is used to outgate the register BOB1 to the 8 bit bus 1.

Wires 428, 430 and 432 are active during a 16 bit decode cycle if either of wires 174 or 176 are active and the following conditions hold. Wire 428 is active if wire 212 is active. Wire 428 extends to FIG. 14 where it is used to condition the logic circuits 680 for a bit by bit EXCLUSIVE OR operation. Wire 428 also extends to FIG. 16 where it is used to condition the logic circuits 740 for a bit by bit EXCLUSIVE OR operation. Wire 430 is active if wire 214 is active. Wire 430 extends to FIG. 15 where it is used to condition the logic circuit 738 for a bit by bit EXCLUSIVE OR operation. Wire 430 also extends to FIG. 16 where it is used to condition the logic circuit 740 for a bit by bit EXCLUSIVE OR operation. Wire 432 is active if wire 216 is active. Wire 432 extends to FIG. 14 where it is used to condition the logic circuit 680 for a bit by bit EXCLUSIVE OR operation. Wire 432 also extends to FIG. 15 where it is used to condition the logic circuit 738 for a bit by bit EXCLUSIVE OR operation.

The wires 434, 436, 438 are active during a 16 bit decode cycle if wire 178 is active and the following conditions hold. Wire 434 is active if wire 212 is active. Wire 434 extends to FIG. 14 where it is used to condition the logic circuit 680 for a bit by bit AND operation. Wire 434 also extends to FIG. 16 where it is used to condition the logic circuit 740 for a bit by bit AND operation. Wire 436 is active if wire 214 is active. Wire 436 extends to FIG. 15 where it is used to condition the logic circuit 738 for a bit by bit AND operation. Wire 436 also extends to FIG. 16 where it is used to condition the logic circuit 740 for a bit by bit AND operation. Wire 438 is active if wire 216 is active. Wire 438 extends to FIG. 14 where it is used to condition the logic circuit 680 for a bit by bit AND operation. Wire 438 also extends to FIG. 15 where it is used to condition the logic circuit 738 for a bit by bit AND operation.

At A time, in a 16 bit move decode cycle, wires 440, 442 and 444 are active if wire 176 is active and the following conditions hold. Wire 440 is active if wire 212 is active. Wire 440 extends to FIG. 14 where it is used to reset the logic register in the logic circuit 680. Wire 440 also extends to FIG. 16 where it is used to reset the logic register in the logic circuits 740. Wire 442 is active if wire 214 is active. Wire 442 extends to FIG. 15 where it is used to reset the logic register in the logic circuit 738. Wire 442 also extends to FIG. 16 where it is used to reset the logic register in the logic circuit 740. Wire 444 is active if wire 216 is active. Wire 444 extends to FIG. 14 where it is used to reset the logic register in the logic circuits 680. Wire 444 also extends to FIG. 15 where it is used to reset the logic register in the logic circuits 738. At A time during a 16 bit move decode cycle, the wires 446, 448 and 450 are active if either wire 174 or 178 are active, and the following conditions hold. Wire 446 is active if wire 212 is active. Wire 446 extends to FIG. 14 where it is used to gate the register AOA1 to the logic circuit 680. Wire 446 also extends to FIG. 16 where it is used to gate the register COC1 to the logic circuit 740. Wire 448 is active if wire 214 is active. Wire 448 extends to FIG. 15 where it is used to gate the register BOB1 to the logic circuits 738. Wire 448 also extends to FIG. 16 where it is used to gate the register COC1 to the logic circuits 740. Wire 450 is active if wire 216 is active. Wire 450 extends to FIG. 14 where it is used to gate the register AOA1 to the logic circuits 680. The wire 450 also extends to FIG. 15 where it is used to gate the register BOB1 to the logic circuits 738. This completes the description of the 16 bit moves. The eight bit moves will be described next.

At B time during an eight bit move decode cycle, the wires 452–464 inclusive will be active under the following conditions. Wire 452 is active if wire 180 is active. Wire 452 extends to FIG. 11 where it is used to ingate the register MO from the 8 bit bus 0. Wire 454 is active if wire 182 is active. Wire 454 extends to FIG. 11 where it is used to ingate the register M1 from the 8 bit bus 0. Wire 456 is active if wire 184 is active. Wire 456 extends to FIG. 2 where it is used to ingate the register LO from the 8 bit bus 0. Wire 458 is active if wire 186 is active. Wire 458 extends to FIG. 2 where it is used to ingate the register L1 from the 8 bit bus 0. Wire 460 is active if wire 188 is active. Wire 460 extends to FIG. 15 where it is used to gate the output of the logic circuit 738 to the register BOB1. Wire 462 is active if wire 190 is active. Wire 462 extends to FIG. 14 where it is used to gate the output of the logic circuit 680 to the register AOA1. Wire 464 is active if wire 192 is active. Wire 464 extends to FIG. 16 where it is used to gate the output of the logic circuits 740 to the register COC1.

Wires 598, 600 and 602 are active on an eight bit move decode cycle if the following conditions hold. Wire 598 is active if wire 188 is active. Wire 598 extends to FIG. 15 where it is used to gate the 8 bit bus 0 to the logic circuits 738. Wire 600 is active if wire 190 is active. Wire 600 extends to FIG. 11 where it is used to gate the 8 bit bus 0 to the logic circuits 680. Wire 602 is active if wire 192 is active. Wire 602 extends to FIG. 16 where it is used to gate the 8 bit bus 0 to the logic circuits 740.

The wires 466–478 inclusive are active during an eight bit move decode cycle if the following conditions hold. Wire 466 is active if wire 194 is active. Wire 466 extends to FIG. 11 where it is used to outgate the register MO to the 8 bit bus 0. Wire 468 is active, if wire 196 is active. Wire 468 extends to FIG. 11 where it is used to outgate the register M1 to the 8 bit bus 0. Wire 470 is active if wire 198 is active. Wire 470 extends to FIG. 2 where it is used to outgate the register LO to the 8 bit bus 0. Wire 472 is active if wire 200 is active. Wire 472 extends to FIG. 2 where it is used to outgate the register L1 to the 8 bit bus 0. Wire 474 is active if wire 202 is active. Wire 474 extends to FIG. 15 where it is used to outgate the register BOB1 to the 8 bit bus 0. Wire 476 is active if wire 204 is active. Wire 476 extends to FIG. 14 where it is used to outgate the register AOA1 to the 8 bit bus 0. Wire 478 is active if wire 206 is active. Wire 478 extends to FIG. 16 where it is used to outgate the register COC1 to the 8 bit bus 0.

The wires 480, 482, and 484 are active during an eight bit move decode cycle if either wire 174 or wire 176 are active and the following conditions hold. Wire 480 is active if wire 188 is active. Wire 480 extends to FIG. 15 where it is used to condition the logic circuit 738 for a bit by bit EXCLUSIVE OR operation. Wire 482 is active if wire 190 is active. Wire 482 extends to FIG. 14 where it used to condition the logic circuit 680 for a bit by bit EXCLUSIVE OR operation. Wire 484 is active if wire 192 is active. Wire 484 extends to FIG. 16 where it is used to condition the logic circuit 740 for a bit by bit EXCLUSIVE OR operation.

The wires 486, 488 and 490 are active during an eight bit move decode cycle if wire 178 is active and the following conditions hold. Wire 486 is active if wire 188 is active. Wire 486 extends to FIG. 15 where it is used to condition the logic circuit 738 for a bit by bit AND operation. Wire 488 is active if wire 190 is active. Wire 488 extends to FIG. 14 where it is used to condition the logic circuit 680 for a bit by bit AND operation. Wire 490 is active if wire 192 is active. Wire 490 extends to FIG. 16 where it is used to condition the logic circuit 740 for a bit by bit AND operation.

At A time during an eight bit move decode cycle the wires 492, 494 and 496 are active if wire 176 is active and the following conditions hold. Wire 492 is active if wire 188 is active. Wire 492 extends to FIG. 15 where it is used to reset the logic register in the logic circuits 738.

Wire 494 is active if wire 190 is active. Wire 494 extends to FIG. 14 where it is used to reset the logic register in the logic circuits 680. Wire 496 is active if wire 192 is active. Wire 496 extends to FIG. 16 where it is used to reset the logic register in the logic circuits 740.

At A time during an eight bit move decode cycle, the wires 498, 500, and 502 are active if either wire 174 or wire 178 is active and the following conditions hold. Wire 498 is active if wire 188 is active. Wire 498 extends to FIG. 15 where it is used to gate the register BOB1 to the logic circuits 738. Wire 500 is active if wire 190 is active. Wire 500 extends to FIG. 14 where it is used to gate the register AOA1 to the logic circuits 680. Wire 502 is active if wire 192 is active. Wire 502 extends to FIG. 16 where it is used to gate the register COC1 to the logic circuits 740. This completes the description of the eight bit move decoder.

Figure 9A:
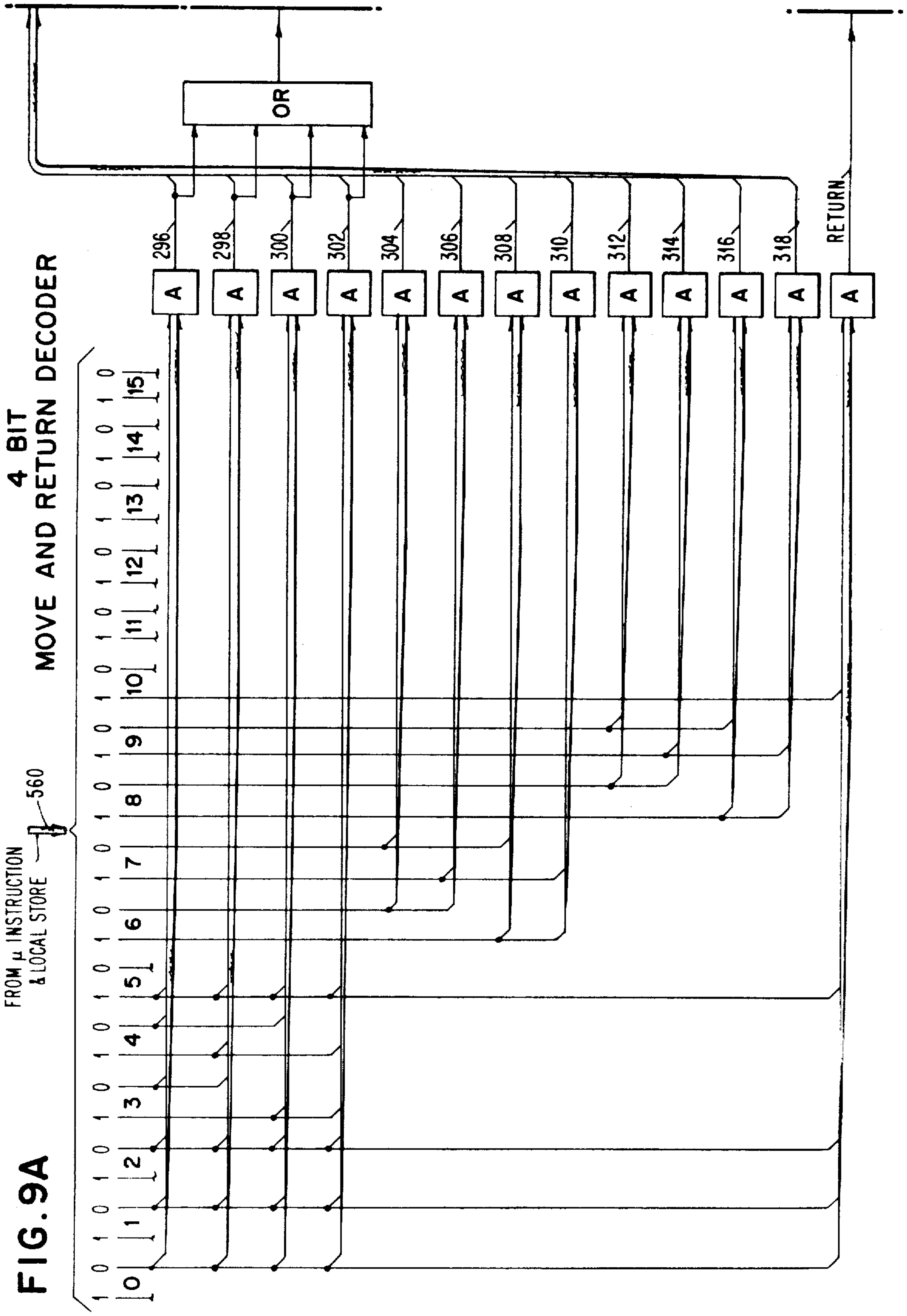
FIGS. 9A–9B comprise a composite logical schematic diagram for the block marked 4 Bit Move Decoder, Return Decoder on FIG. 1A.
Figure 9B:
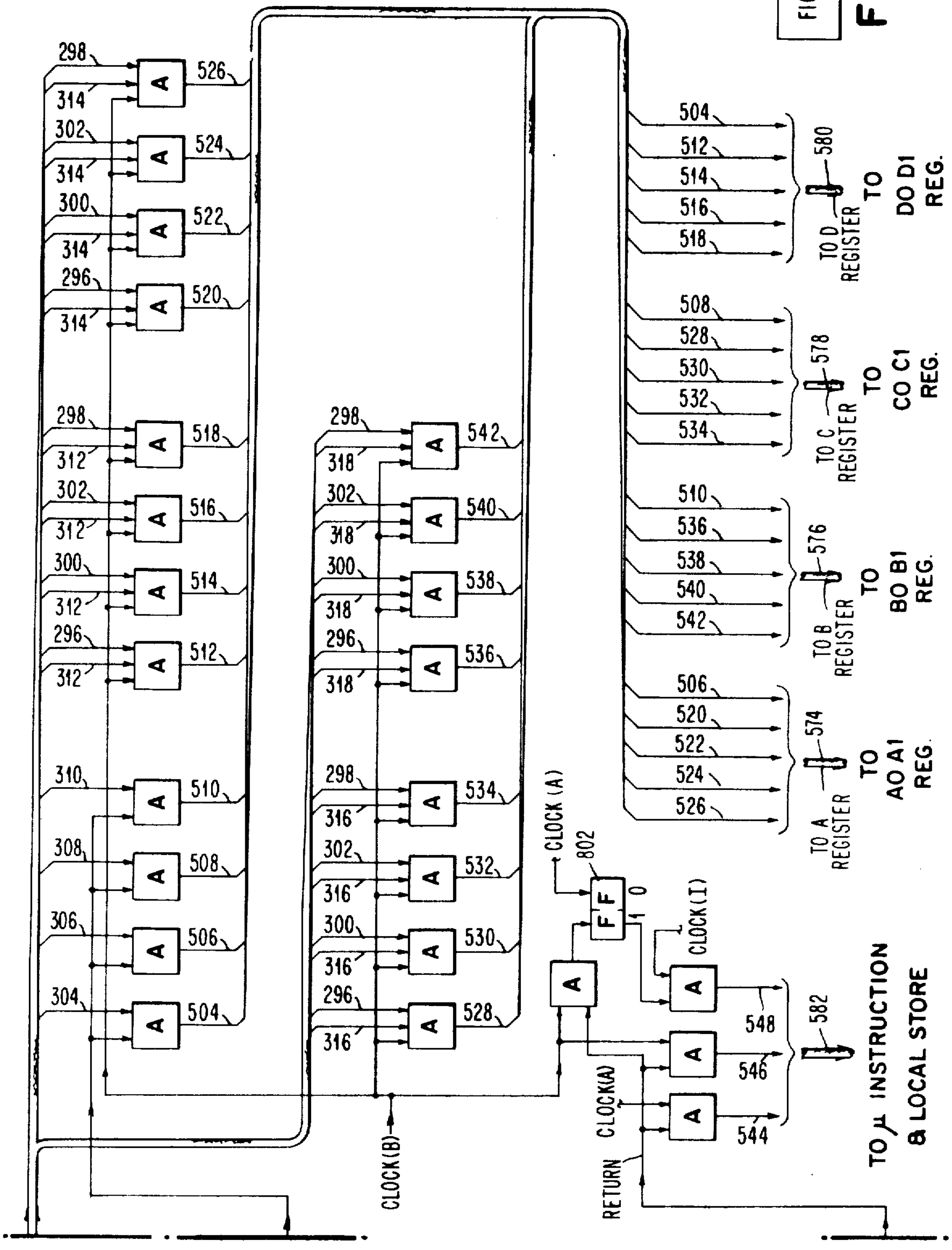
Figure 9:
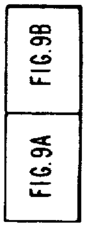
FIG. 9 is an organizational diagram for FIGS. 9A and 9B.

The next unit to be described will be the four bit move decoder and return decoder shown on FIG. 9. On FIG. 9, if wire 296 is active, the high order four bits of the source register are gated into the high order four bits of the destination register. If wire 298 is active, the low order four bits of the source register are gated into the low order four bits of the destination register. If line 300 is active, the low order four bits of the source register are gated into the high order four bits of the destination register. If wire 302 is active, the high order four bits of the source register are gated into the low order four bits of the destination register. If wire 304 is active, the source register is the DOD1 register. If wire 306 is active, the source register is the AOA1 register. If wire 308 is active, the source register is the COC1 register. If wire 310 is active, the source register is the BOB1 register.

If wire 312 is active, the destination is the DOD1 register. If wire 314 is active, the destination is the AOA1 register. If wire 316 is active, the destination is the COC1 register. If wire 318 is active, the destination is the BOB1 register.

During a four bit move decode cycle, the wires 504, 506, 508 and 510 will be active if any one of the four wires 296, 298, 300 or 302 are active and the following conditions hold. Wire 504 is active if wire 304 is active. Wire 504 extends to FIG. 17 where it is used to outgate the DO register to the 4 bit bus 00. Wire 504 is also used to outgate the D1 register to the 4 bit bus 01. Wire 506 is active if wire 306 is active. Wire 506 extends to FIG. 14 where it is used to outgate the register AO to the 4 bit bus 00. Wire 506 is also used to outgate the register A1 to the 4 bit bus 01. Wire 508 is active if wire 308 is active. Wire 508 extends to FIG. 16 where it is used to outgate the register CO to the 4 bit bus 00. Wire 508 is also used to outgate the register C1 to the 4 bit bus 01. Wire 510 is active if wire 310 is active. Wire 510 extends to FIG. 15 where it is used to outgate the register BO to the 4 bit bus 00. Wire 510 is also used to outgate the register B1 to the 4 bit bus 01.

At B time, during a four bit move decode cycle, the wires 512–518 are active if wire 312 is active and the following conditions hold. Wire 512 is active if wire 296 is active. Wire 512 extends to FIG. 17 where it is used to gate the 4 bit bus 00 to the register DO. Wire 514 is active if wire 300 is active. Wire 514 extends to FIG. 17 where it is used to gate the 4 bit bus 01 to the register DO. Wire 516 is active if wire 302 is active. Wire 516 extends to FIG. 17 where it is used to gate the 4 bit bus 00 to the register D1. Wire 518 is active if wire 298 is active. Wire 518 extends to FIG. 17 where it is used to gate the 4 bit bus 01 to the register D1.

At B time, during a four bit move decode cycle, the wires 520, 522, 524 and 526 are active if wire 314 is active and the following conditions hold. Wire 520 is active if wire 296 is active. Wire 520 extends to FIG. 14 where it is used to gate the 4 bit bus 00 to the register AO. Wire 522 is active if wire 300 is active. Wire 522 extends to FIG. 14 where it is used to gate the 4 bit bus 01 to the register AO. Wire 524 is active if wire 302 is active. Wire 524 extends to FIG. 14 where it is used to gate the 4 bit bus 00 to the register A1. Wire 526 is active if wire 298 is active. Wire 526 extends to FIG. 14 where it is used to gate the 4 bit bus 01 to the register A1.

At B time, during a four bit move decode cycle, the wires 528, 530, 532 and 534 are active if wire 316 is active and the following conditions hold. Wire 528 is active if wire 296 is active. Wire 528 extends to FIG. 16 and is used to gate the 4 bit bus 00 to the register CO. Wire 530 is active if wire 300 is active. Wire 530 extends to FIG. 16 where it is used to gate the 4 bit bus 01 to the register CO. Wire 532 is active if wire 302 is active. Wire 532 extends to FIG. 16 where it is used to gate the 4 bit bus 00 to the register C1. Wire 534 is active if wire 298 is active. Wire 534 extends to FIG. 16 where it is used to gate the 4 bit bus 01 to the register C1.

At B time, during a four bit move decode cycle, the wires 536–542 inclusive are active if wire 318 is active and the following conditions hold. Wire 536 is active if wire 296 is active. Wire 536 extends to FIG. 15 and is used to gate the 4 bit bus 00 to the register BO.

Wire 538 is active if wire 300 is active. Wire 538 extends to FIG. 15 and is used to gate the 4 bit bus 01 to the register BO. Wire 540 is active if wire 302 is active. Wire 540 extends to FIG. 15 where it is used to gate the 4 bit bus 00 to the register B1. Wire 542 is active if wire 298 is active. Wire 542 extends to FIG. 15 and is used to gate the 4 bit bus 01 to the register B1. This completes the description of the 4 bit move decoder.

The return decoder is shown at the bottom of FIG. 9. On the figure, line labelled "return" is active if a "return" instruction is decoded. At A time in the cycle, wire 544 will be active. Wire 544 extends to FIG. 2 where it is used to reset the address assembly register 644 to all zeroes. It will be remembered that this is necessary because the next sequential address is stored in the zero position of the local store. At B time in the cycle, line 546 will be active. Wire 546 extends to FIG. 2 and is used to set the "L access" flip-flop 660 to its "1" state. On FIG. 2, wire 546 is also used to reset the "$\mu$ L" flip-flop 646 to its "0" state. This is done so that the next cycle will be a local store access cycle. Wire 546 is also effective to reset the $\mu$ instruction control register to all zeroes through the delay unit 666. At B time, in the cycle during which the return instruction is decoded, flip-flop 802 (FIG. 9) is set to its "1" state. This is done so that on the following cycle, at I time, wire 548 will be active. Wire 548 extends to FIG. 2 and is used to gate the LOL1 register to the address assembly register 644. This completes the description of the return decoder.

Figure 10:
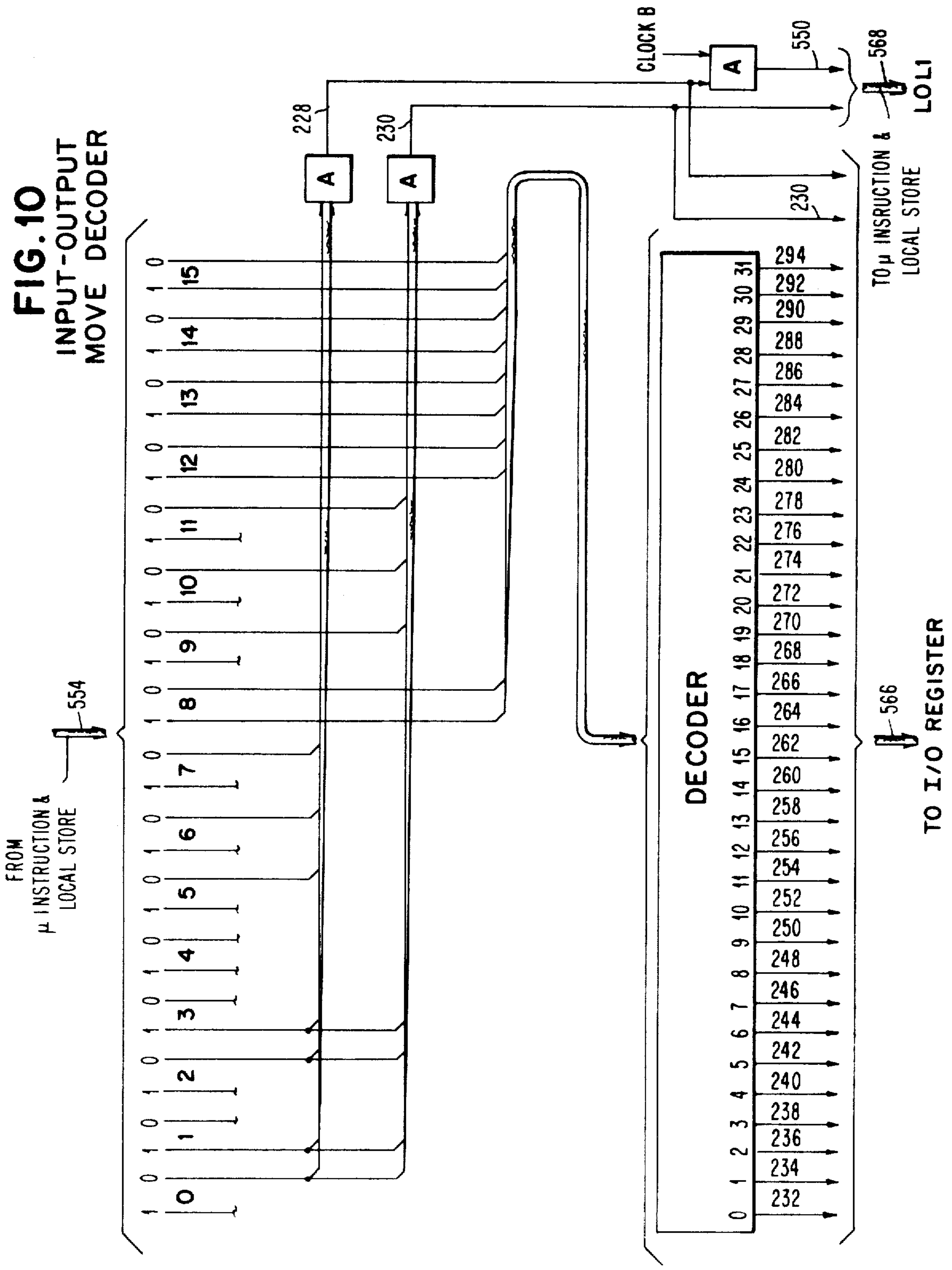
FIG. 10 comprises a logical schematic diagram of the block marked Input/Output Move Decoder on FIG. 1A.

Reference should next be made to the I/O move decoder shown on FIG. 10. On FIG. 10, wire 228 is active if one of the I/O registers is the source register and the LOL1 register is the destination. Wire 230 is active if the LOL1 register is the source and an I/O register is the destination. The number 8 bit, the number 12 bit, the number 13 bit, the number 14 bit and the number 15 bit are decoded into one of 32 possible control lines and these lines are labelled 232–294 inclusive. These control lines extend to FIG. 12 and are used to select the particular I/O register. Wire 230 extends to FIG. 12 and is effective at B time in the cycle to ingate the selected I/O register from the 8 bit bus 0 and the 8 bit bus 1. Wire 228 extends to FIG. 12 and is used to outgate the selected I/O register to the 8 bit bus 0 and the 8 bit bus 1. Wire 230 also extends to FIG. 2 where it is used to outgate the LO register to the 8 bit bus 0 and the L1 register to the 8 bit bus 1. At B time, in the cycle, wire 550 is active. Wire 550 extends to FIG. 2 where it is used to ingate the LO register from the 8 bit bus 0 and ingate the L1 register from the 8 bit bus 1. This completes the description of the I/O move decoder.

The foregoing description of the disclosed hardware embodiment is believed to fully describe how all of the present primitive instructions could be embodied in hardware and thus performed by a computer system under appropriate program control. The operation of all of the functional blocks on FIG. 1A has been fully described together with all possible control conditions as defined in Section 6 of the specification where all of the possible functions are detailed.

It is accordingly believed that any programmer skilled in the structured language presented herein could write desired application programs which would fully exercise the disclosed system hardware.

CONCLUSIONS

Having described the overall structured data and instruction set of the present invention and the disclosed hardware embodiment capable of effecting the primitive instructions required thereof, it is now possible to more meaningfully summarize the application of the present inventive concepts in areas such as availability, emulation, and hardware/software support for the production of large software systems. Some general remarks, on the sample set of micro-instructions that have been presented and their application to the above mentioned areas of interest will now be set forth.

The set of instructions that were implemented, namely the P, R, Y and Z type instructions, were chosen because of their close relation to the functions of decoding and encoding of bit patterns. As such, they are very general-purpose type instructions, and one should not expect great efficiency in using them to construct any specific complicated function. On the other hand, their use allows the construction of any data transformation whatsoever. Also, their extreme simplicity allows the use of simple hardware logic for their implementation, and lends itself to bit-plane redundancy design techniques for enhancing availability.

Although not very efficient for constructing highly complicated functions, the P, R, Y and Z type instructions are very good, for synthesizing simpler functions, such as the testing for certain bit patterns or sets of patterns. In any event, it is possible to produce a programming aid/tool (a software system) which can accept total or partial descriptions of data transformations as input, and produce as output a micro-program in terms of the primitive P, R, Y and Z type microinstructions.

Looking ahead to being able to combine instructions structurally at any level and even among mixed levels, it is possible utilizing the concepts set forth herein to visualize the facilitation of the tasks of compiling and optimization of code, by being able to appeal to the algebraic properties of different instructions, and to the hardware support for functional combinations of instructions which can be implemented by essentially providing simple front ends for one or more of the working registers. Alternatively, especially for lower performance machines, only one such front end can be shared with any number of working registers by simply taking an additional cycle.

In conclusion, a methodology has been shown based on the provision in hardware of a means by which it is possible to "get more for the money" out of any set of hardware instructions, by being able to structurally combine them, for example by adding them together, Abelian multiplying them, etc. Of course, in future extensions of the present inventive concepts as one goes higher in level, the focus on the structural combination of functions will shift more and more to its application to the decision and control functions rather than to the data transformation functions per se. It is believed that the methodology of structures disclosed herein will provide ways of not only manipulating instructions, but also ways of algebraically combining and simplifying them.

While the invention has been particularly shown and described with reference to a preferred embodiment thereof, it will be understood by those skilled in the art that various changes in form and details may be made therein without departing from the spirit and scope of the invention.

What is claimed is:

1. In a structured computer system including memory means for storing data, results, and instructions, processing means for executing instructions and an instruction execution unit for accessing instructions from memory and controlling the operation of said system in accordance with the contents thereof, the improvement which comprises:

a method of transforming an *m* bit data vector from one form into another which comprises the steps of extracting the contents of a specified bit position of said data vector and inserting said contents into another specified bit location of said data vector and transferring the contents of said other bit position of said data vector into said specified bit position thereof.

2. In a structured computer system including memory means for storing data, results, and instructions, processing means for executing instructions and an instruction execution unit for accessing instructions from memory and controlling the operation of said system in accordance with the contents thereof, the improvement which comprises:

a method of transforming an *m* bit data vector from one form into another which comprises the steps of extracting the contents of a specified bit position of said data vector, examining a mask word, and inserting the contents of said specified bit position into a plurality of bit locations of said data vector specified by said mask word.

3. In a structured computer system including memory means for storing data, results, and instructions, processing means for executing instructions and an instruction execution unit for accessing instructions from memory and controlling the operation of said system in accordance with the contents thereof, the improvement which comprises:

a method of transforming an *m* bit data vector from one form into another which comprises examining the contents of a specified bit position of said data vector and leaving the data vector unchanged if said specified bit position is a binary one and transforming it to a zero vector if the specified bit position contains a binary zero.

4. In a structured computer system including memory means for storing data, results, and instructions, processing means for executing instructions and an instruction execution unit for accessing instructions from memory and controlling the operation of said system in accordance with the contents thereof, the improvement which comprises:

a method of transforming an *m* bit data vector from one form into another which comprises the steps of examining the contents of a plurality of specified bit locations of said data vector, leaving the vector unchanged if the contents of all specified bit positions are a binary "1" and for transforming said data vector to a zero vector if the contents of any one of the specified bit locations is a binary "0".

5. In a structured computer system including memory means for storing data, results, and instructions, processing means for executing instructions and an instruction execution unit for accessing instructions from memory and controlling the operation of said system in accordance with the contents thereof, the improvement which comprises:

a method of transforming an *m* bit data vector from one form into another which comprises the steps of examining all bit locations of the data vector for a specified binary state, setting all bits but the rightmost bit to a binary zero if the original data vector contains any binary ones and for leaving the original data vector unchanged if it was originally a zero vector.

6. In a structured computer system including memory means for storing data, results, and instructions, processing means for executing instructions and an instruction execution unit for accessing instructions from memory and controlling the operation of said system in accordance with the contents thereof, the improvement which comprises:

a method of transforming an *m* bit data vector from one form into another which comprises the steps of examining all bit locations of said data vector for a specified binary state, leaving all except the rightmost bit position of said original data vector in the zero state if said original data vector was in fact a zero vector, and changing said data vector to a zero data vector if said original data vector contained any bits set to said specified binary state.

7. In a structured computing system comprising memory means for the storage of data, microprograms and source programs, instruction decoding means for decoding said source programs and for accessing the specified microprograms and a processing unit for manipulating data in accordance with said microprograms, the improvement which comprises a plurality of data transformation devices, wherein said transformation devices perform each of the primitive operations which are specified as P, R, Y and Z primitives, means for selectively actuating and combining said devices in response to individual micro-instruction sets, including means for gating operands directly to said transformation devices from memory, means including buss means for transferring the output of a selected transformation device into a subsequent transformation device whereby each transformation device performs a unique primitive logic operation on one or more data vectors wherein the combination and interconnection of said transformation devices is governed by a predetermined set of structured operations contained in said source programs, which result in the accessing of appropriate microprogram sequences.

8. A structured computer system as set forth in claim 7 wherein said memory means includes a special high speed memory means for storing microinstructions and a series of decoders connected to the output of said high speed storage means for decoding microinstructions specifying primitive operations, branching instructions, memory accessing instructions, instructions for moving data within the system, and I/O operations.

9. A structured computer system as set forth in claim 8 said transformation devices including a series of special purpose registers for receiving data from memory and for storing the results of various microinstruction operations specified by said system, said registers including logic means associated therewith for combining two data vectors according to a predetermined logic configuration.

10. A structured computer system as set forth in claim 9 wherein said predetermined logic operation is a bit ANDing operation and a series of individual AND circuits is provided for combining the corresponding bits of two data vectors to be bit ANDed.

11. A structured computer system as set forth in claim 10 wherein said predetermined logic operation is an EXCLUSIVE OR and wherein a plurality of individual EXCLUSIVE OR circuits are provided so that corresponding bit positions of said two data vectors are EXCLUSIVE ORed together.

12. A structured computer system as set forth in claim 9 wherein said decoder for branching operations includes means for determining whether a branch is to occur depending upon the result of the last previous data transformation operation in the processing unit, said determination means including further means for determining whether the last said data transformation operation gave a result which was all zeros.

13. A structured computer system as set forth in claim 9 including a decoder for recognizing and decoding specified primitive operations and including means for determining a source and destination register for the specified operation, means for identifying and extracting a mask word accompanying the predetermined primitive operations and means for determining whether the results of a given operation are to be further modified by said logic circuitry associated with said special storage registers.

14. A structured computer system as set forth in claim 13 wherein said primitive operation decoder and processor unit associated therewith include means for evaluating a special (R) instruction wherein said operation specifies that certain bits of a data vector are to be examined and if said specified bits are of a predetermined binary value, the data vector is to remain unchanged, and if they are not all of said specified binary value, the data vector is to be converted into a zero vector, said decoder and processor including means for accessing bits of said data vector specified by a mask word and for comparing them in an appropriate logic circuit to determine whether said desired binary condition is present in all specified bits.

15. A structured computer system as set forth in claim 14 wherein said primitive operation and decoder processor includes means for evaluating a special (P) instruction which requires that predetermined bits of a data vector specified by a mask word are to be set to a binary "1" depending on the contents of the rightmost bit of another data vector, said means in said decoder and processor unit for effecting said special (P) operation including means for accessing said other data vector at its right-most bit position, extracting said bit and means for inserting said bit in all bit locations specified by said mask word accompanying said instruction.

16. A structured computer system as set forth in claim 15 wherein said primitive operation decoder and processor includes means for effecting a special (Y,Z) instruction wherein a given data vector is examined to see if it is all zeroes and depending upon the determination, all but the rightmost bit of said data vector are set to zeroes and the rightmost bit is selectively set to a "1", said decoder and processor unit including means for logically examining all bit positions of a data vector specified by said special (Y,Z) instruction to check for the non-zero condition, means for resetting all but the rightmost bit positions of said data vector to zero and means for selectively gating a "1" or a "0" into said rightmost bit position in accordance with the output from said examining means.

17. A structured computer system as set forth in claim 9 wherein said decoders for detecting and effecting a data moving operation are effective to move data from a specified source register to a specified destination register further including means operable under control of the decoders to gate data from the source into the destination register in unaltered form or through said logic means associated with said special purpose registers whereby the data from the source is bit ANDed with the previous contents of the destination register or EXCLUSIVE ORed with the previous contents of the destination register.

* * * * *